(12) United States Patent
Park et al.

(10) Patent No.: US 11,183,173 B2
(45) Date of Patent: *Nov. 23, 2021

(54) ARTIFICIAL INTELLIGENCE VOICE RECOGNITION APPARATUS AND VOICE RECOGNITION SYSTEM

(71) Applicant: LG ELECTRONICS INC., Seoul (KR)

(72) Inventors: Joongeon Park, Seoul (KR); Duho Ro, Seoul (KR); Sungshin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/845,333

(22) Filed: Apr. 10, 2020

(65) Prior Publication Data

US 2020/0243071 A1    Jul. 30, 2020

Related U.S. Application Data

(63) Continuation of application No. 15/960,023, filed on Apr. 23, 2018, now Pat. No. 10,657,953.

(30) Foreign Application Priority Data

Apr. 21, 2017    (KR) .......................... 10-2017-0051836

(51) Int. Cl.
*G10L 15/06* (2013.01)
*G10L 15/22* (2006.01)
*G10L 15/30* (2013.01)

(52) U.S. Cl.
CPC ............ *G10L 15/063* (2013.01); *G10L 15/22* (2013.01); *G10L 15/30* (2013.01); *G10L 2015/0635* (2013.01); *G10L 2015/223* (2013.01)

(58) Field of Classification Search
CPC ....... G10L 15/063; G10L 15/22; G10L 15/30; G10L 2015/223; G10L 2015/0635
(Continued)

(56) References Cited

U.S. PATENT DOCUMENTS 6,615,178 B1 * 9/2003 Tajima ..................... G06F 40/30
                                                               704/277
8,000,454 B1    8/2011 Or-Bach et al.
(Continued)

FOREIGN PATENT DOCUMENTS

JP    2003-302995 A    10/2003
JP    2010-134367 A    6/2010
(Continued)

OTHER PUBLICATIONS

Biz, "The Naver J project will present the five senses AI 'Clobar'. . . ," retrieved from URL: http://biz.chosun.com/site/data/html_dir/2017/03/02/2017030201427.html, Mar. 2, 2017, pp. 1-4.

*Primary Examiner* — Thuykhanh Le
(74) *Attorney, Agent, or Firm* — Birch, Stewart, Kolasch & Birch, LLP

(57) ABSTRACT

Disclosed is an artificial intelligence voice recognition apparatus including: a microphone configured to receive a voice command; a memory configured to store a first voice recognition algorithm; a communication module configured to transmit the voice command to a server system and receive first voice recognition algorithm-related update data from the server system; and a controller configured to perform control to update the first voice recognition algorithm, which is stored in the memory, based on the first voice recognition algorithm-related update data. Accordingly, the voice recognition apparatus is able to provide a voice recognition algorithm fitting to a user's characteristics.

14 Claims, 62 Drawing Sheets

(58) Field of Classification Search
USPC .......................................................... 704/244
See application file for complete search history.

(56) References Cited

U.S. PATENT DOCUMENTS

| | | |
|---|---|---|
| 8,223,931 B1 | 7/2012 | Lavian et al. |
| 8,527,276 B1 | 9/2013 | Senior et al. |
| 8,639,214 B1 | 1/2014 | Fujisaki |
| 8,687,777 B1 | 4/2014 | Lavian et al. |
| 8,838,505 B2 | 9/2014 | Jang et al. |
| 8,867,708 B1 | 10/2014 | Lavian et al. |
| 8,880,120 B1 | 11/2014 | Lavian et al. |
| 8,903,073 B2 | 12/2014 | Or-Bach et al. |
| 8,917,876 B2 | 12/2014 | Goldstein |
| 9,147,395 B2 | 9/2015 | Kim et al. |
| 9,729,996 B2 * | 8/2017 | Yang ................. H04M 1/72457 |
| 10,489,103 B1 * | 11/2019 | Gruebele ................ G06F 1/163 |
| 2002/0169753 A1 * | 11/2002 | Yoshimura .............. G06F 16/93 |
| 2003/0233649 A1 * | 12/2003 | Reimert ................. H04L 67/34 |
| | | 717/176 |
| 2004/0010409 A1 | 1/2004 | Ushida et al. |
| 2004/0176958 A1 | 9/2004 | Salmenkaita et al. |
| 2005/0091059 A1 | 4/2005 | Lecoeuche |
| 2005/0222712 A1 | 10/2005 | Orita |
| 2006/0184471 A1 | 8/2006 | Minamino et al. |
| 2006/0247983 A1 | 11/2006 | Dalli |
| 2007/0106510 A1 | 5/2007 | Hsing et al. |
| 2007/0225982 A1 * | 9/2007 | Washio ................... G10L 15/22 |
| | | 704/257 |
| 2008/0154608 A1 | 6/2008 | Evermann et al. |
| 2008/0154611 A1 | 6/2008 | Evermann et al. |
| 2008/0154612 A1 | 6/2008 | Evermann et al. |
| 2008/0154870 A1 | 6/2008 | Evermann et al. |
| 2008/0167860 A1 | 7/2008 | Goller et al. |
| 2008/0256645 A1 * | 10/2008 | Choi ................. H04N 21/4436 |
| | | 726/27 |
| 2008/0268802 A1 * | 10/2008 | Ricard ................... G10L 25/78 |
| | | 455/179.1 |
| 2009/0150147 A1 | 6/2009 | Jacoby et al. |
| 2009/0240488 A1 * | 9/2009 | White ..................... G10L 15/22 |
| | | 704/9 |
| 2009/0276215 A1 * | 11/2009 | Hager ..................... G06F 16/31 |
| | | 704/235 |
| 2010/0256979 A1 | 10/2010 | Freund et al. |
| 2010/0312555 A1 * | 12/2010 | Plumpe ................ G10L 15/063 |
| | | 704/231 |
| 2010/0312560 A1 * | 12/2010 | Ljolje .................... G10L 15/07 |
| | | 704/254 |
| 2011/0134204 A1 | 6/2011 | Rodriguez et al. |
| 2011/0135069 A1 | 6/2011 | Yoshida |
| 2011/0202905 A1 | 8/2011 | Mahajan |
| 2012/0069131 A1 | 3/2012 | Abelow |
| 2012/0173244 A1 * | 7/2012 | Kwak ..................... G10L 15/22 |
| | | 704/275 |
| 2012/0179465 A1 | 7/2012 | Cox et al. |
| 2012/0272177 A1 | 10/2012 | Vaghefinazari et al. |
| 2012/0299824 A1 | 11/2012 | Hoshuyama et al. |
| 2013/0046537 A1 * | 2/2013 | Weeks ................... G10L 15/28 |
| | | 704/235 |
| 2013/0117023 A1 * | 5/2013 | Parthasarathy ......... G10L 15/30 |
| | | 704/244 |
| 2013/0132084 A1 * | 5/2013 | Stonehocker ........... G10L 15/30 |
| | | 704/244 |
| 2013/0325469 A1 | 12/2013 | Kim et al. |
| 2014/0012574 A1 | 1/2014 | Pasupalak et al. |
| 2014/0019139 A1 | 1/2014 | Abulhaj et al. |
| 2014/0108003 A1 * | 4/2014 | Phillips ................ G06F 40/263 |
| | | 704/8 |
| 2014/0129226 A1 * | 5/2014 | Lee ........................ G10L 15/04 |
| | | 704/254 |
| 2014/0163977 A1 * | 6/2014 | Hoffmeister ........... G10L 15/32 |
| | | 704/232 |
| 2014/0278294 A1 * | 9/2014 | Yeager ................. G06F 30/20 |
| | | 703/2 |
| 2014/0278443 A1 * | 9/2014 | Gunn .................... G06F 1/3265 |
| | | 704/275 |
| 2014/0379342 A1 * | 12/2014 | Li .................... G06Q 20/40145 |
| | | 704/246 |
| 2015/0019216 A1 * | 1/2015 | Singh ................ G06F 16/24578 |
| | | 704/235 |
| 2015/0019221 A1 * | 1/2015 | Lee ........................ G10L 15/08 |
| | | 704/246 |
| 2015/0019223 A1 | 1/2015 | Chen et al. |
| 2015/0040012 A1 * | 2/2015 | Faaborg .............. G06F 3/04817 |
| | | 715/728 |
| 2015/0066513 A1 | 3/2015 | Dharmapurikar |
| 2015/0081294 A1 * | 3/2015 | Hsu ........................ G10L 15/26 |
| | | 704/235 |
| 2015/0088890 A1 | 3/2015 | Hoffert et al. |
| 2015/0112678 A1 * | 4/2015 | Binks .................. G10L 21/0216 |
| | | 704/236 |
| 2015/0134326 A1 * | 5/2015 | Bell ....................... G06F 40/274 |
| | | 704/9 |
| 2015/0149174 A1 * | 5/2015 | Gollan .................... G10L 17/06 |
| | | 704/246 |
| 2015/0154175 A1 * | 6/2015 | Sorensen ............... G06F 40/274 |
| | | 704/9 |
| 2015/0154183 A1 * | 6/2015 | Kristjansson ........... G10L 13/00 |
| | | 704/3 |
| 2015/0170053 A1 * | 6/2015 | Miao ...................... G06N 20/00 |
| | | 706/12 |
| 2015/0235637 A1 * | 8/2015 | Casado ................. G10L 21/034 |
| | | 704/235 |
| 2015/0243287 A1 * | 8/2015 | Nakano ................. G10L 15/22 |
| | | 704/246 |
| 2015/0255068 A1 * | 9/2015 | Kim ....................... G10L 17/04 |
| | | 704/246 |
| 2015/0287401 A1 * | 10/2015 | Lee ........................ G06F 21/78 |
| | | 704/244 |
| 2015/0287406 A1 | 10/2015 | Kristjansson et al. |
| 2015/0287408 A1 * | 10/2015 | Svendsen .............. G10L 15/30 |
| | | 704/235 |
| 2015/0287413 A1 | 10/2015 | Jung et al. |
| 2015/0309984 A1 * | 10/2015 | Bradford .............. G06F 40/263 |
| | | 704/8 |
| 2015/0310859 A1 * | 10/2015 | Lenke .................... G10L 15/18 |
| | | 704/257 |
| 2015/0325254 A1 * | 11/2015 | Lee ........................ G10L 15/08 |
| | | 704/231 |
| 2015/0356973 A1 | 12/2015 | Wansley et al. |
| 2015/0371628 A1 * | 12/2015 | Kreifeldt ............... G10L 15/02 |
| | | 704/254 |
| 2015/0373428 A1 | 12/2015 | Trollope et al. |
| 2016/0012820 A1 * | 1/2016 | Mun ...................... G10L 15/32 |
| | | 704/251 |
| 2016/0019886 A1 * | 1/2016 | Hong ..................... G06F 1/1684 |
| | | 704/231 |
| 2016/0027435 A1 * | 1/2016 | Pinto ..................... G10L 15/26 |
| | | 704/244 |
| 2016/0034458 A1 * | 2/2016 | Choi ...................... G10L 15/06 |
| | | 704/251 |
| 2016/0035350 A1 | 2/2016 | Jung et al. |
| 2016/0035352 A1 * | 2/2016 | Furumoto ............. G10L 15/22 |
| | | 704/276 |
| 2016/0042737 A1 | 2/2016 | Emerick et al. |
| 2016/0071516 A1 * | 3/2016 | Lee ........................ G10L 15/18 |
| | | 704/251 |
| 2016/0098991 A1 * | 4/2016 | Luo ....................... G10L 15/08 |
| | | 455/563 |
| 2016/0098997 A1 * | 4/2016 | Ding ..................... G10L 15/22 |
| | | 704/275 |
| 2016/0110181 A1 | 4/2016 | Fan et al. |
| 2016/0125883 A1 * | 5/2016 | Koya ..................... G10L 15/30 |
| | | 704/232 |
| 2016/0247520 A1 * | 8/2016 | Kikugawa ............. G10L 15/26 |
| 2016/0252972 A1 * | 9/2016 | Kim ....................... G10L 15/183 |
| | | 704/9 |
| 2016/0345086 A1 | 11/2016 | Chamberlin et al. |
| 2016/0379626 A1 * | 12/2016 | Deisher ................ G10L 15/197 |
| | | 704/232 |

(56) References Cited

U.S. PATENT DOCUMENTS

| | | | |
|---|---|---|---|
| 2017/0256255 A1* | 9/2017 | Bocklet | G06F 16/685 |
| 2018/0047394 A1 | 2/2018 | Tian et al. | |
| 2018/0189048 A1* | 7/2018 | Bala | G06F 8/65 |
| 2018/0201226 A1* | 7/2018 | Falkson | G06F 21/32 |
| 2018/0211668 A1 | 7/2018 | Willett et al. | |
| 2020/0019882 A1* | 1/2020 | Garg | G06F 3/0484 |

FOREIGN PATENT DOCUMENTS

| | | |
|---|---|---|
| JP | 2016-505888 A | 2/2016 |
| JP | 2017-58674 A | 3/2017 |
| KR | 10-2012-0079246 A | 7/2012 |
| KR | 10-2015-0038658 A | 4/2015 |

\* cited by examiner

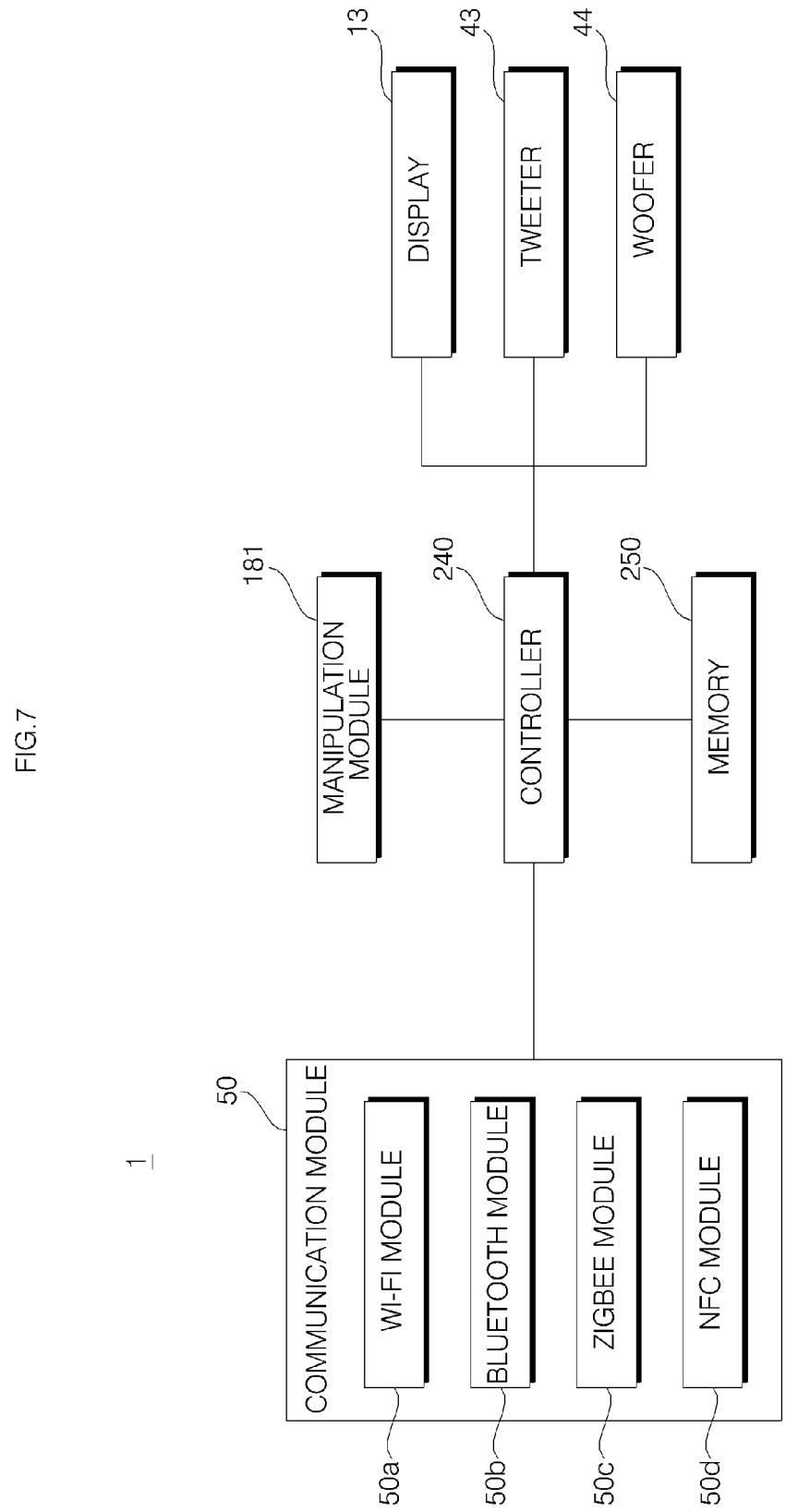

B3

A3

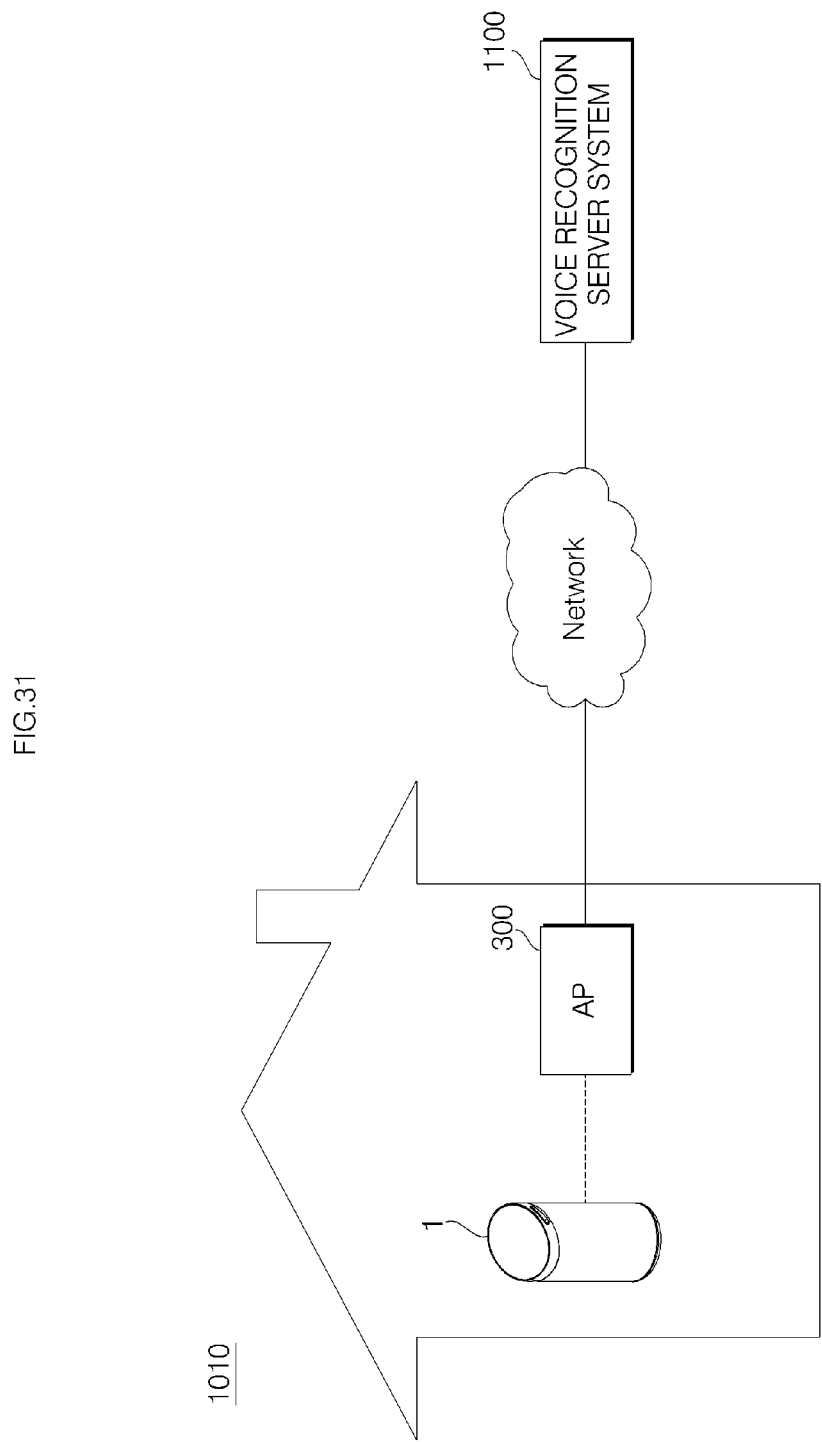

ARTIFICIAL INTELLIGENCE VOICE RECOGNITION APPARATUS AND VOICE RECOGNITION SYSTEM

CROSS-REFERENCE TO RELATED APPLICATION

This application is Continuation of U.S. application Ser. No. 15/960,023, filed on 23 Apr. 2018, which claims the priority benefit of Korean Patent Application No. 10-2017-0051836, filed on, 21 Apr. 2017 in the Korean Intellectual Property Office, the disclosure of which is incorporated herein by reference.

BACKGROUND OF THE INVENTION

1. Field of the Invention

The present invention relates to a voice recognition apparatus and a voice recognition system, and more particularly to a voice recognition apparatus and a voice recognition system which provide a voice recognition algorithm fitting to a user's characteristics.

2. Description of the Related Art

A voice recognition apparatus is an apparatus for performing a voice recognition function.

Meanwhile, air conditioners, washing machines, cleaners, and other home appliances used in a specific space, for examples, at home or at an office, perform distinct functions and operations upon a user's manipulation.

To operate a home appliance, such as the air conditioner, a user needs to manipulate buttons provided in a main body of the home appliance or use a remote control device, such as a remote controller.

However, even when using a remote controller, the user needs to select and push a key of a desired function. Thus, if the user is in a dark indoor space, additional lighting is necessary for the user to see the remote controller and its keys.

Under this background, there are increasing efforts to study and investigate the way of controlling a home appliance based on voice recognition.

In Related Art 1 (Korean Patent Application Publication No. 10-1999-00069703), a remote controller for an air conditioner includes a voice input unit and a signal processing unit to generate and transmit a manipulation signal in response to voice recognition.

Related art 2 (Korean Patent Application Publication No. 10-2006-0015092) discloses: converting an input voice signal into a digital signal and a text; checking if a coinciding control command is stored in a database; if the coinciding control command is stored, controlling each device of an air conditioner; and, if the coinciding control command is not stored, extracting a keyword and controlling each device of the air conditioner in accordance with a control command associated with the keyword.

However, there are limitations in system resources that each apparatus, such as a remote controller and an air conditioner, is able to provide. In particular, in order to recognize a natural language, not just few simple words, a great amount of computation is required, which cannot be implemented by a module embedded in an individual apparatus.

Voice recognition techniques disclosed in Related art 1 and Related art 2 have limitations in recognizing and processing voice commands which are input in the form of various natural languages by users across the world.

Thus, there is need of a method for recognizing a natural language, without a limitation to system resources of an individual apparatus, and for controlling a home appliance conveniently.

SUMMARY OF THE INVENTION

The present invention provides a voice recognition apparatus and a voice recognition system, which provide a voice recognition algorithm fitting to a user's characteristics.

The present invention provides a voice recognition apparatus and a voice recognition system, which is able to perform natural language recognition through communication with a server system.

In one general aspect of the present invention, the above and other objects can be accomplished by the provision of a voice recognition apparatus including: a microphone configured to receive a voice command; a memory configured to store a first voice recognition algorithm; a communication module configured to transmit the voice command to a server system and receive first voice recognition algorithm-related update data from the server system; and a controller configured to perform control to update the first voice recognition algorithm, which is stored in the memory, based on the first voice recognition algorithm-related update data.

In another general aspect of the present invention, the above and other objects can be accomplished by the provision of a voice recognition system including: a voice recognition apparatus configured to store a first voice recognition algorithm and transmit a voice command; and a server system comprising a storage unit configured to store a second voice recognition algorithm, a communication module configured to receive the voice command, and a processor configured to recognize the voice command based on the second voice recognition algorithm, wherein the server system transmits first voice recognition algorithm-related update data to the voice recognition apparatus, and updates a second voice recognition algorithm, which is stored in the server system, based on second voice recognition algorithm-related update data, and wherein the voice recognition apparatus updates the first voice recognition algorithm, which is stored in the voice recognition apparatus, based on the first voice recognition algorithm-related update data.

The voice recognition apparatus according to an embodiment of the present invention includes: a microphone configured to receive a voice command; a memory configured to store a first voice recognition algorithm; a communication module configured to transmit the voice command to a server system and receive first voice recognition algorithm-related update data from the server system; and a controller configured to perform control to update the first voice recognition algorithm, which is stored in the memory, based on the first voice recognition algorithm-related update data. Accordingly, the voice recognition apparatus is able to provide a voice recognition algorithm fitting to a user's characteristics.

In particular, since the voice recognition apparatus performs update by receiving user voice recognition algorithm-related update data from the server system, it is possible to provide a voice recognition algorithm optimized for a user's characteristics.

In addition, the voice recognition apparatus may periodically or non-periodically receive update data of a voice recognition algorithm fitting to a user's characteristics.

In addition, since the voice recognition apparatus performs update by receiving voice recognition algorithm-related update data which is improved through the server system, it is possible to solve a problem that updating a voice recognition algorithm stored in a module is difficult more than updating a voice recognition algorithm stored in the server system.

In addition, due to update of a voice recognition algorithm, the voice recognition apparatus may improve user voice recognition performance.

In addition, the voice recognition apparatus requests version information from the server system, and, when a version stored in the server system is the latest version, the voice recognition apparatus performs update by receiving update data, and therefore, the voice recognition apparatus is able to provide an improved voice recognition function by keeping the voice recognition algorithm stored, stored in the apparatus, with the latest version all the time.

In addition, according to at least one embodiment of the present invention, it is possible to recognize and process a natural language efficiently.

In addition, according to at least one embodiment of the present invention, it is possible to provide User Experience (UX) considering various situations which may occur in a voice recognition process and a home appliance control process.

Meanwhile, the voice recognition system according to an embodiment of the present invention includes: a voice recognition apparatus configured to store a first voice recognition algorithm and transmit a voice command; and a server system comprising a storage unit configured to store a second voice recognition algorithm, a communication module configured to receive the voice command, and a processor configured to recognize the voice command based on the second voice recognition algorithm, wherein the server system transmits first voice recognition algorithm-related update data to the voice recognition apparatus, and updates a second voice recognition algorithm, which is stored in the server system, based on second voice recognition algorithm-related update data, and wherein the voice recognition apparatus updates the first voice recognition algorithm, which is stored in the voice recognition apparatus, based on the first voice recognition algorithm-related update data to thereby provide a voice recognition algorithm fitting to a user's characteristics.

In particular, the voice recognition system updates a voice recognition algorithm through a server system, thereby enabled to carry out integrated update management.

In addition, since simple voice recognition is performed by the voice recognition apparatus and sophisticated voice recognition, such as natural language processing, is performed by the server system, the voice recognition system is able to quickly respond to a simple command, regardless of the server system, while keeping advantages of natural voice control.

In addition, since the voice recognition system utilizes a user regional voice recognition algorithm dependent upon regional language difference, it is possible to solve a problem of voice recognition technologies that the same voice recognition performance cannot be achieved using one software due to variation of recognition depending on a regional language.

BRIEF DESCRIPTION OF THE DRAWINGS

The embodiments will be described in detail with reference to the following drawings in which like reference numerals refer to like elements wherein:

FIG. 7 is a block diagram illustrating control relationship between major components of a voice recognition apparatus;

FIG. 31 is a diagram schematically illustrating a smart home system including a voice recognition server system and a voice recognition apparatus according to an embodiment of the present invention;

DETAILED DESCRIPTION OF THE EMBODIMENTS

Figure 1:
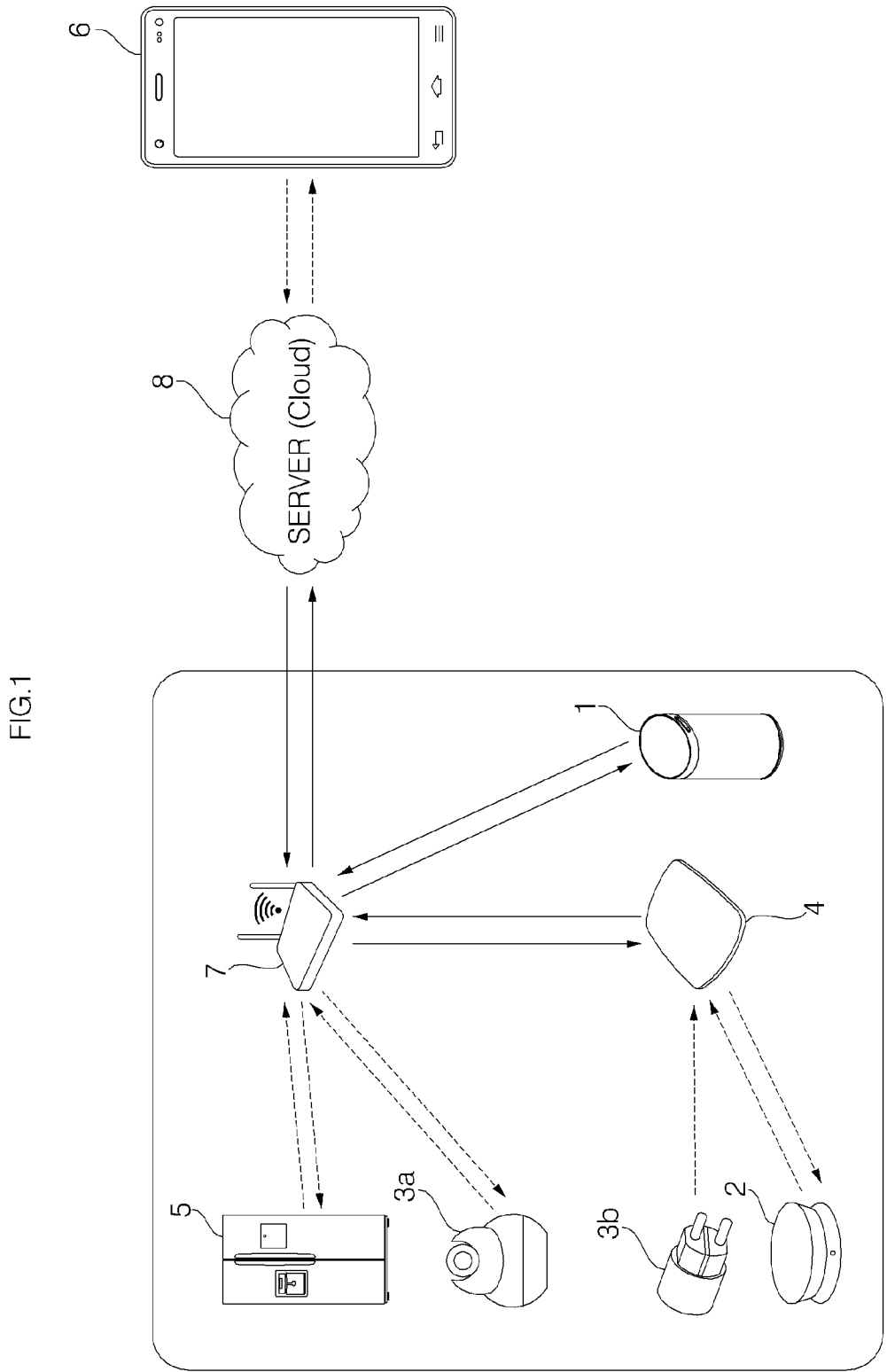
FIG. 1 is a diagram illustrating a network system according to an embodiment of the present invention.

Hereinafter, embodiments of the present invention will be described in detail with reference to the accompanying drawings. While the invention will be described in conjunction with exemplary embodiments, it will be understood that the present description is not intended to limit the invention to the exemplary embodiments.

In the drawings, in order to clearly and briefly describe the invention, parts which are not related to the description will be omitted and, like reference numerals refer to like elements throughout.

In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other.

FIG. 1 is a diagram illustrating a network system according to an embodiment of the present invention.

The network system is a group of devices communicating in a specific space, such as a house or an office, to thereby construct a network. As an example of the network system, FIG. 1 shows a home network system established at home.

Hereinafter, an apparatus 1 is described as a voice recognition apparatus (Hub) 1 for a communication network with a sound outputting function, but aspects of the present invention are not limited thereto. Depending on a perspective, the apparatus 1 may refer to a sound outputting apparatus.

Referring to FIG. 1, the network system according to an embodiment of the present invention may include accessories 2, 3a, and 3b, a gateway 4, an Access Point (AP) 7, and the voice recognition apparatus 1 or a sound outputting apparatus.

The accessories 2, 3a, and 3b, the gateway 4, the AP 7, and/or the voice recognition apparatus 1 are enabled to communicate with each other according to a preset protocol, and such communication may be performed based on technologies such as Wi-Fi, Ethernet, Zigbee, Z-wave, Bluetooth, etc.

Wi-Fi is originally the brand name of Wi-Fi Alliance, but now it is commonly used to refer to a wireless communication technology. Wi-Fi refers to a series of technologies that supports WLAN connection between devices, WLAN connection between device connections (Wi-Fi P2P), and PAN/LAN/WAN configuration according to a standard defined in IEEE 802.11. Hereinafter a "Wi-Fi module" will be defined as a device performing wireless communication based on the Wi-Fi technology.

Ethernet is a networking technology according to IEEE 802.3 standard, and it is the most representative standard for LAN hardware, protocol, cable. Ethernet employs the carrier sense multiple access with collision detection (CSMA/CD) technique to transmit data. Hereinafter, an "Ethernet module" will be defined as a device performing communication based on the Ethernet technology.

Zigbee is a wireless network technology for performing communication by configuring a private network using a small-sized low-power digital radio. Zigbee is a communication technology defined by IEEE 802.15. Zigbee is small-sized and inexpensive and consume relatively less power, so it is drawing attentions as a solution of establishing Ubiquitous such as a home network, and is used in short-range communication for a home network and a building and in industrial facilities automation, logistics, human interface, telematics, environment monitoring, military, etc.

A Zigbee protocol consists of a physical layer, a Medial Access Control (MAC) layer, a network layer, and an application layer. The physical layer and the MAC layer of Zigbee are defined by the IEEE 802.15.4 standard.

The Zigbee network layer supports routing and addressing for a tree structure and a mesh structure, and ZigBee Home Automation Public Profile and ZigBee Smart Energy Profile are typically used as an application profile. In addition, the new Zigbee specification RF4CE defines a simple network stack for solution of home appliance remote control and start topology. RF4CE uses 2.4 GHz frequency band and provides encryption using AES-128.

Zigbee is generally used in fields where a long battery life and encryption are required despite a low transmission speed. Zigbee is appropriate for data transmission which is periodic or intermittent data transmission or simple signal transmission of a sensor and an input device. Zigbee is applied to a wireless lighting switch, a home electronic power system, a traffic management system, and any other private or industrial device which requires short-range low-speed communication. Zigbee is more simple and inexpensive than other WPAN technologies, such as Bluetooth and Wi-Fi. Hereinafter, a "Zigbee module" will be defined as a device performing wireless communication based on the Zigbee technology.

Z-wave is a wireless transmission technology designed for a device which requires low power and a low bandwidth, such as home automation and sensor network. Z-wave primarily aims to provide reliable communication between one or more nodes and a control unit on a wireless network. Z-wave consists of a physical layer, an MAC layer, a transmission layer, a routing layer, and an application layer, and uses 2.4 GHz bandwidth while providing speed of 9.6 kbps, 40 kbps, and 200 kbps. Hereinafter, a "Z-wave module" will be defined as a device performing wireless communication based on the Z-wave technology.

The accessary 2 may be installed at any position desired by a user, and ma be provided with a variety of sensors, such as a temperature sensor, a humidity sensor, a vibration sensor, a proximity sensor, an Infrared (IR) sensor, etc. Information acquired by the sensors may be transmitted to the voice recognition apparatus 1 via a network, and, inversely, a signal for controlling the sensors may be transmitted from the voice recognition apparatus 1 to the accessary 2.

In addition, the accessary 2 may be enabled to perform remote control of a nearby home appliance. For example, the accessary 2 may include a transmitting device that transmits an infrared signal in accordance with a control signal transmitted via a network.

Meanwhile, the IR sensor may include a transmitter which emits an infrared ray, and a receiver which receives a reflected IR ray as a result of reflection of the IR ray emitted from the transmitter by an object.

The AP 7 is a device which plays a relay role so that a wireless device is connected to a network, and the AP 7 connects a home network to the Internet. The home appliance 5, the voice recognition apparatus 1, the accessary 3*b*, etc. may be connected to the AP 7 in a wired manner (e.g., Ethernet) or in a wireless manner (e.g., Wi-Fi).

The gateway 4 is a device connecting different protocol-based networks so as to exchange information with each other. For example, by converting a Zigbee (or Z-wave) signal received from the accessary 2 or 3*b* into a Wi-Fi signal, the gateway 4 may relay the accessary 2 or 3*b* and the AP 7.

Meanwhile, the home network system may access the Internet via the AP 7, thereby accessing a server 8 which provides a service via the Internet. The server (or Cloud) 8 may be managed by a manufacturer of the accessary 2, 3*a*, or 3*b* and/or the voice recognition apparatus 1, a seller, or a service provider in contract with the manufacturer or the seller. The server 8 may store software and data, and the data may be received from a home network. In response to a request from the voice recognition apparatus 1, the server 8 may transmit the stored software or data to the home network via the Internet.

The server 8 may exchange information even with a personal computer (PC) accessing the Internet and a mobile terminal, such as a smart phone. Information transmitted from the voice recognition apparatus 1 or the accessary 2, 3*a*, or 3*b* may be stored in the server 8, and the information may be transmitted to a mobile terminal 6 connected with the server 8. In addition, even information transmitted from the mobile terminal 6 may be transmitted to the voice recognition apparatus 1 or the accessary 2, 31, or 3*b* via the server 8, and therefore, the voice recognition apparatus 1 or the accessary 2, 31, or 3*b* may be controlled using the mobile terminal 6.

A smart phone, which is a kind of the mobile terminal 6 and recently widely used, provides graphic-based convenient UI, so it is possible to control the accessary 2, 3*a*, or 3*b* through the UI or process and display information received from the accessary 2, 3*a*, or 3*b*. In addition, by updating an application embedded in the smart phone, a function able to be implemented using the accessary 2, 3*a*, or 3*b* may be expanded or changed. However, controlling the accessary 2, 3*a*, or 3*b* or processing and displaying information received from the accessary 2, 3*a*, or 3*b* are possible simply by the voice recognition apparatus, even without using the mobile terminal 6.

The voice recognition apparatus 1 and the accessories 2, 3*a*, and 3*b* may communicate with each other via the gateway 4 and the AP 7. Specifically, a signal output from the accessary 2 or 3*b* may transmitted to the voice recognition apparatus 1 after passing through the gateway 4 and the AP 7 in order. On the contrary, information output from the voice recognition apparatus 1 may be transmitted to the accessary 2 or 3*b* after passing through the AP 7 and the gateway 4 in order. In some implementations, communication between the accessories 2, 3*a*, and 3*b* and the voice recognition apparatus 1 may be possible even when a network is disconnected from the Internet.

Apart from the aforementioned accessories 2, 3*a*, and 3*b*, various kinds of accessories may be provided. For example, accessories may be an air quality sensor sensing an air quality, a smart plug, a CT sensor, a nest temperature adjusting device, a sleep sensor, etc.

An accessary may be attached to a home appliance 5. For example, an accessary having a vibration sensor may be attached to a washing machine to sense vibration during operation of the washing machine, and a signal output from the vibration sensor due to sensed vibration may be transmitted to a network.

In addition, an accessary may be attached in a space other than the home appliance 5. For example, to sense opening and closing of a door at home, an accessary having a movement sensing sensor (e.g., an IR sensor) may be attached to a wall to sense opening and closing of the door. If opening and closing of the door at home has not been sensed for a long time, there may be a problem with a resident, and such information may be transmitted to a preset mobile terminal 6.

Furthermore, an accessary having the movement sensing sensor is attached to sense opening and closing of a refrigerant door, and, if opening and closing of the refrigerant door has not been sensed for a long time, there may be a problem with a resident, and such information may be transmitted to a preset mobile terminal 6.

In the above various embodiments, a signal transmitted from an accessary via a network may be received by the mobile terminal 6, and an application embedded in the mobile terminal 6 may analyze the received signal and identify operation state (e.g., unbalancing of a washing machine) or door opening/closing information of the home appliance 5. Then, the information or a result obtained by processing the information (e.g., an alarm notifying abnormal operation of the washing machine, or a notification of the need of checking safety of a resident as a door has not been opened for a long time) may be output through a display or speaker of the mobile terminal 6.

Meanwhile, the voice recognition apparatus 1 may include a microphone (not shown), extract a command from a voice, input through the microphone, based on the embedded voice recognition program, and performs control in accordance with the command.

Figure 2:
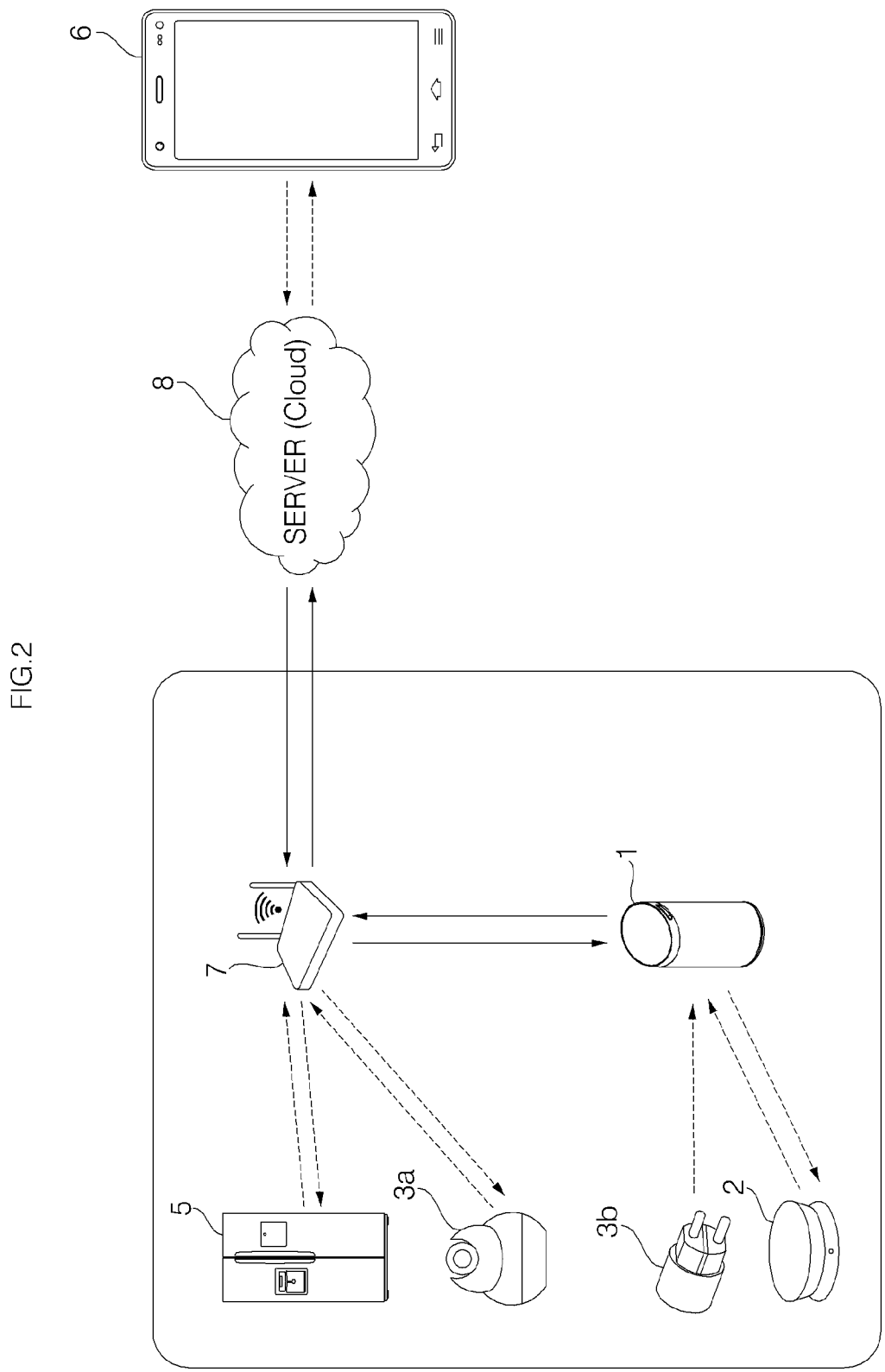
FIG. 2 is a diagram illustrating a home network system according to another embodiment of the present invention.

FIG. 2 is a diagram illustrating a home network system according to another embodiment of the present invention.

The home network system according to another embodiment of the present invention is different from the above-described embodiment in that the gateway is not provide 4 and the function of the gateway 4 is performed by the voice recognition apparatus 1, and other features are substantially identical to those of the above-described embodiment.

Accessories 2 and 3 may communicate directly with the voice recognition apparatus 2 without bypassing the gateway (see FIG. 1). Preferably, the accessories 2 and 3b may communicate with the voice recognition apparatus 1 based on the Zigbee technology, and, in this case, the accessories 2 and 3b and the voice recognition apparatus 1 may be respectively provided with Zigbee modules.

Figure 3:
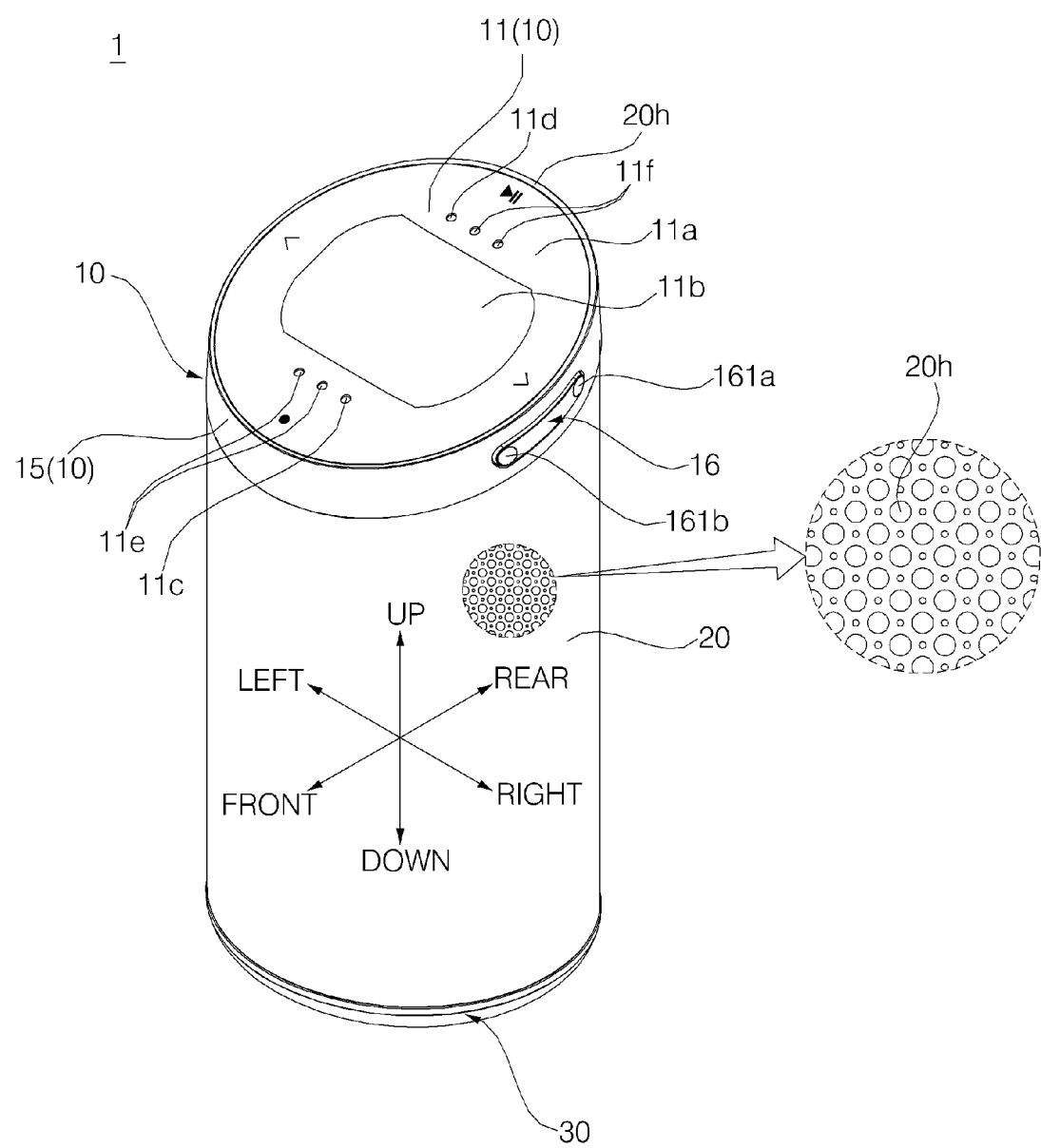
FIG. 3 is a perspective view of a voice recognition apparatus according to an embodiment of the present invention.
Figure 4:
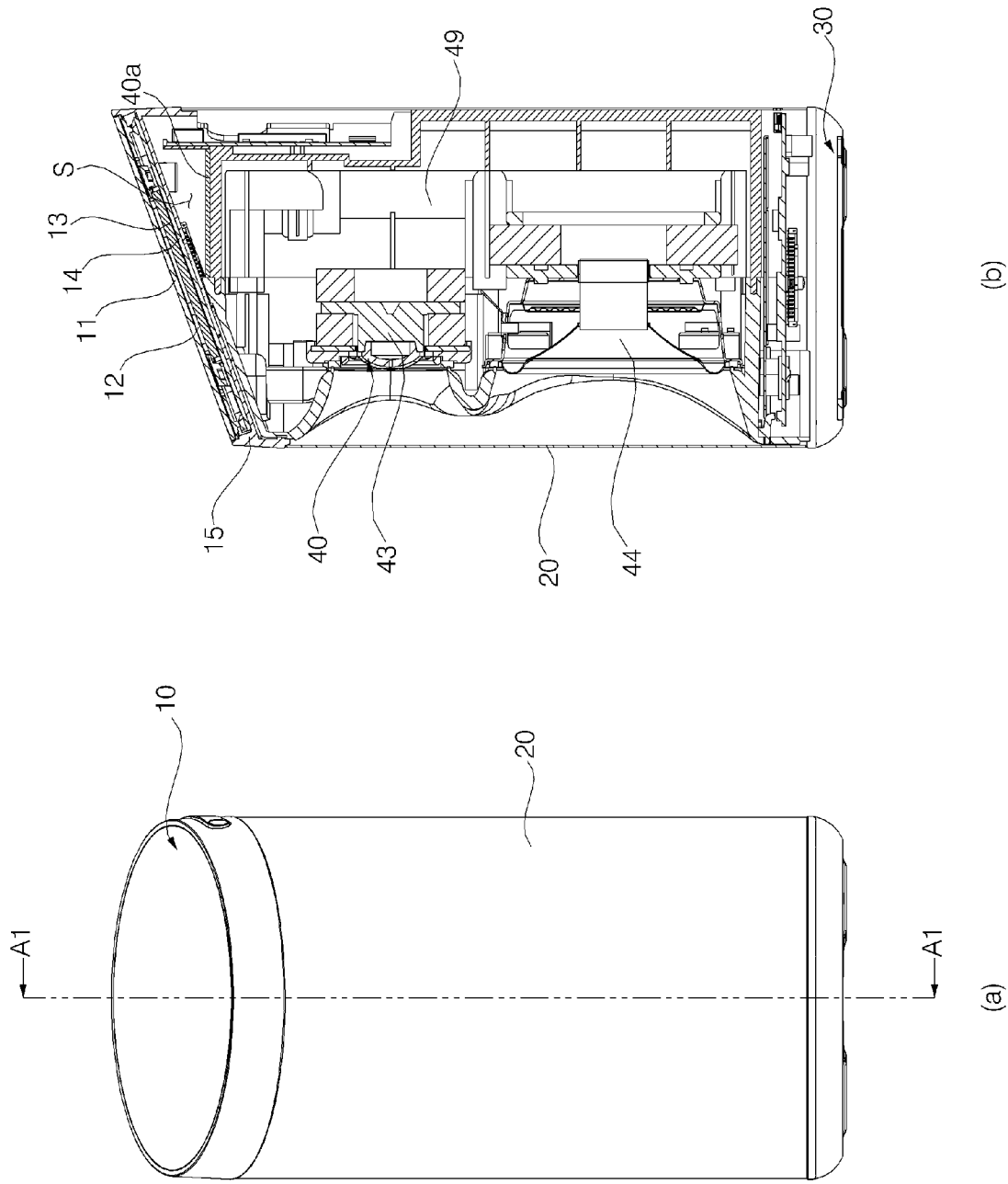
FIG. 4 shows a front view (a) of a voice recognition apparatus and a cross-sectional view (b) cut along A1-A1 shown in (a)
Figure 5:
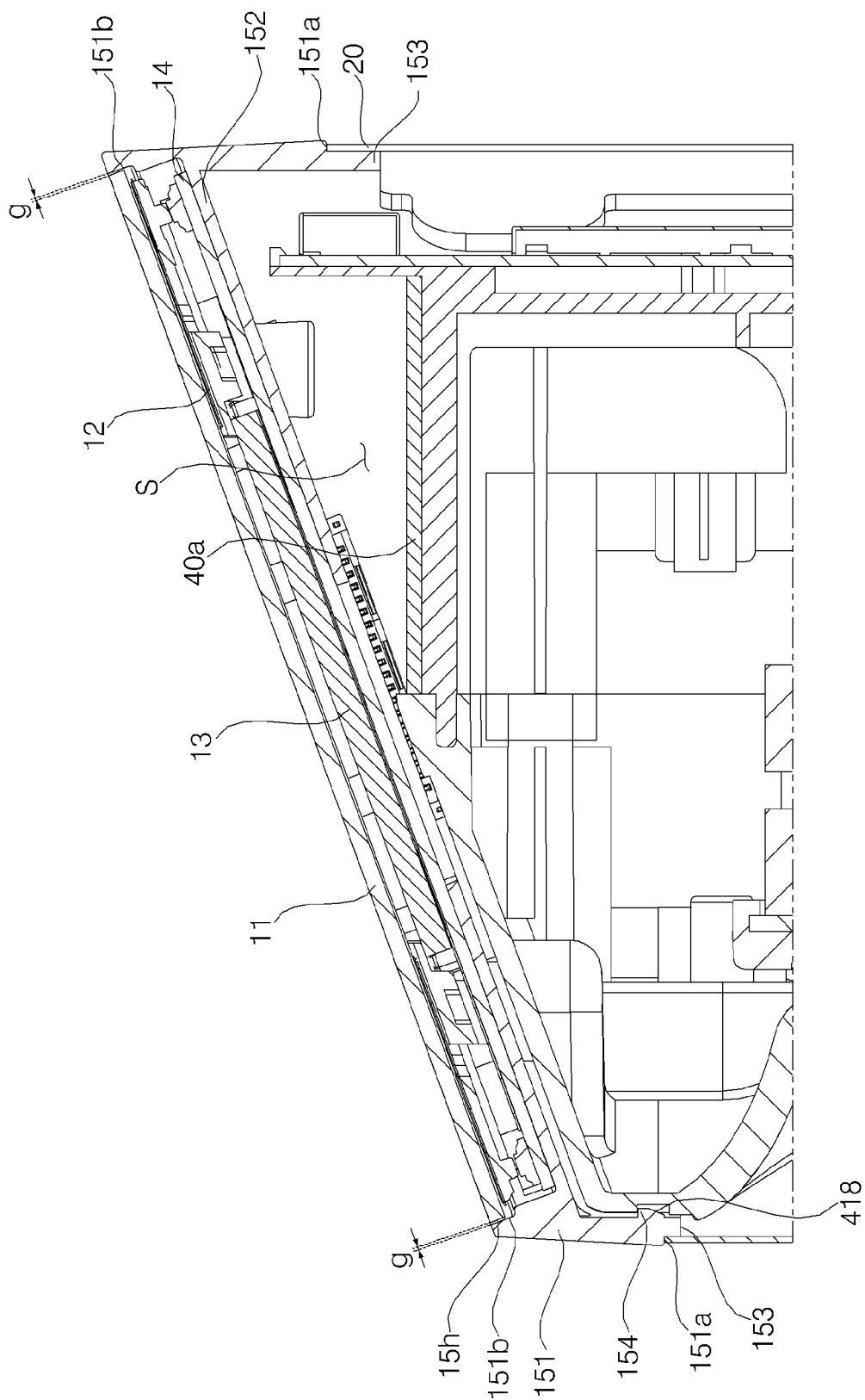
FIG. 5 is an enlarged view of one portion of FIG. 4.
Figure 6A:
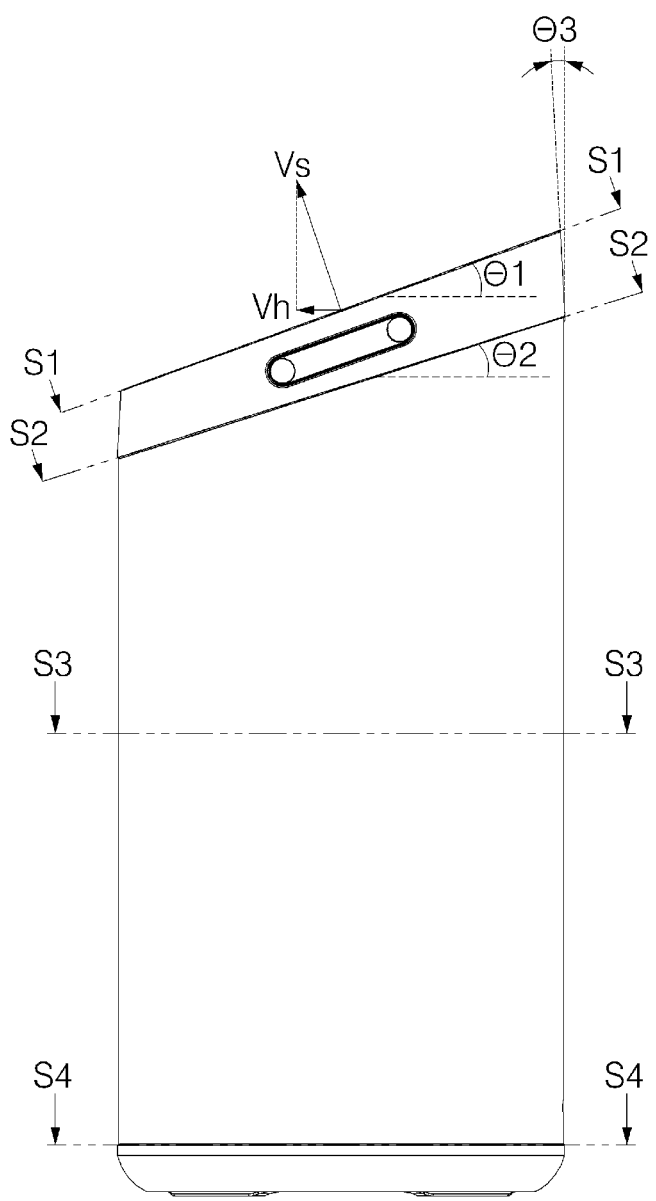
FIG. 6A is a right side view of a voice recognition apparatus.
Figure 6B:
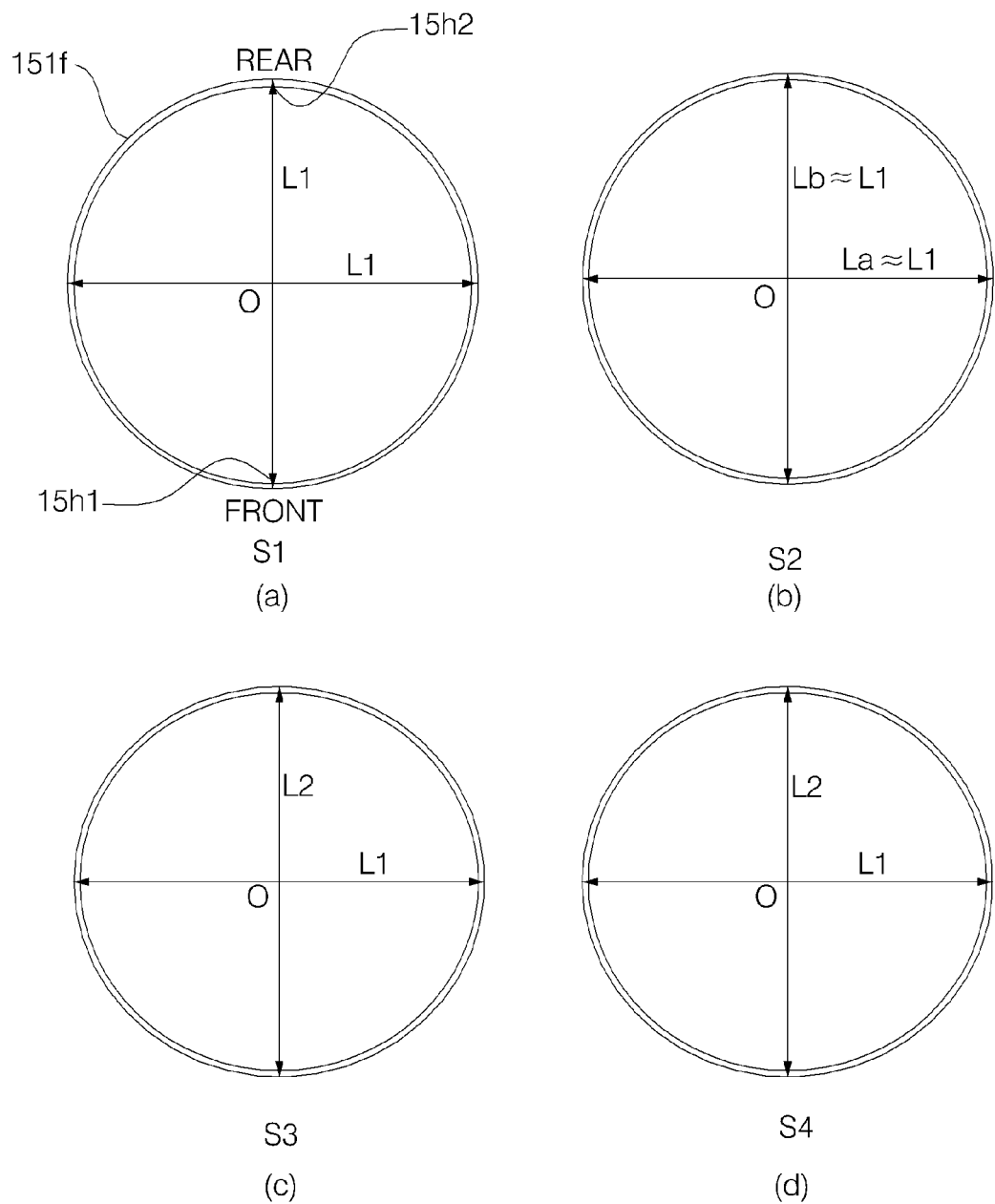
FIG. 6B are cross-sectional view of a grill viewed from each point indicated in FIG. 6A.
Figure 8:
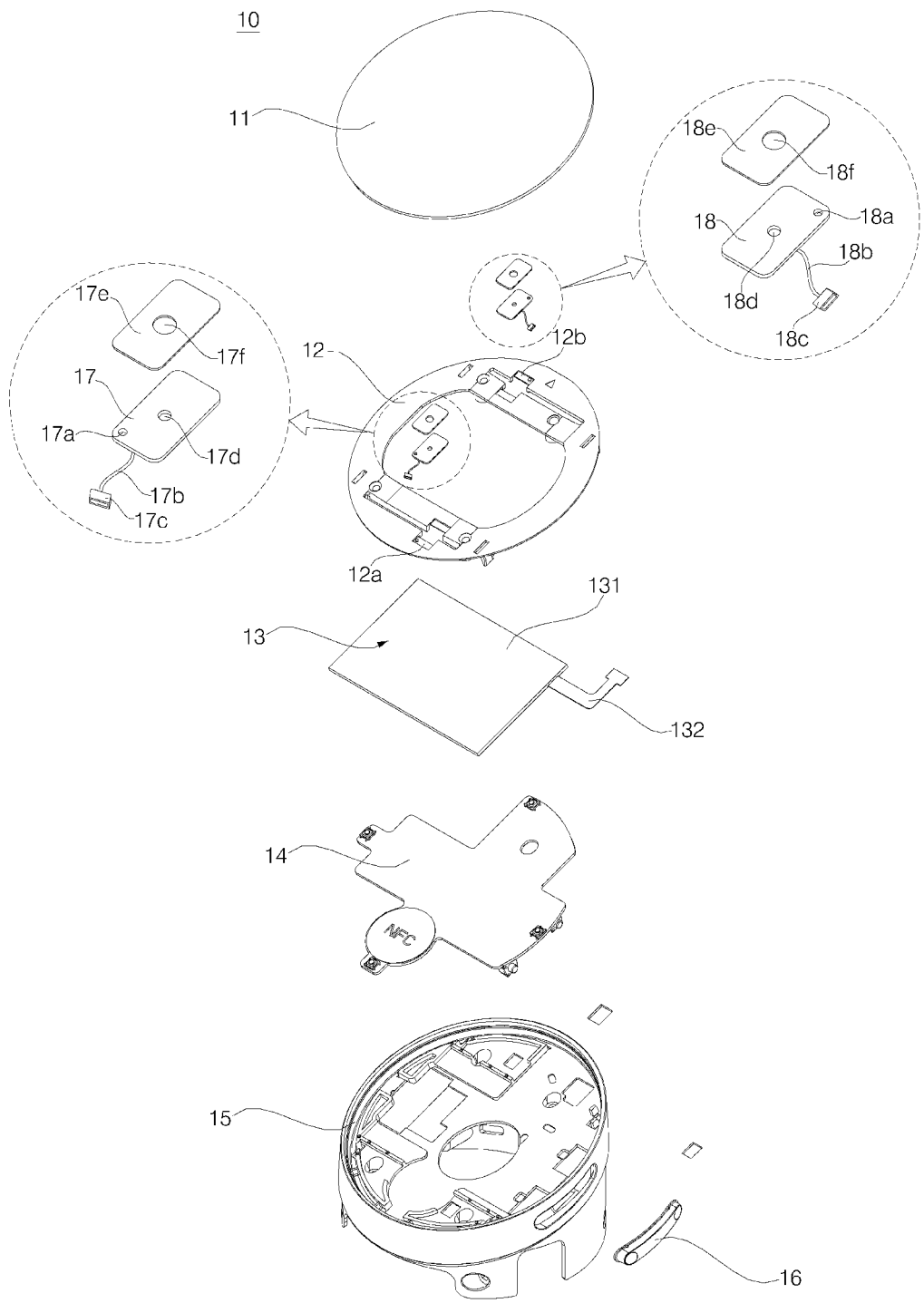
FIG. 8 is an exploded perspective view of a cover.
Figure 9:
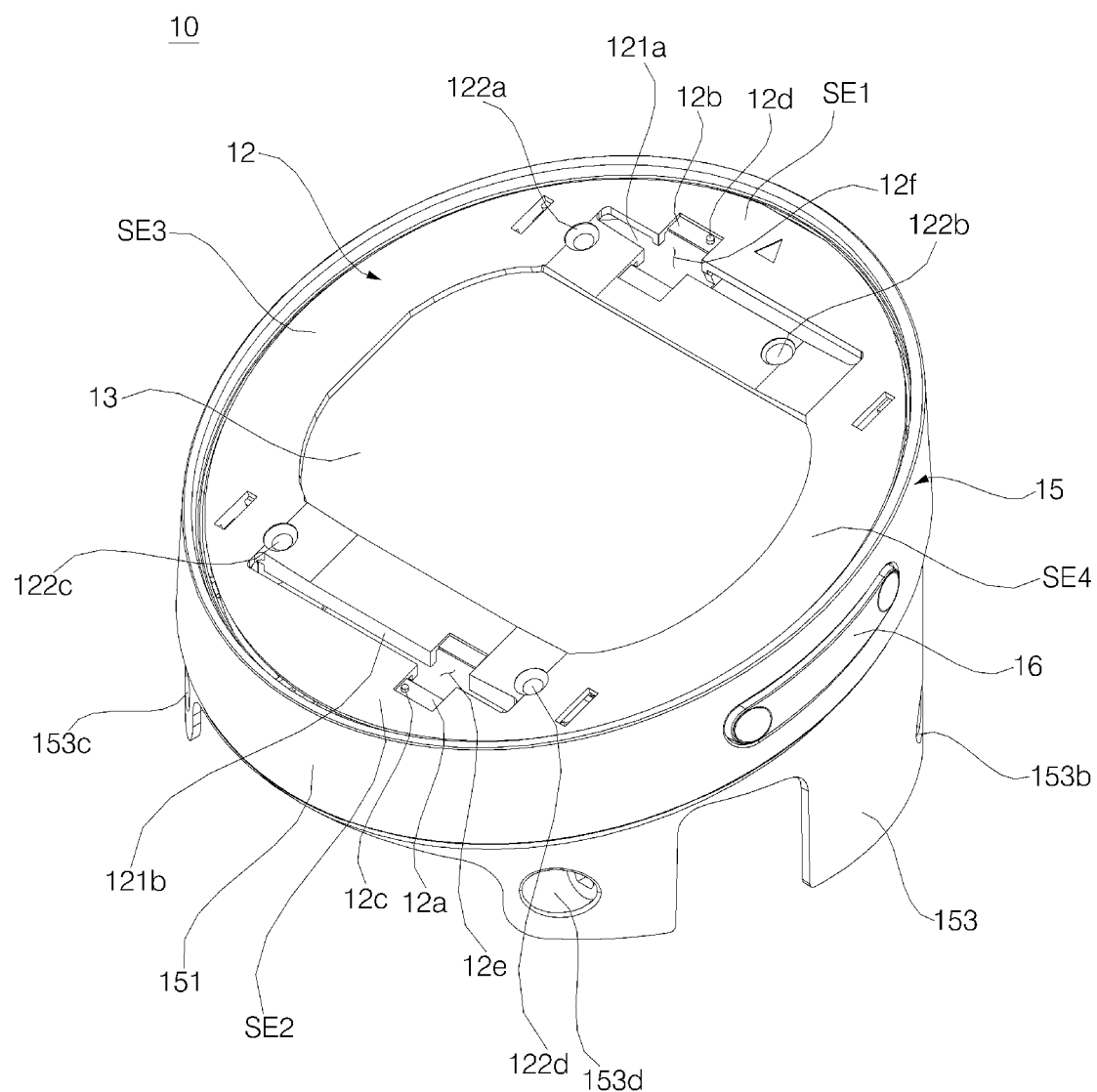
FIG. 9 shows a cover from which a window is removed.
Figure 10:
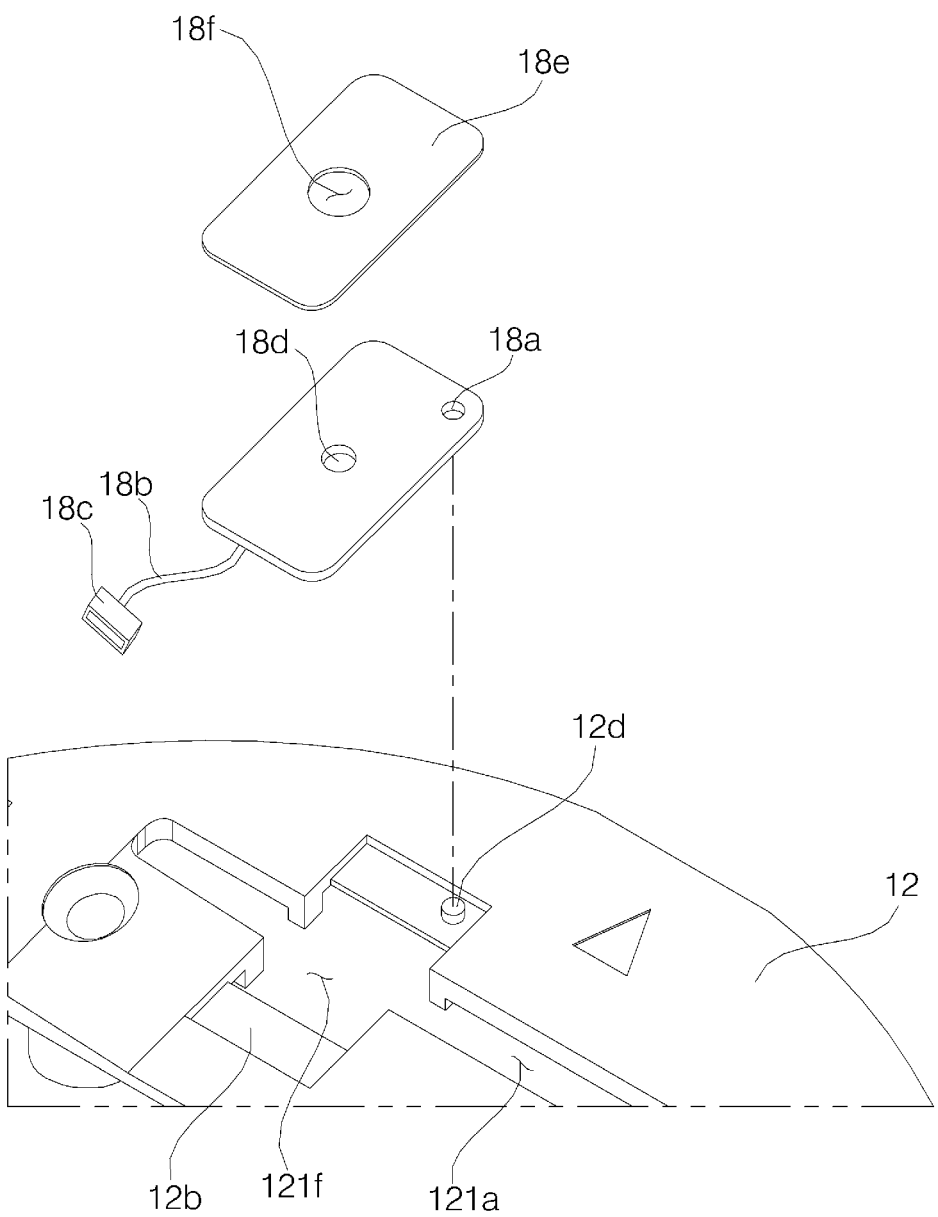
FIG. 10 is an exploded view of the case where a voice input PCB is yet to be coupled to a window support.
Figure 11:
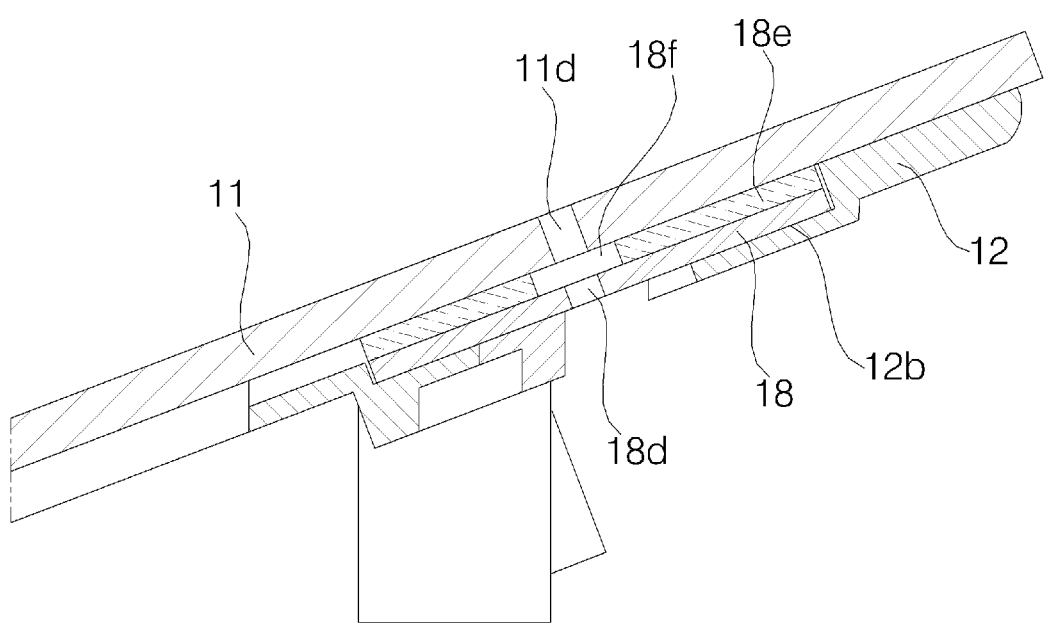
FIG. 11 is a cross-sectional view of the case where a voice input PCB is coupled to a window support.

FIG. 3 is a perspective view of a voice recognition apparatus according to an embodiment of the present invention. FIG. 4 shows a front view (a) of a voice recognition apparatus and a cross-sectional view (b) cut along A1-A1 shown in (a). FIG. 5 is an enlarged view of one portion of FIG. 4. FIG. 6A is a right side view of a voice recognition apparatus. FIG. 6B are cross-sectional view of a grill viewed from each point indicated in FIG. 6A. FIG. 7 is a block diagram illustrating control relationship between major components of a voice recognition apparatus. FIG. 8 is an exploded perspective view of a cover. FIG. 9 shows a cover from which a window is removed. FIG. 10 is an exploded view of the case where a voice input PCB is yet to be coupled to a window support. FIG. 11 is a cross-sectional view of the case where a voice input PCB is coupled to a window support.

Referring to FIGS. 3 to 11, a voice recognition apparatus (or the voice recognition apparatus 1) according to an embodiment of the present invention may include a cover 10, a main body 40, a grill 20, and a base 30. The main body may be supported by the base positioned at the bottom, and the cover 10 may be coupled to the top of the main body 40.

The main body 40 is provided inside the grill 20. The whole main body 40 is not necessarily provided inside the grill 20, and, as shown in the embodiment, a portion of the main body 40 may protrude through an upper end of the grill 20. The grill 20 is provided with a plurality of through-holes 20h, is formed in a vertically long cylindrical shape, and surrounds the main body 40.

An porous filter (not shown) may be attached to an inner side of the grill 20 so that dust is prevented from flowing into the inside of the grill 20 through the through-holes 20h. The filter may be formed of a material having tiny holes, such as mesh or non woven fabrics. The filter may be attached to an inner surface of the grill 20 by an adhesive member such as double-side tape. The filter also helps prevent components, such as speakers 43 and 44 provided inside the grill 20 and main body cases 41 and 42, from being seen from the outside through the through-holes 20h.

Meanwhile, FIG. 3 shows the case where a through-hole 20h is formed at a portion of the grill 20 and omitted in other portions, but this is merely an illustration for convenience of the drawing. The through-hole 20h may be formed in most parts of the grill 20 so that sound output from the speakers 43 and 44 which will be described later can evenly spread in the leftward, rightward, frontward, and rearward directions through the through-holes 20h.

The cover 10 may include a window 11, a window support 12, a display 13, a display Printed Circuit Board (PCB) 14, and a cover housing 15. The window 11, the window support 12, the display 13, and the display PCB 14 may be provided inside the cover housing 15.

Referring to FIGS. 4 and 5, the cover housing 15 is formed of syntactic resin and coupled to the upper side of the main body 40, and has an opening 15H formed in an upper surface of the cover housing 15. The cover housing 15 is formed in a cylindrical shape, and the upper part of the cover housing 15 may include a side wall 151 defining the opening 15h, and a partition 152 that extends from an inner surface of the side wall 151 to partition the inside of the side wall 151 vertically. The display PCB 14, the display 13, the window support 12, and the window 11 are disposed above the partition 152 (for more detailed configuration of the cover housing 15, see FIGS. 21 and 22).

An upper end 151a of the side wall 151 is in contact with the upper end of the grill 20, but there may be a clearance between the upper end 151a of the side wall 151 and the upper end of the grill 20. As viewed from above, at least part of the lower end 151a of the side wall 151 overlaps the upper end of the grill 20. There is clearance between an outside surface of the side wall 151 and an outer surface of the grill 20, but, except the clearance, the outer surface of the side wall 151 and the outer surface of the grill 20 form one integrated appearance.

An upper end holder 153 extends downward from the lower end 151 of the side wall 151 to be thereby coupled to the grill 20. Such coupling of the upper end holder 153 and the grill 20 is achieved not by using an additional fastening member, such as a bolt, but using a structure in which the upper end holder 153 is inserted (fitted) inside an opening of the upper end of the grill 20. Preferably, coupling of the upper end holder 153 and the grill 20 is a forced fitting manner using an elastic/restoring force that the grill 20 or the upper end holder 153 has.

The upper end holder 153 is positioned inside more than the lower end of the side wall 151 (that is, the outer surface of the cover housing 15 is recessed at the lower end 151a of the side 2 all 151 to form an outer surface of the upper end holder 153), so a surface 157 may be formed at the lower end of the side wall 151, the surface 157 which extends from the outer surface of the side wall 151 to the upper end holder 153 to oppose the upper end of the grill 20.

The cover housing 15 may have a protrusion 154 protruding from the inner surface of the side wall 151, and a protrusion insertion groove 418 formed at the front surface of the main body 40 and coupled to the protrusion 154. If the protrusion 154 of the main body 40 reaches the protrusion insertion groove 418 while moving along a circumferential surface in the process of assembling the cover housing 15 and the main body 40, the protrusion is inserted into the protrusion insertion groove 418 by an elastic force of the cover housing 15 made of syntactic resin.

As the outer surface of the upper holder 153 is in contact with the inner surface of the grill 20, the shape of the upper end of the grill 20 is maintained. In particular, when the grill 20 is made of a metal material, the grill 20 is deformed in response to a shape of the upper end holder 153, and thus, the upper end of the grill 20 may be maintained in a shape corresponding to the upper end holder 153.

Meanwhile, in the case where the upper end holder 153 extends in an elliptical shape along the lower end 151a of the side wall 151, a metal plate is rolled up to form the cylindrical shape of the grill 20 with a circular-shaped cross section, and, if the upper end of the grill 20 is fitted into the upper end holder 153, the shape of the grill 20 is also changed into an elliptical shape corresponding to the shape of the upper end holder 153 and maintained in the changed shape.

As in the embodiment, in the case where the window having a radius r is inclined at a predetermined angle (which is indicated as θ1 in FIG. 6A, that is, an acute angle, and which is hereinafter referred to as a "first angle") relative to a specific horizontal plane, and a vector Vh, which is obtained by orthogonally projecting a normal vector Vs of an upper surface of the window 11 onto the horizontal plane, faces the forward front, the shape of the window 11 projected onto the horizontal plane becomes an elliptical shape having a short radius r cos θ1 in the front and rear direction and a long radius r in the left and right direction. Thus, for an integrated exterior of the voice recognition apparatus 1, it is desirable that a cross section of the grill 20 is formed in a shape (the form having cos θ1:1 which is a ratio of a short radius to a long radius) corresponding to the elliptical shape. Since the upper end holder 153 is formed in a shape corresponding to the elliptical shape, it is possible to maintain the cross section of the grill 20 in a shape corresponding to the elliptical shape. The expression "shape corresponding to" is defined to indicate not just the case where two figures have a completely identical shape, but also the case where the two figures resembles each other (e.g., the case where a rate of a short radius to a long radius is the same), and the corresponding shape will be hereinafter used with the above meaning.

The angle θ1 at which the window 11 is inclined against the horizontal plane is determined in consideration of a user's gaze in a general use condition. The angle θ1 is determined to allow a gaze of an adult user to be positioned in front of the voice recognition apparatus 1 approximately forms 90° relative to the upper surface of the window 11 when the voice recognition apparatus 1 is placed in a sink, a table, or the like in a kitchen. Preferably, the angle θ1 is determined to form approximately 90° relative to the upper surface of the window 11, and it is desirable that the angle θ1 is approximately 20% but aspects of the present invention are not limited thereto.

Meanwhile, a display panel 131 may be inclined at a specific angle relative to a horizontal plane so that a screen of the display panel 131 is directed toward an upper front side. Preferably, the display panel 131 is inclined at the same angle θ1 as the window 11. A window support plate 121 which will be described later is also inclined at the same angle as that of the display panel 131 (or the window 11).

More specifically, referring to FIGS. 6A to 6D, an upper end of the side wall 151 of the cover housing 15 is formed in a circular shape having an outer diameter L1, and an outer diameter of the lower end 151a of the side wall 151 is inclined at an angle θ2 (θ2<θ1. Hereinafter, θ2 will be described as a "second angle".) relative to a horizontal plane, and therefore, the upper end of the side wall 151 is in a shape having a diameter La in the left and right direction and a diameter Lb in the front and rear direction. In this case, since the outer surface of the side wall 151 is inclined at a predetermined angle θ3, a shape of a cross section S1 orthogonally projected onto a horizontal plane and a shape of a cross section S2 orthogonally projected onto the horizontal plane do not perfectly coincide with each other in FIG. 6. However, if a value of θ3 is sufficiently small (preferably, equal to or smaller than) 5°, La and L1 has approximate values, so, it will be hereinafter assumed that La=L1. Furthermore, if a difference between θ1 and θ2 is sufficiently small, (preferably, equal to or smaller than 5°) Lb also has an approximate value of L1, so it will be hereinafter assumed that Lb=L1.

θ3 indicates an angle of an outer surface of the side wall 151 relative to a vertical line, and θ3 may have a constant value in the entire region of the outer surface of the side wall 151 but it also may vary along the circumference of the side wall 151.

Meanwhile, referring to cross sections S3 and S4 shown in FIG. 6B, an outer diameter of the grill 20 is an ellipse (L1>L2) having a long diameter L1 in the left and right direction and a short diameter L2 in the front rear direction. In this case, as assumed above, if La=L1 and Lb-L1, L2 is L1 cos θ1. That is, an exterior shape of the grill 20 orthogonally projected onto the horizontal plane is an ellipse with the diameter L2 in the front and rear direction shorter than the diameter L1 in the left and right direction. Although the window 11 is inclined, the voice recognition apparatus 1 has an elliptical shape, as viewed from above, and seemed to have an integrated exterior The side wall 151 is disposed in the upper side of the grill 20 and thus defines the exterior appearance of the voice recognition apparatus 1, but the upper end holder 153 is fully recessed inward of the grill 20 and thus hidden by the grill 20 so the upper end holder 153 is viewed at all on the exterior appearance of the voice recognition apparatus 1.

A position setting protrusion 156 (see FIG. 23) may protrude from the lower end of the side wall 151, and a position setting groove may be formed at the upper end of the grill 20 to allow the position setting protrusion inserted thereinto when the grill 20 is in right place.

The window 11 may be disposed inside the opening 15h of the cover housing 15. The window 11 is a processed transparent plate of constant thickness, and a side surface (or a circumferential surface) of the window 11 is orthogonal to an upper surface and a lower surface thereof.

An inner surface of the cover housing 15 has a specific portion 151b extending from the upper end of the cover housing 15 and being parallel to a direction (that is, a direction in which the normal vector Vs in directed in FIG. 6A) which the upper surface of the window 11 faces. The upper end inner surface 151a of the side wall 151 defines the opening 15h, and thus, the upper end inner surface 151b of the side wall 151 is referred to as an opening defining surface. The opening defining surface 151b is in the form of a cylindrical shape extending from the circumference of the opening 15h, and the window 11 is disposed the inside surrounded by the opening defining surface 151b. Preferably, the upper surface of the window 11 belongs to the same plane (or a plane to which the opening 15h belongs) as a plane to which the upper end of the cover housing 15 belongs, and therefore, the upper surface of the voice recognition apparatus 1 may seemingly have one integrated plane.

The opening defining surface 151b is composed of a surface which is parallel to the vector Vs at any position. That is, even in the case where the cover housing 15 is cut by an arbitrary plane parallel to the vector Vs, the opening defining surface 151b is parallel to the vector Vs on a cross section.

Since the opening defining surface 151b and the side surface of the window 11 are parallel to each other, the entire region of the side surface of the window 11 may be maintained with a predetermined gap g from the opening defining surface 151b when the center of the window 11 and the center of the opening defining surface 151b are aligned along the vector Vs. This means that, when the voice recognition apparatus 1 is viewed from above, the predetermined gap g is maintained between the window 11 and the upper end of the cover housing 15, and this provides impression of a high product quality. The gap g may be set to a minimum value in a condition in which the side surface is not interfered with the opening defining surface 151b when the window 11 is pressed to operate contact switches 181a, 181b, 181c, and 181d.

In the case where the cover housing 15 is cut along an arbitrary vertical plane, an outer surface of the side wall 151 may be, on the cut-off surface, parallel to the normal vector Vs or may be distal from the vector Vs at a lower end. In a process of injection molding the cover housing 15, the cover housing 15 is ejected in a vertically downward direction from a first mold defining the side wall 151. For the cover housing 15 to be easily ejected from the first mold, the outer surface of the side wall 151 needs to have the above-described shape.

On the contrary, in order to form the opening 15H in the upper surface of the cover housing 15, a second mold having a core, which is to be inserted into the opening 15h, is needed. By moving the second mold when the first mold is removed, the cover housing 15 may be separated from the second mold, and, in this case, the second mold is moved in the same direction as the normal vector Vs.

Figure 12A:
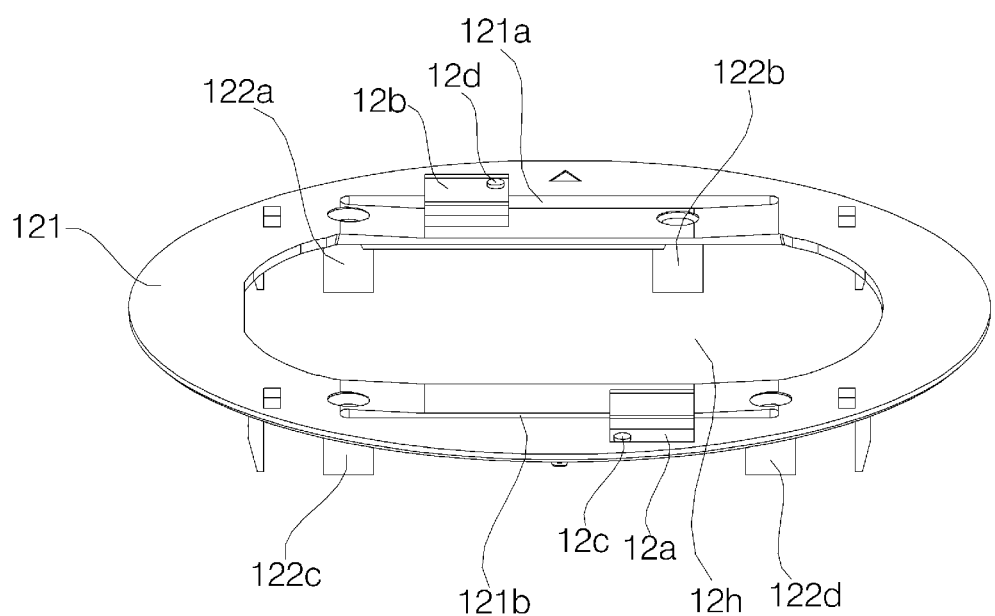
FIG. 12A is a perspective view showing an upper surface of a window support.
Figure 12B:
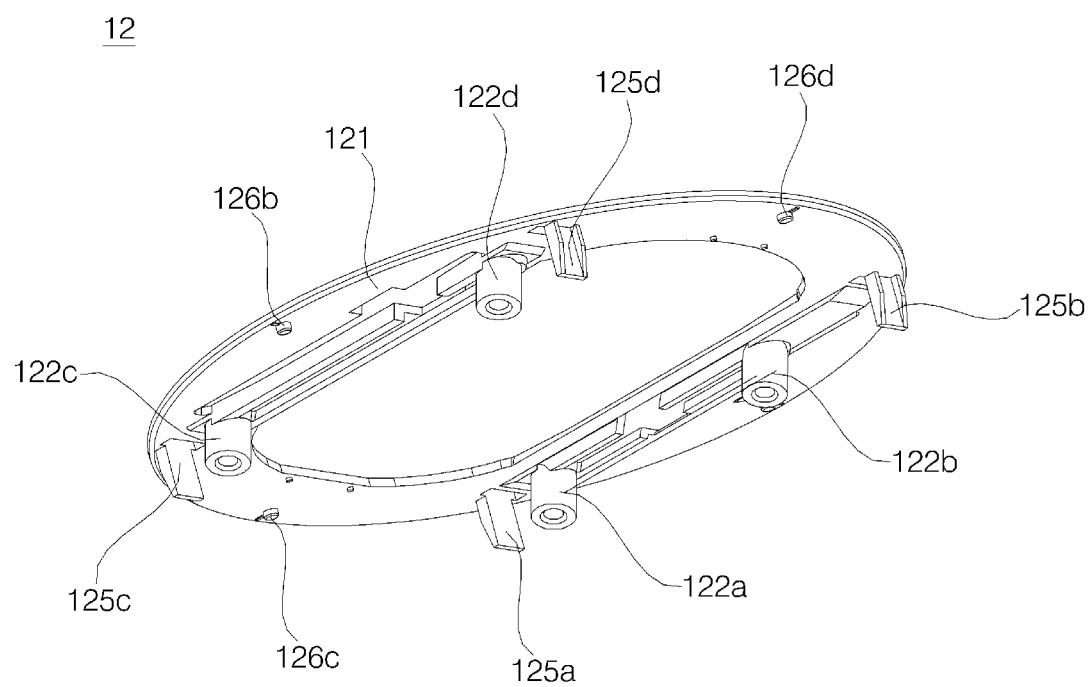
FIG. 12B is a perspective view showing a bottom surface of a window support.
Figure 12C:
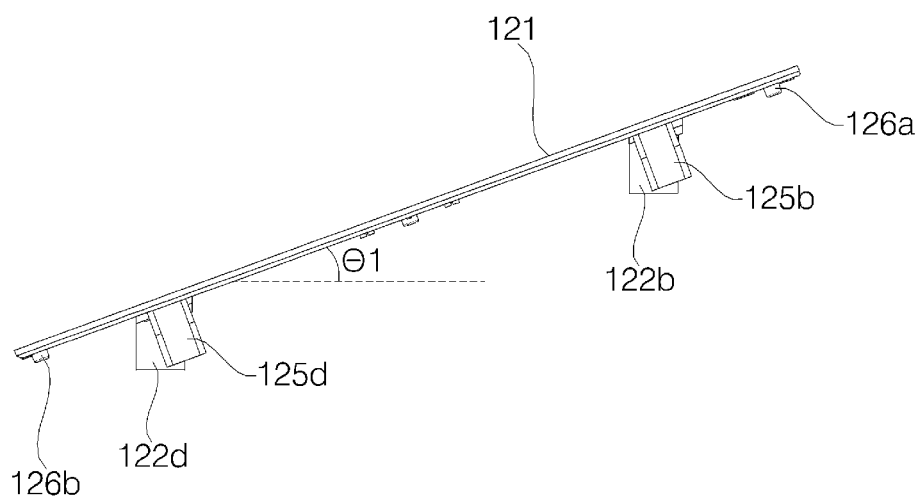
FIG. 12C is a right side view of a window support.
Figure 12D:
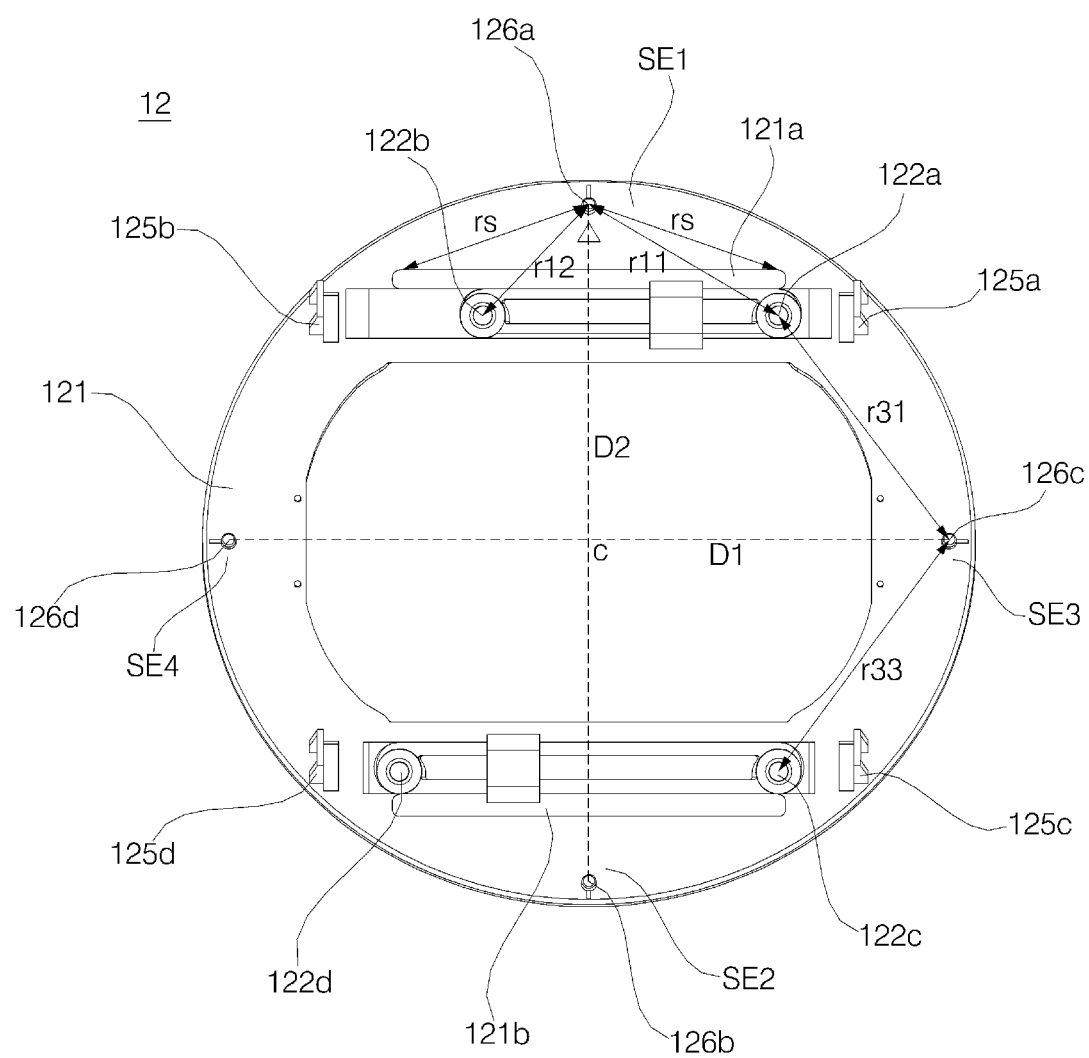
FIG. 12D is a bottom view of a window support.
Figure 13:
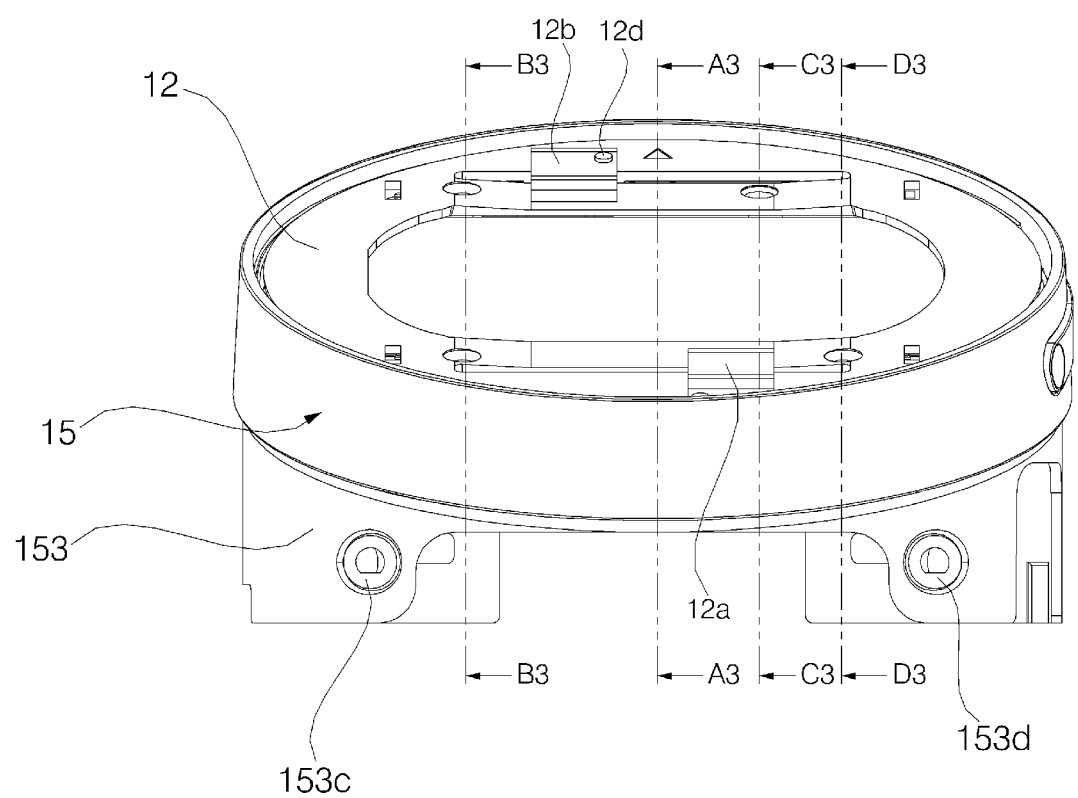
FIG. 13 shows a front side of a cover shown in FIG. 9.
Figure 14A:
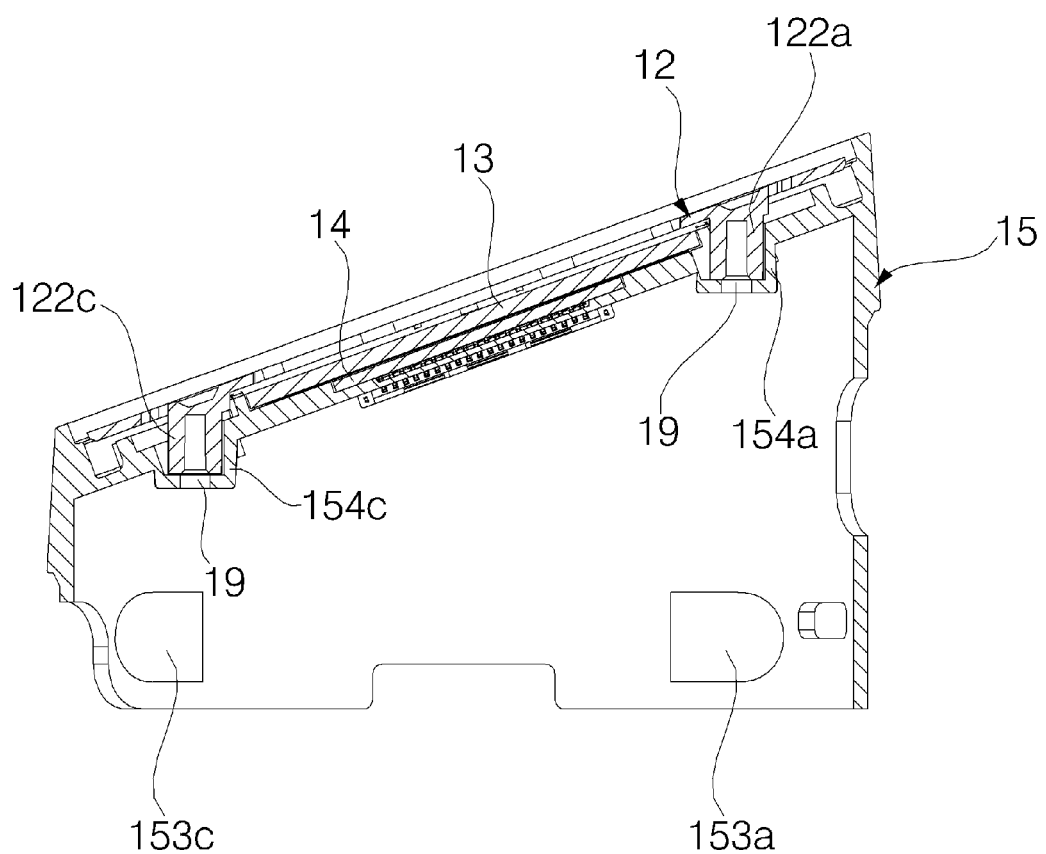
FIG. 14A is a cross-sectional view cut along B3-B3 shown in FIG. 13.
Figure 14B:
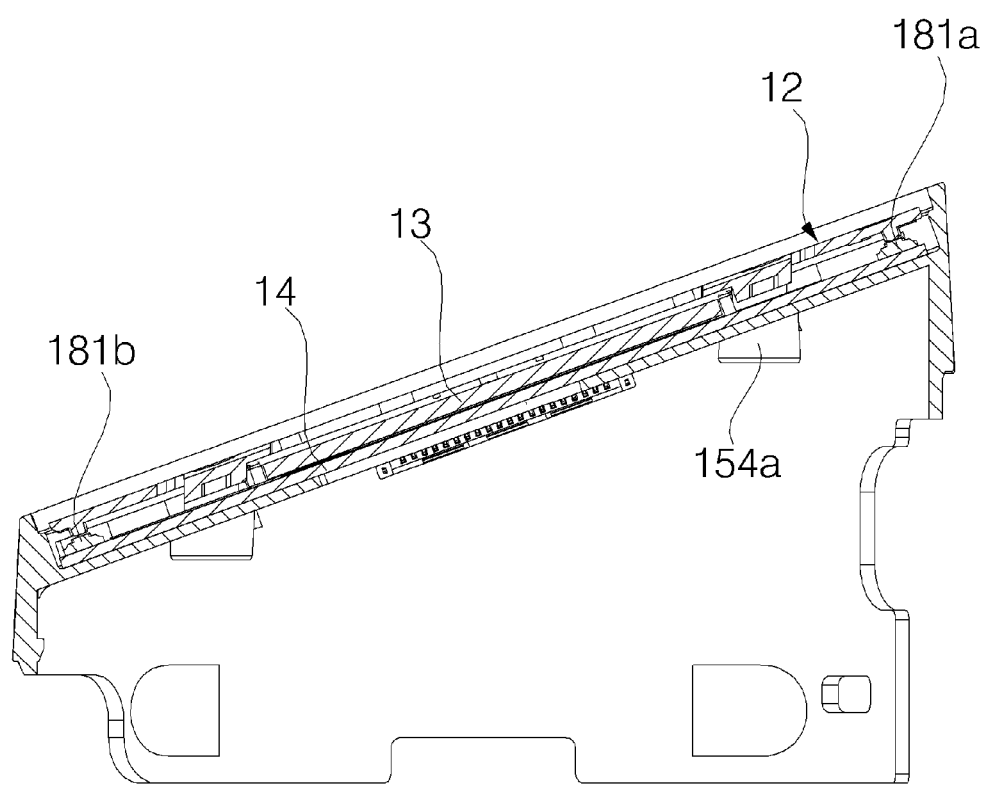
FIG. 14B is a cross-sectional view cut along A3-A3 shown in FIG. 13.
Figure 14C:
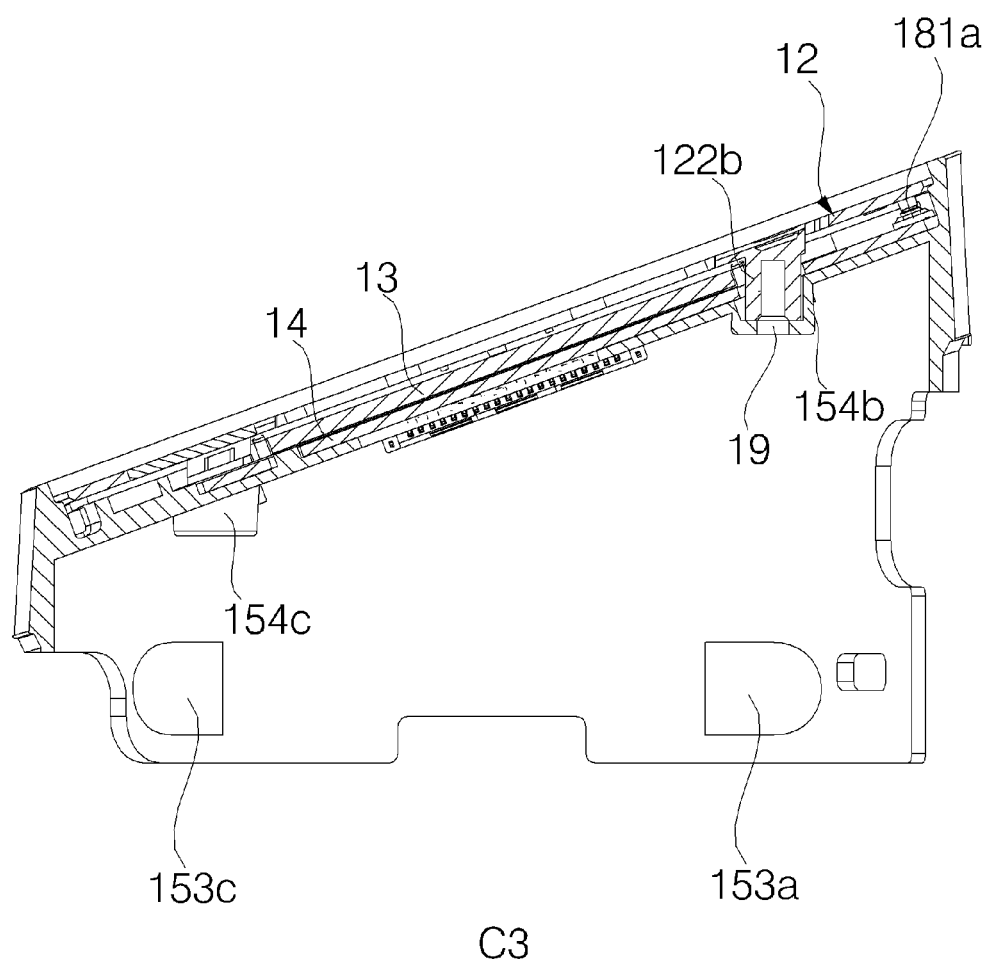
FIG. 14C is a cross-sectional view cut along C3-C3 shown in FIG. 13.
Figure 14D:
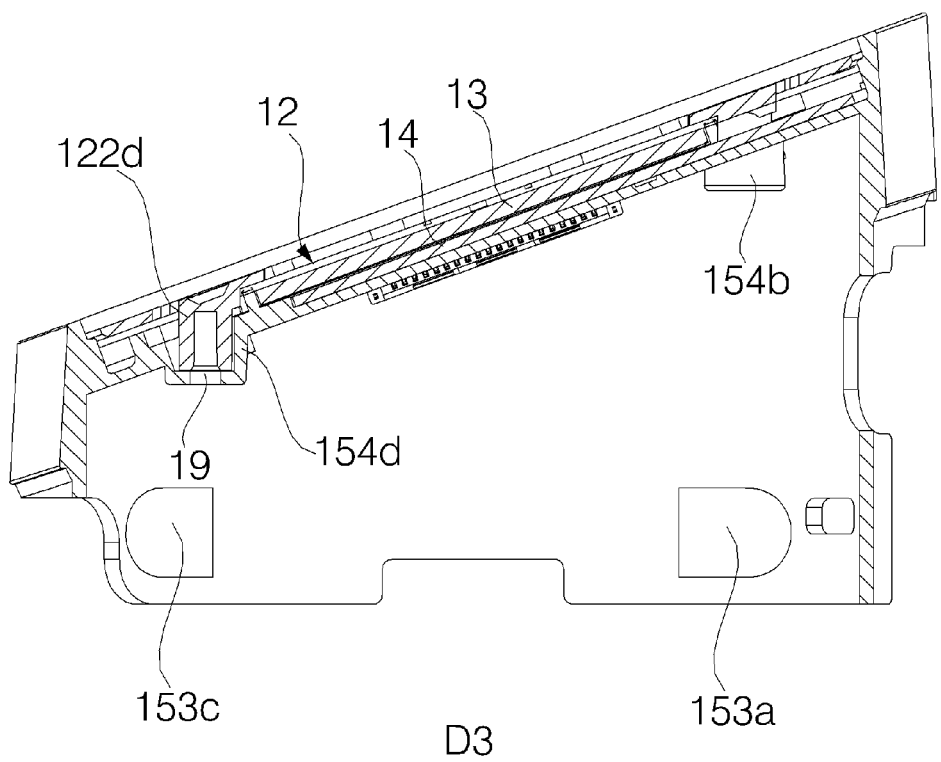
FIG. 14D is a cross-sectional view cut along D3-D3 shown in FIG. 13.
Figure 15:
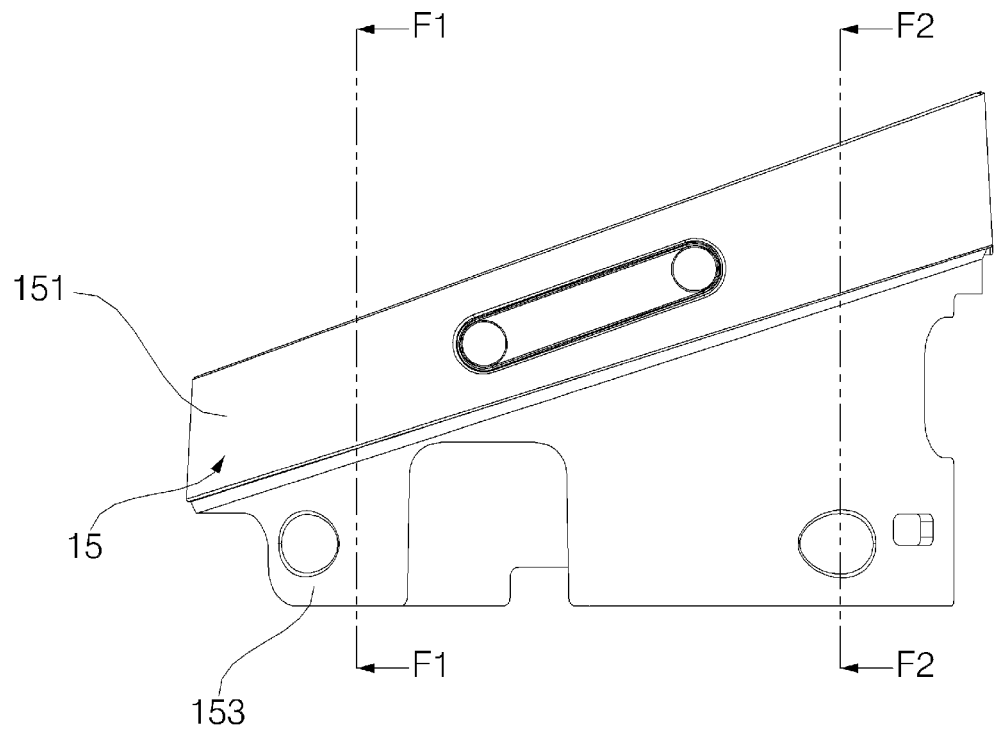
FIG. 15 is a right side view of a cover.
Figure 16A:
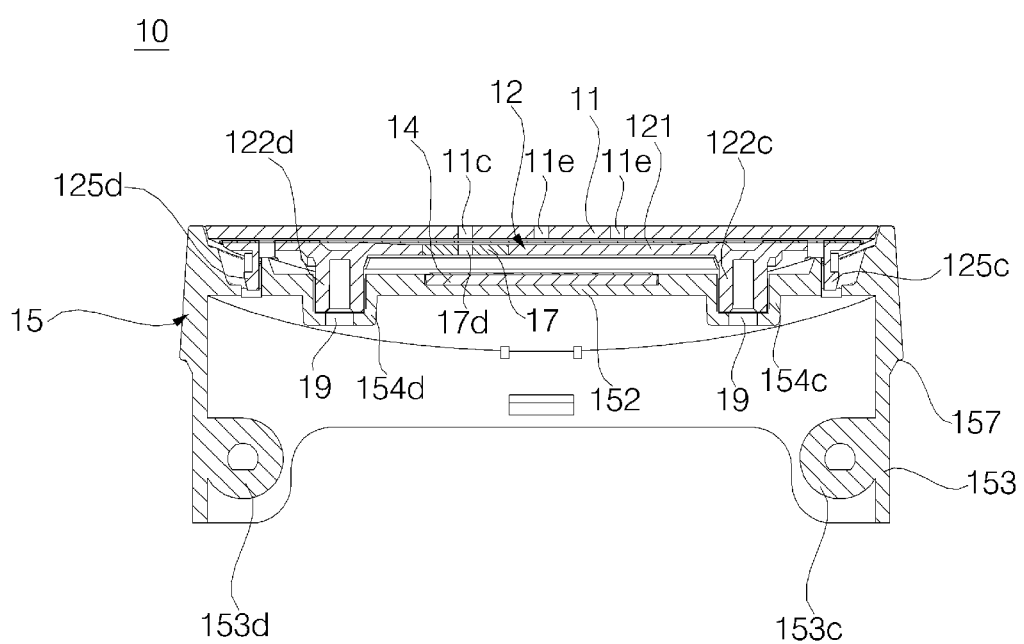
FIG. 16A is a cross-sectional view cut along F1-F1 shown in FIG. 15.
Figure 16B:
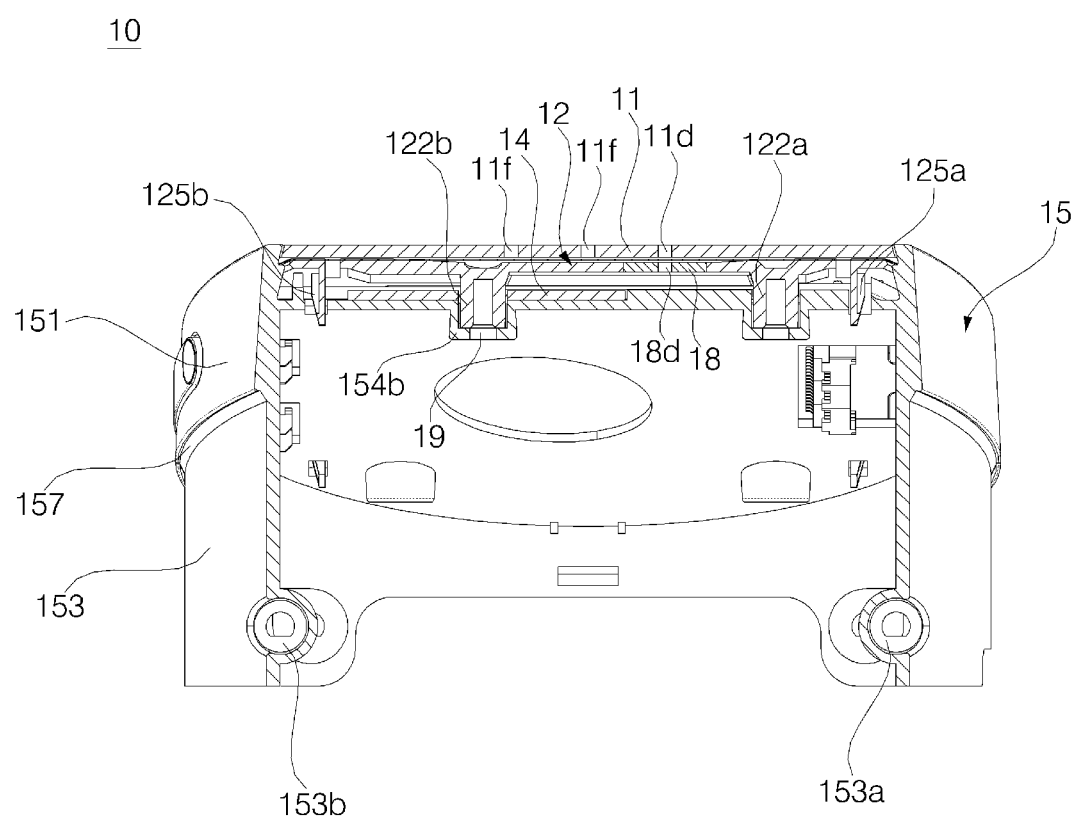
FIG. 16B is a cross-sectional view cut along F2-F2 shown in FIG. 15.
Figure 17:
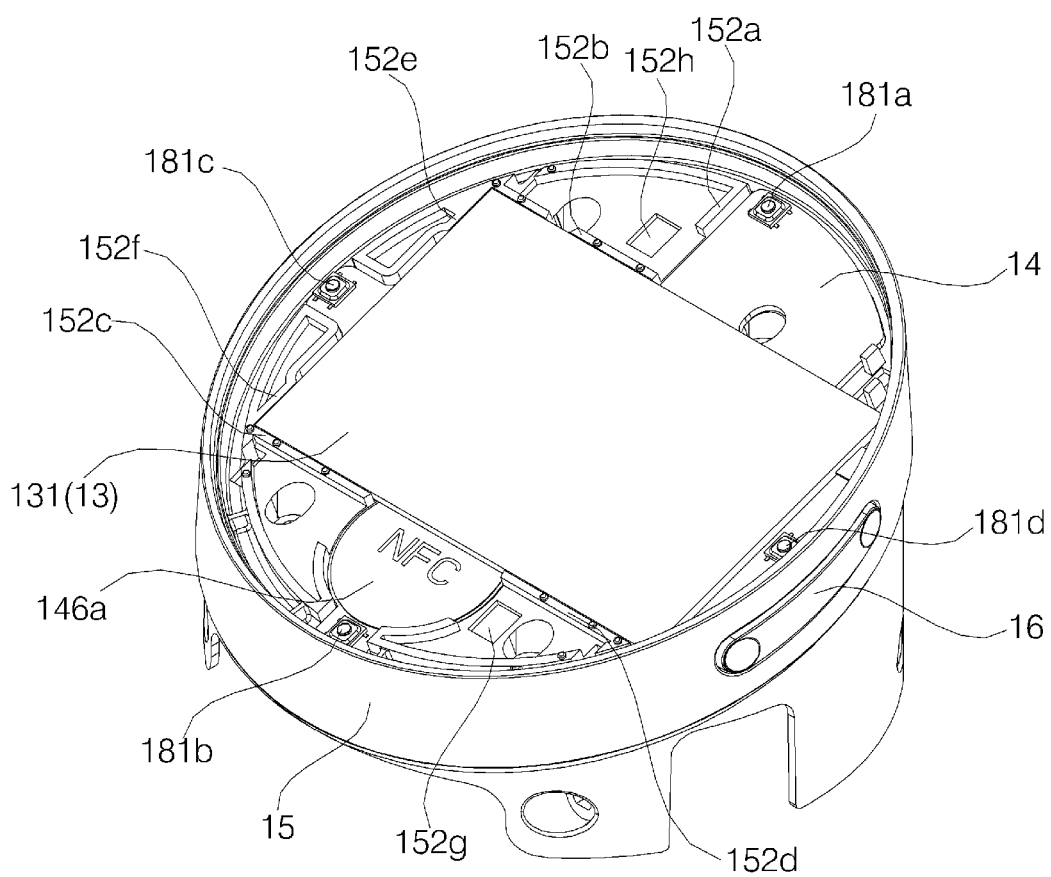
FIG. 17 shows the case where a window support is removed from an assembly shown in FIG. 9.
Figure 18:
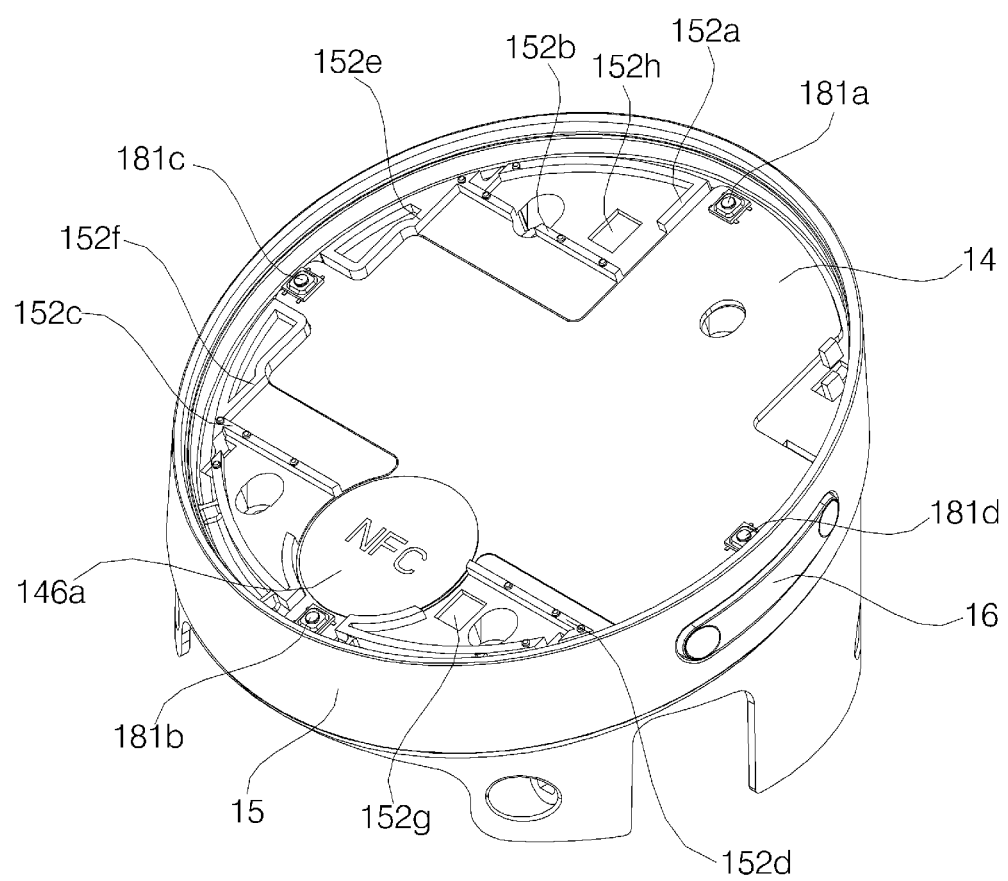
FIG. 18 shows the case where a display is removed from the assembly shown in FIG. 17.
Figure 19:
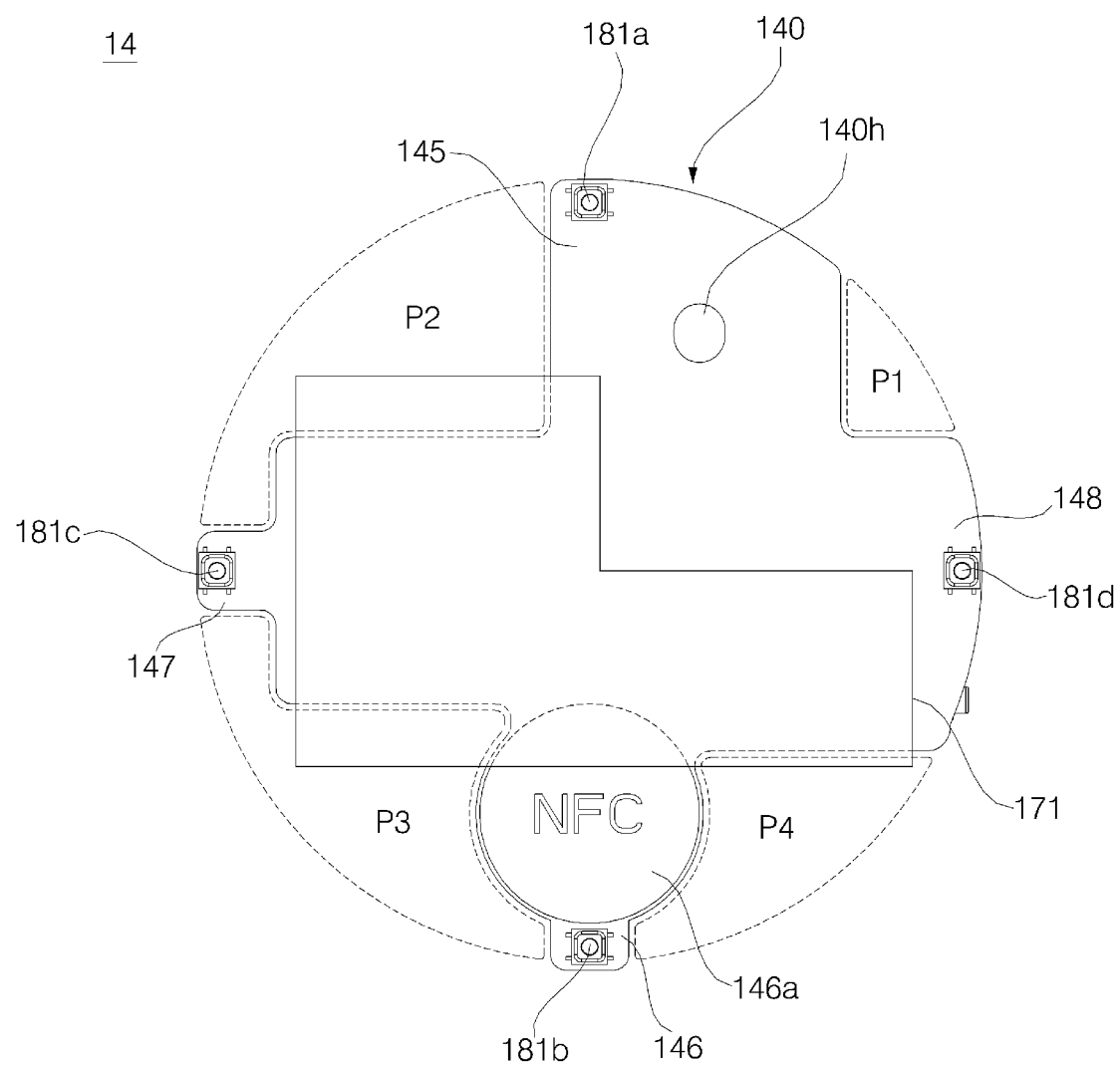
FIG. 19 is a plan view of a display PCB.
Figure 20:
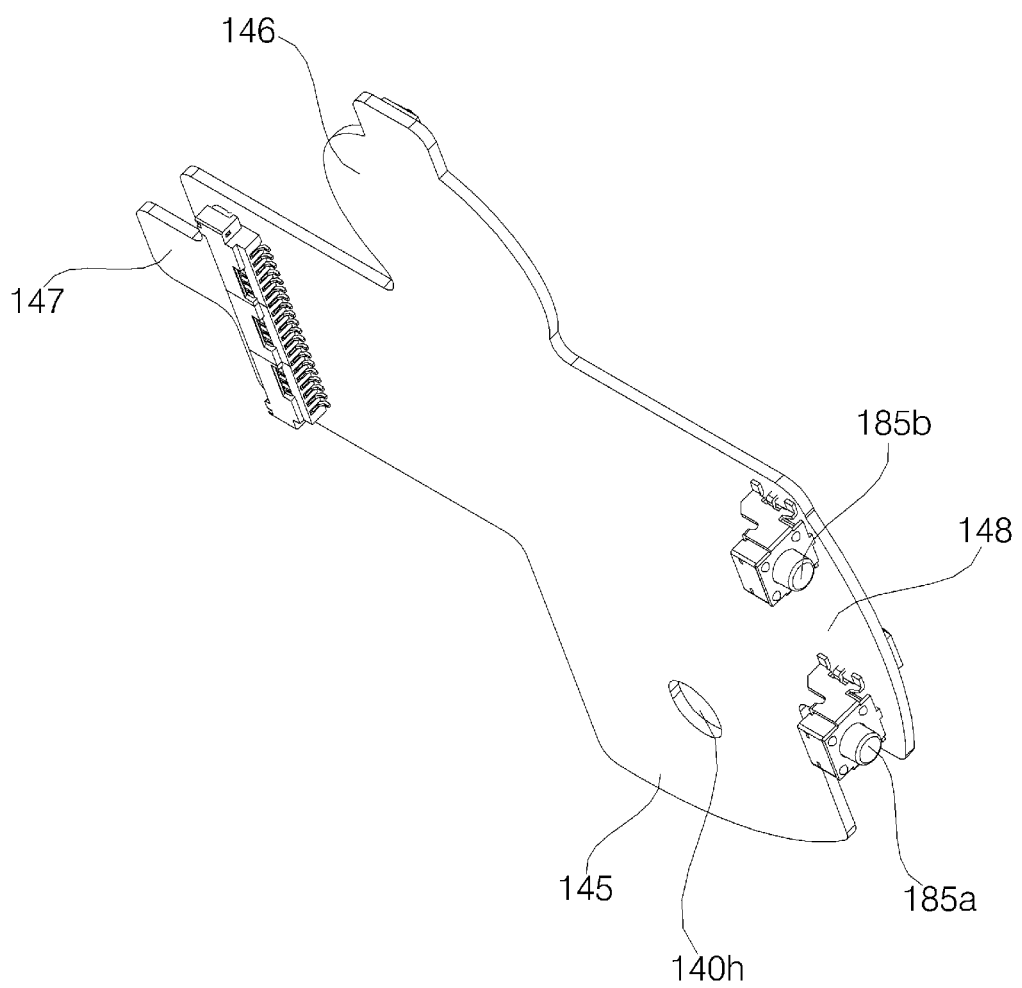
FIG. 20 is a perspective view showing the bottom surface of a display PCB.
Figure 21:
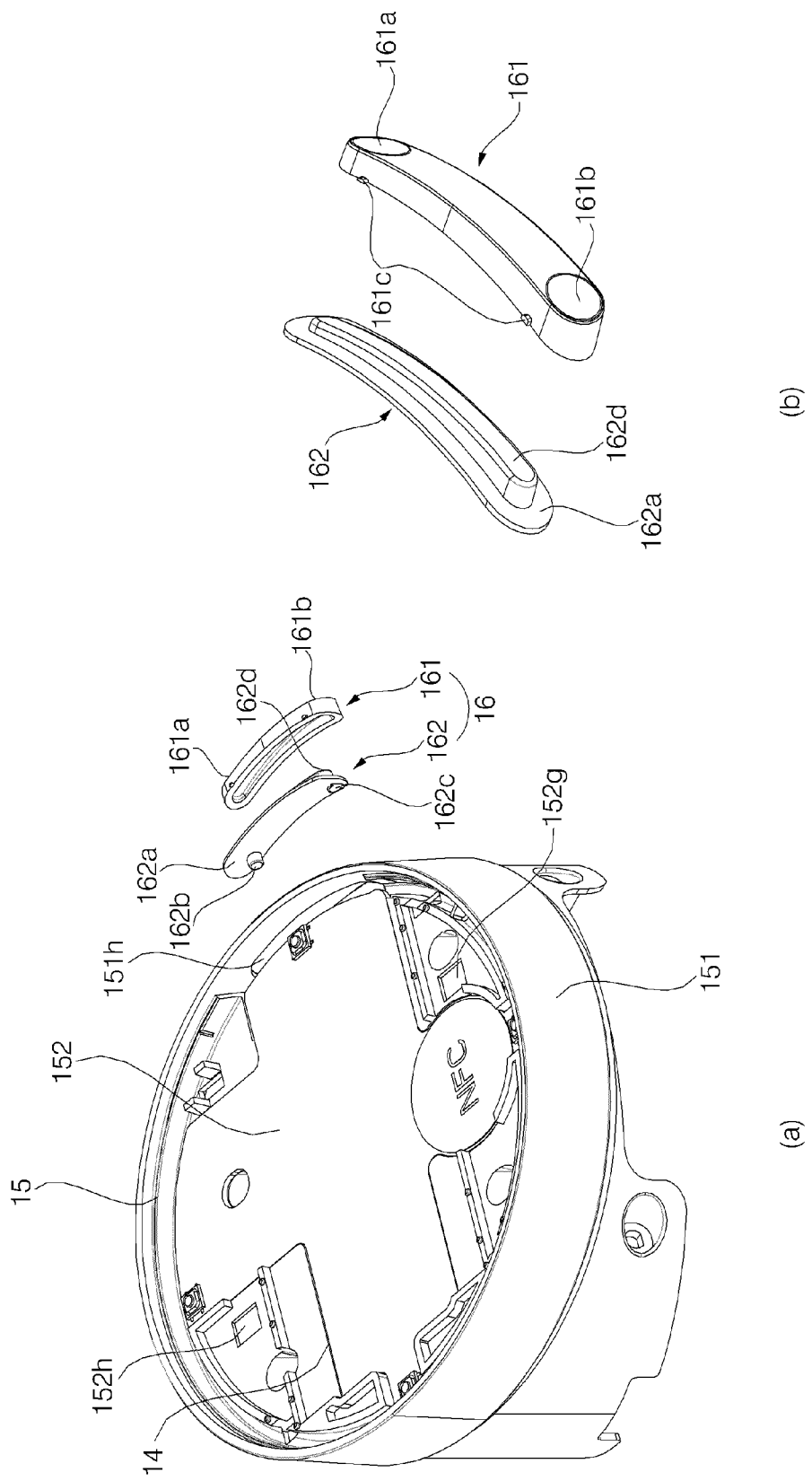
FIG. 21 is an exploded perspective view of a cover and a volume button.
Figure 22:
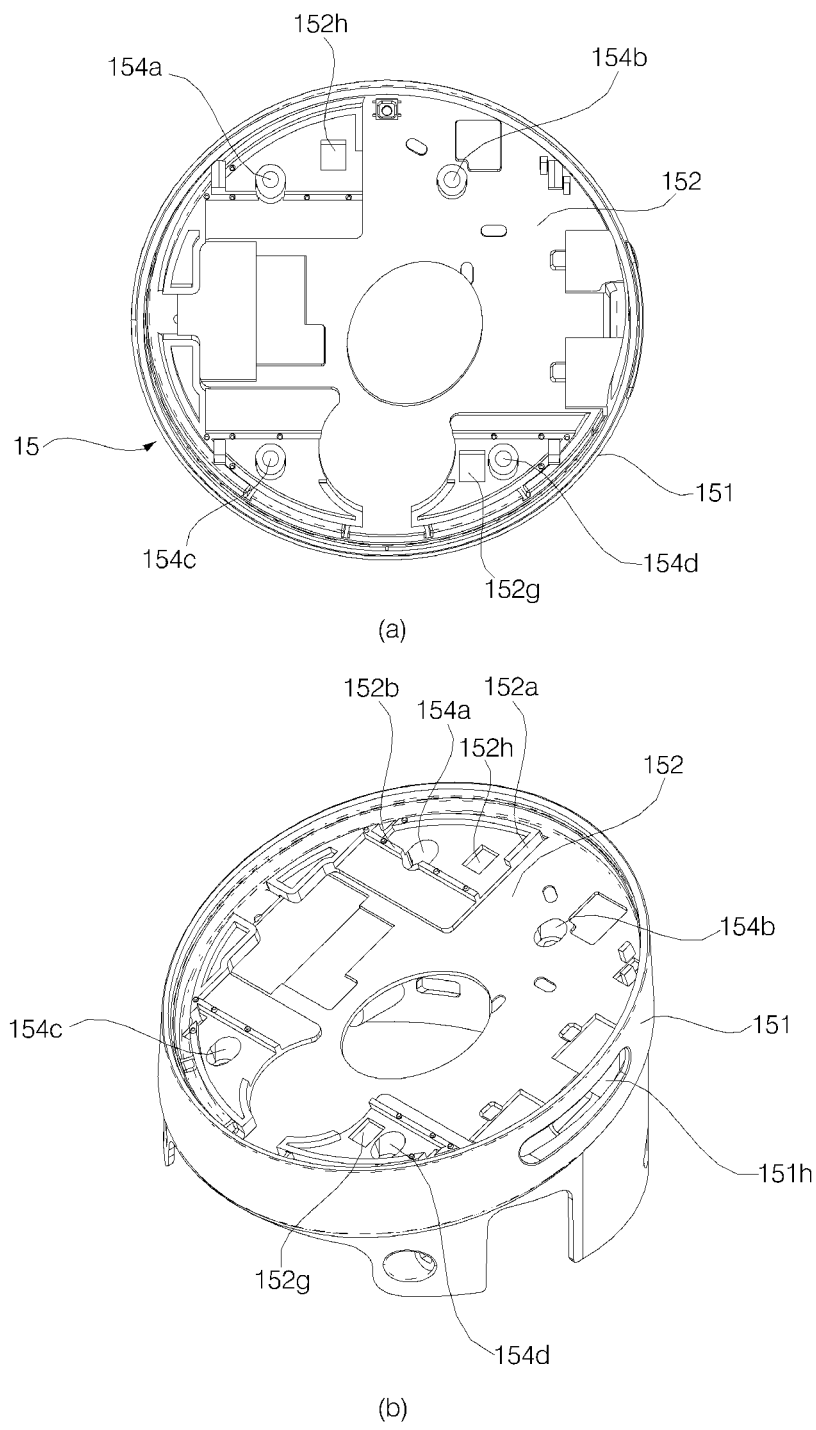
FIG. 22 shows a plane view (a) and a perspective view (b) of a cover housing.
Figure 23:
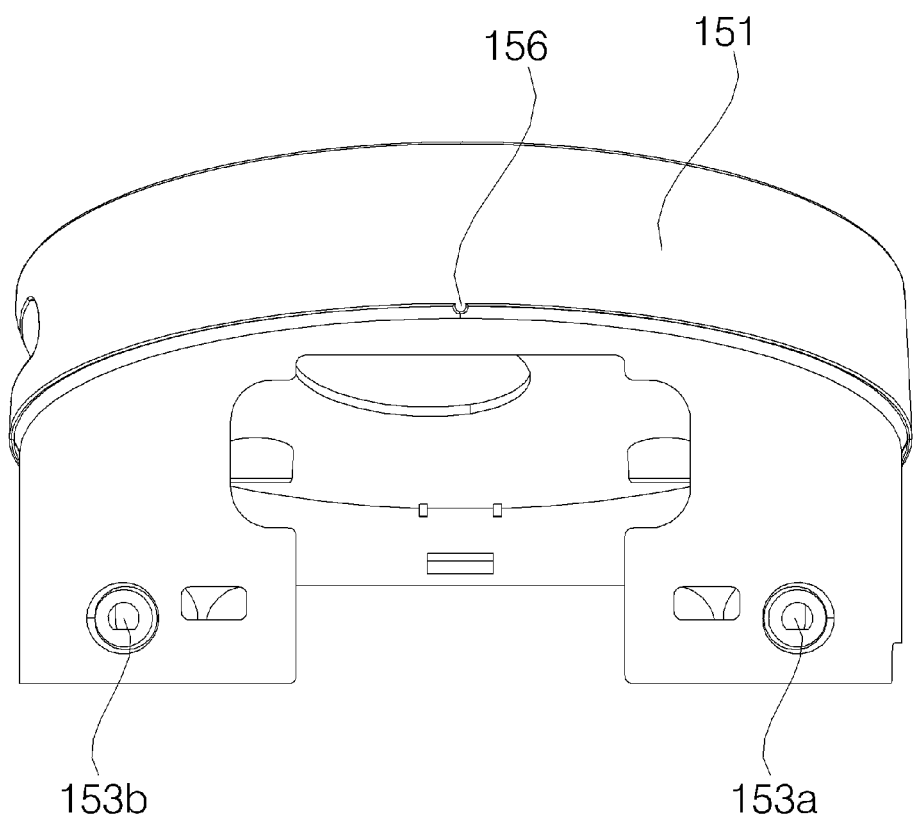
FIG. 23 is a rear view of a cover housing.

FIG. 12A is a perspective view showing an upper surface of a window support. FIG. 12B is a perspective view showing a bottom surface of a window support. FIG. 12C is a right side view of a window support. FIG. 12D is a bottom view of a window support. FIG. 13 shows a front side of a cover shown in FIG. 9. FIG. 14A is a cross-sectional view cut along B3-B3 shown in FIG. 13. FIG. 14B is a cross-sectional view cut along A3-A3 shown in FIG. 13. FIG. 14C is a cross-sectional view cut along C3-C3 shown in FIG. 13. FIG. 14D is a cross-sectional view cut along D3-D3 shown in FIG. 13. FIG. 15 is a right side view of a cover. FIG. 16A is a cross-sectional view cut along F1-F1 shown in FIG. 15. FIG. 16B is a cross-sectional view cut along F2-F2 shown in FIG. 15. FIG. 17 shows the case where a window support is removed from an assembly shown in FIG. 9. FIG. 18 shows the case where a display is removed from the assembly shown in FIG. 17. FIG. 19 is a plan view of a display PCB. FIG. 20 is a perspective view showing the bottom surface of a display PCB. FIG. 21 is an exploded perspective view of a cover and a volume button. FIG. 22 shows a plane view (a) and a perspective view (b) of a cover housing. FIG. 23 is a rear view of a cover housing. Hereinafter, description will be provided with reference to FIGS. 12A to 23.

Referring to FIGS. 8 and 17 to 20, a display PCB 14 is provided on an upper surface of the partition 152 to support the display 13 from the bottom. The display PCB 14 includes a circuit electrically connected to the display 13, and the display is connected to the circuit via a connector 132. On the upper surface of the display PCB 14, four contact switches 181a, 181b, 181c, and 181d may be disposed in the forward, rearward, leftward, and rightward direction from the display 13.

The display PCB 14 may be in the shape of a cross extending from the center thereof in the frontward, rearward, leftward, and rightward direction. More specifically, a substrate 140 in which a circuit of the display PCB 14 is configured may include a first substrate arm 145, a second substrate arm 146, a third substrate arm 147, and a fourth substrate arm 148 extending in the rearwards, frontwards, leftwards, and rightward directions, respectively from the center thereof. The substrate 140 may be approximately in the shape of a cross, but such a shape is not necessarily symmetric.

Referring to FIGS. 17 and 18, on the upper surface of the partition 152 of the cover housing 15, there may be formed a rib 152a protruding from a position in contact with the circumference of the display PCB 14. The rib 152a is not necessarily in a shape corresponding to the whole circumference of the display PCB 14, and the rib 152a may be in contact with part of the circumference of the display PCB 14, and, as in the embodiment, the rib 152a may be formed at a plurality of points along the circumference of the display PCB 14. In particular, the rib 152a may be formed at positions in contact with lateral sides (that is, a side extending outward from the center of the substrate 140) of the substrate arms 145, 146, 147, and 148.

On the substrate arms 145, 146, 147, and 148, there may be disposed the first contact switch 181a, the second contact switch 181b, the third contact switch 181c, and the fourth contact switch 181d, respectively. The contact switches 181a, 181b, 181c, and 181d are electrically connected to a circuit formed in the substrate 140.

On the display PCB 14, there may be disposed a Near Field Communication (NFC) module 50d (see FIG. 7). The NFC module 50d enables NFC communications and may be disposed in an NFC mount unit 146a formed in the second substrate arm 146. Near Field Communication (NFC) is one of wireless tag (RFID) technologies, and a non-contact communication technology using 13.56 MHz frequency band. Due to a short communication distance, NFC is relatively excellent in encryption and inexpensive and thus NFC is regarded as a next-generation short-range communication technology. Since data reading and reading functions are all possible in NFC, a dongle (reader) necessary to use RFID is not required. NFC is similar to an existing short-range communication technology, such as Bluetooth, but it is advantageous in that establishing connection between devices is not required.

The display 13 is a device that displays an image by receiving an electric signal. The display 13 is connected to a circuit of the display PCB 14, and displays an image in accordance with a control signal input through the circuit. The display 13 may include a display panel 131, and a connector 132 connecting the display panel 131 to the display PCB 14 (see FIG. 8). The display panel 131 may be attached to the upper surface of the display PCB 14 by an adhesive member (e.g., a double-side tape 171 (see FIG. 17)).

The display PCB 14 is circuit-connected to a main PCB 48, which will be described later, via a predetermined cable (not shown). Thus, a controller for controlling the display 13 is able to be mounted any one of the display PCB 14 and the main PCB 48. Hereinafter, the display 13 will be described as being controlled by a controller 82 (see FIG. 7) mounted in the main PCB 48. On the side of the main body 40, a groove 429 for accommodating the cable may be elongated in the upward-downward direction.

On the screen of the display panel 131, diverse information may be displayed. The controller 240 may control not just driving of the display panel 131 by a program stored in the memory 250, but also overall operation of electronic components of the voice recognition apparatus 1. A User Interface (UI) may be displayed through the display panel 131, and such an interface may be implemented as the program is executed.

The interface may display play information of the speakers 43 and 44. For example, diverse information may be displayed, for example, play/stop/selected menu, a play status, music title, singer/album information, lyrics, volume, etc.

In the case where the voice recognition apparatus 1 is provided with a communication module 50, the interface may display information exchanged through the communication module 40. For example, the interface may display a menu for controlling accessories 2, 3a, and 3b which communicate with the communication module 50, or may process information processed based on information transmitted from the accessories 2, 3a, and 3b. Specifically, information on a network connection state of the communication module 50 and on temperature/humidity/brightness sensed by a sensor provided in the accessory 2 may be displayed through the interface. In addition, a menu for controlling outputting of the speakers 43 and 44 may be displayed through the interface. For example, a menu for selecting a song or album to be output through the speakers 43 and 44, information related to the album or song (e.g., a song title, an album title, and a singer), volume of output sound may be displayed.

The menu displayed on the interface may be manipulated using a manipulation unit 181.

Meanwhile, the manipulation 181 may be provided with the contact switches 181a, 181b, 181c, and 181d. How an output signal from each of the contact switches 181a, 181b, 181c, and 181d is processed is determined by a program pre-stored in the memory 250. For example, in accordance of operation signals of the first and second contact switches 181a and 181b, menu items displayed in the left and right direction on the interface may be selected. In accordance with operation signals of the third and fourth contact switches 181c and 181d, menu items displayed in the up and down direction on the interface may be selected A user is able to communicate with a Bluetooth module 50b using an external device, such as a smart phone and a laptop, and a variety of data, such as music and images, may be stored in the memory 250 due to the communication. In particular, the controller 240 may control the speakers 43 and 44 to output music stored in the memory 250, and a variety of functions, such as selecting, playing, and stopping music, may be implemented using the contact switches 181a, 181b, 181c, and 181d.

Meanwhile, on the substrate 140 of the display PCB 14, there may be formed a through-hole 140h through which a support boss 122b formed in the window support passes. In the through hole 140h, there may be formed the first substrate arm 145.

Referring to FIG. 20, a pair of volume adjusting switches 185a and 185b may be provided in the bottom surface of the substrate 140. The volume adjusting switches 185a and 185b are for adjusting volume of the speakers 43 and 44 provided in the main body 40. Each of the volume adjusting switches 185a and 185b may be in the form of a contact switch and is connected to a circuit of the display PCB 14. The volume switches 185a and 185b may include: a first volume adjusting switch (or a volume up switch 185a) which controls, upon being pressed, the speakers 43 and 44 to volume up; and a second volume adjusting switch (or a volume down switch 185b) which controls, upon being pressed, the speakers 43 and 44 to volume down.

The volume adjusting switches 185a and 185b may be provided in the fourth substrate arm 148 of the display PCB 14, and each moving terminal (a portion being pressed for switching operation) of the volume adjusting switches 185a and 1895b may protrude toward the side wall 151 of the cover housing 15.

Referring to FIGS. 21 and 22, the opening 151h in which a volume button is installed may be formed in the side wall 151 of the cover housing 15. The volume button 16 may include a dome 161 and an elastic pad 162.

The elastic pad 162 may be formed as a component made of an elastic material (preferably, rubber). The elastic pad 162 is formed in a plate shape that extending along the circumferential direction of the side wall 151. The elastic pad 162 may include: a supporting portion 162a disposed inside the housing 15; a pair of switch moving protrusions 162b and 162c protruding from an inner surface of the supporting portion 162a; and a dome fixing protrusion 162d protruding from an outer surface of the supporting portion 162a to be exposed to the outside through the opening 151h. The size of the supporting portion 162a is greater than that of the opening 151h, and thus, unless bending by an external force, the supporting portion 162a may not be moved out of the cover housing 15 through the opening 151h.

The dome 161 is formed of syntactic resin and has a groove formed in one surface, and the dome fixing protrusion 162d is inserted into the groove. Preferably, the dome fixing protrusion 162d is forcibly fitted into the groove, and not easily separated from the dome 161 due to an elastic force or a restoring force of the material of the dome fixing protrusion 162d, even without using an additional adhesive means. However, aspects of the present invention are not limited thereto, and the dome 161 and the dome fixing protrusion 162 may be coupled to each other by an adhesive member, such as a double-side tape.

A separation preventing protrusion 161c may protrude from an upper surface and/or a lower surface of the dome 161. The separation preventing protrusion 161 is disposed inside the cover housing 15, and meets the circumference of the opening 151h to thereby more firmly prevent the dome 161 from being separating from the cover housing 15. In the embodiment, a pair of separation preventing protrusions 161c is formed in the upper surface and the lower surface of the dome 161, but aspects of the present invention are not limited thereto.

When the elastic pad 162 is placed at the right position in the opening 151h, a pair of switch moving protrusions 162b and 162c is disposed at positions corresponding to the first volume adjusting switch 185a and the second volume adjusting switch 185b, respectively. When a volume-up manipulation unit 161a or a volume-down manipulation unit 161b of the dome 161 is pressed, the switch moving protrusions 162b and 162c of the elastic pad 162 operates the volume up switch 185a or the volume down switch 185b, and accordingly, volume of the speakers 43 and 44 are adjusted.

Referring to FIGS. 8 to 16, an approximate circular-shaped window support 12 may be disposed above the display 13. The window support 12 is an synthetic resin injected object and proper ably formed as one component. An opening 12h is formed in the window support 12, and a screen of the display 13 is exposed through the opening 12h.

The opening 12h is formed at a position corresponding to the display panel 131 provided below the window support 12, and it is desired that the opening 12h is formed in size a little bit smaller than the display panel 131. A screen displayed on the display panel 131 may be viewed through the opening 12h.

The display panel 131 is in a rectangular shape having a left-and-right direction length loner than a front-and-rear direction length. Thus, in order to correspond to the shape of the display panel 131, the opening 12h may be in a shape having a left-and-right-direction length longer than a front-and-rear-direction length.

The window support 12 may include: a window support plate 121 having the opening 12h formed at the center thereof and the window 11 disposed in the upper surface thereof; manipulation protrusions 126a, 126b, 126c, and 126d protruding downward from the window support plate 121; and a plurality of support bosses 122a, 122b, 122c, and 122d protruding downward from the window support plate 121.

The support bosses 122a, 122b, 122c, and 122d may extend vertically downwards. Similarly to the window 11, the window support plate 121 may be also inclined at the first angle θ1 relative to the horizontal plane. In this case, the support bosses 122a, 122b, 122c, and 122d are not orthogonal to the window support plate 121, and it is desirable that the support bosses 122a, 122b, 122c, and 122d may form a complementary angle 90-θ1 of θ1 relative to the window support plate 121.

Hereinafter, the window support plate 121 is divided into a first section SE1 positioned in the rear side of the opening 12h, a second section SE2 positioned in the front side of the opening 12h, a third section SE2 positioned in the left side of the opening 12h, and a fourth section SE4 positioned in the right side of the opening 12h.

At least one of the support bosses 122a, 122b, 122c, and 122d may be formed in each of the first section SE1 and the second section SE2. In order to stably fix the window support plate 121 while preventing it from shaking, the four support bosses 122a, 122b, 122c, and 122d may be formed, and the first support boss 122a and the second support boss 122b may be in the first section SE1, while the third support boss 122c and the fourth support boss 122d may be formed in the second section SE2.

The support bosses 122a, 122b, 122c, and 122d are coupled to the cover housing 15 to support the window support plate 121, and, in this case, the window support plate 121 may be spaced apart from the display PCB 14. At least one of the support bosses 122a, 122b, 122c, and 122d may be coupled to the partition 152 by passing through quadrants formed by the substrate arms 145, 146, 147, and 148, while at least another thereof may be coupled to the partition 152 by passing through the through hole 140h formed in the substrate arm 145.

Referring to FIG. 19, the inside of the cover housing 15 is divided into four areas P1, P2, P3, and P4 by the cross-shaped four substrate arms 145, 146, 147, and 148. Hereinafter, a sequence is applied according to a general definition for a quadrant, so P1 is defined as a first quadrant, P1 as a second quadrant, P3 as a third quadrant, and P4 as a fourth quadrant.

The first support boss 122a, the third support boss 122c, and the fourth support boss 122d are coupled to the partition 152 by passing through the second quadrant P2, the third quadrant P3, and the fourth quadrant P4, respectively, while the second support boss 122b is coupled to the partition 152 by passing through the through-hole 140h formed in the first substrate arm 145.

The coupling between the support bosses 122a, 122b, 122c, and 122d and the partition 152 of the cover housing 15 may be implemented in a manner in which the support bosses 122a, 122b, 122c, and 122d are coupled directly with the partition 152. However, as shown in the embodiment, the coupling between the support bosses 122a, 122b, 122c, and 122d and the partition 152 of the cover housing 15 may be implemented in a manner in which the support bosses 122a, 122b, 122c, and 122d are coupled to insertion bosses 154a, 154b, 154c, and 154d formed in the partition 152.

In the partition 152 of the cover housing 15, there may be formed a first insertion boss 154a, a second boss 154b, a third insertion boss 154c, and a fourth insertion boss 154d at positions respectively corresponding to the first support boss 122a, the second support boss 122b, the third support boss 122c, and the fourth support boss 122d. The insertion bosses 154a, 154b, 154c, and 154d may protrude downward from the partition 152, and may extend in parallel with the support bosses 122a, 122b, 122c, and 122d, respectively.

The first support boss 122a, the second support boss 122b, the third support boss 122c, and the fourth support boss 122d are inserted into the first insertion boss 154a, the second insertion boss 154b, the third insertion boss 154c, and the fourth insertion boss 154d, respectively. At a lower end of each of the insertion bosses 154a, 154b, 154c, and 154d, there may be formed a fastening hole into which a bolt is fastened. A bolt 19 may pass through each fastening hole upward from the bottom to be fastened to support bosses 122a, 122b, 122c, and 122d.

Referring to FIGS. 17 to 19, the cover housing 15 may include one or more ribs 152a, 152b, 152c, 152d, 152e, and 152f protruding upward from the partition 152.

One or more ribs 152b, 152c, 152d, 152e, and 152f from among the ribs 152a, 152b, 152c, 152d, 152e, and 152f may be in contact with the circumference of the display panel 131. However, the display PCB 14 is disposed on the upper surface of the partition 152, so the ribs 152b, 152c, 152d, 152e, and 152f should not interfere with the display PCB 14 in order to come into contact with the circumference of the display panel 131. To this end, the present invention proposes using the cross-shaped quadrants P1, P2, P3, and P4 divided by the display PCB 14 as a channel through which the ribs 152b, 152c, 152d, 152e, and 152f passes without interfering with the display PCB 14.

The ribs 152b, 152c, 152d, 152e, and 152f may pass any one of the quadrants P1, P2, P3, and P$ divided by the substrate arms 145, 146, 147, and 148 of the display PCB 14 to thereby come into contact with an edge portion of the display panel 131. The ribs 152b, 152c, 152d, 152e, and 152f may play a role of setting the position of the display panel 131, and a function of helping the display panel 131 maintained in right position without shaking.

The display panel 131 may be in a rectangular shape, and at least one side of the display panel 131 may come into contact with the ribs 152b, 152c, 152d, 152e, and 152f.

Each pair of sides out of the four sides of the display panel 131 may come into contact with ribs. In the embodiment, horizontal sides (or sides extending in the left and right direction) of the display panel 131 are in contact with the ribs 152b, 152c, and 152d. The ribs 152b, 152c, and 152d may extend along a horizontal side of the display panel 131.

The ribs 152b, 152c, and 152d may respectively pass different areas from among the four areas P1, P2, P3, and P4 which are divided by the substrate arms 145, 146, 147, and 148. In the embodiment, the rib 152b passes the second quadrant P2, the rib 152c passes through the third quadrant P3, and the rib 152d passes the fourth quadrant P3, so the ribs 152b, 152c, and 152d are respectively in contact with a rearward side (an upper horizontal side in the drawing), a left lateral side, and a forward side (a lower horizontal side in the drawing) of the display panel 131.

In some implementations, there may be additionally formed a rib that passes through the first quadrant P1 and/or the fourth quadrant P5 to thereby come into contact with the right side of the display panel 141.

A rib (e.g., 152b) in contact with any one side of the display panel 131, and a rib (e.g., 152c) in contact with another side of the display panel 131 may respectively pass through different areas (e.g., P2 and P3) from among the areas P1, P2, P3 and P4 divided by the substrate arms 145, 146, 147, and 148.

Due to material characteristics, in response to pressure in a predetermined range, the window support plate 121 may bend about the support bosses 122a, 122b, 122c, and 122d. Such deformation of the window support plate 121 is elastic such that the window support plate 121 returns back to its original shape when the pressure is removed.

The first manipulation protrusion 126a, the second manipulation protrusion 126b, the third manipulation protrusion 126c, and the fourth manipulation protrusion 126d of the window support 12 are disposed at positions respectively corresponding to the first contact switch 181a, the second contact switch 181b, the third contact switch 181c, and the fourth contact switch 181d provided on the display PCB 14. Accordingly, when pressure is applied through the window 11 to any one of the first section SE1, the second section SE2, the third section SE3, and the fourth section SE4 of the window support 12, a manipulation protrusion (e.g., the first manipulation protrusion 126a) belonging to a section (e.g., the first section SE1) to which the pressure is applied operates a contact switch (e.g., the first contact switch 181a) positioned below the corresponding manipulation protrusion.

The window support 12 may further include a first tab 125a, a second tab 125b, a third tab 125c, and a fourth tab 125d extending downward from the window support plate 121. The tabs 125a, 125b, 125c, and 125d may protrude vertically from the bottom surface of the window support plate 121. On the upper surface of the partition 152 of the cover housing 15, there may be formed tab insertion grooves (not indicated by reference numerals) at positions respectively corresponding to the tabs 125a, 125b, 125c, and 125d.

Meanwhile, the window 11 is a circular transparent plate, and allows a screen of the display 13 to pass therethrough, and it is desirable that the window 11 is formed of acryl. A user is able to see a screen displayed on the display 13 through the window 11. Not the entire area of the window 11 is necessarily transparent. The window support 12 may not viewable in the exterior appearance of the voice recognition apparatus 1, and only a screen of the display panel 131 exposed through the opening 12h of the window support 12 may be viewable. Only a specific area 11b at a position approximately corresponding to the opening 12h is may be transparent, and other areas 11a may be colored opaquely or translucently to be hidden from the outside or may have a film or the like attached thereto (see FIG. 3).

The window 11 may be bonded to the upper surface of the window support plate 121 of the window support 12 using a double-side tape or the like. Due to characteristics of a syntactic resin material, the window may be elastically bent in response to application of pressure in a predetermined range. Such bending helps the contact switches 181a, 181b, 181c, and 181d to operate more smoothly. However, the bending of the window 11 is elastic, so the window 11 may be restored to its original shape when the pressure is removed.

Meanwhile, the opening 12h formed in the window support plate 121 has a horizontal-direction (or left-right direction) length longer than a front-and-rear-direction (or vertical-direction) length, so the third region SE 3 and the fourth section SE4 corresponding to the left and right sides of the opening 12H is not appropriate for installation of support bosses. It is because a distance from the circumference of the opening 12h to the third manipulation protrusion 126c or the fourth manipulation protrusion 126 in the third section SE3 and the fourth section SE4 is shorter than a distance from the circumference of the opening 12h to the first manipulation protrusion 126a or the second manipulation protrusion 126b in the first section SE1 and the second section SE2, and thus, if a support boss is formed in the third section SE3 or the fourth section SE4, a distance of the third manipulation protrusion 126c or the fourth manipulation protrusion 126d to the support boss is too close, and, in this case, greater pressure needs to be applied to the window support plate 121 in order to operate the corresponding manipulation protrusion For this reason, the first support boss 122a and the second support boss 122b are formed in the first section SE1, and it is desirable that the third support boss 122c and the fourth support boss 122d are formed in the second section SE2.

Meanwhile, as viewed from above, the first manipulation protrusion 126a is disposed more outer than the first support boss 122a and the second support boss 122b within the cover housing 15, and the second manipulation protrusion 126b is disposed more outer than the third support boss 122c and the fourth support boss 122d.

In each of the first section SE1 and the second section SE2, there may be formed slits 121a and 121b between the manipulation protrusions 126a and 126b and the support bosses 122a, 122b, 122c, and 122d.

Referring to FIG. 12D, the support bosses 122a, 122b, 122c, and 122d are disposed in the first section SE1 or the second section SE2, and thus closer to the first manipulation protrusion 126a or the second manipulation protrusion 126b than the third manipulation protrusion 126c or the fourth manipulation protrusion 126d. For example, when pressure is applied to the first section SE1 of the window support plate 121, the window support plate 121 may bend about the first support boss 122a and the second support boss 122b. In this case, a radius of rotation (moment arm) of the first manipulation protrusion 126a about the first support boss 122a is r11, and a radius of rotation of the first manipulation protrusion 126a about the second support boss 122b is r12. In the embodiment, since the first manipulation protrusion 126a is closer to the second support boss 122b than the first support boss 122a, r12 is shorter than r11. In addition, a distance from the third manipulation protrusion 126c to the first support boss 122a is r31(r31>r11>r12), and r33, which is a distance from the third manipulation protrusion 126c to the third support boss 122c is substantially identical to r31.

Manipulability of each of the manipulation protrusion 126a, 126b, 126c, and 126d is influenced by a distance to the most adjacent support bosses. If the slits 121a and 121b do not exist, and, if r31 is greater than r12 as in the above example, the third section SE3 bends more easily than the first section SE1 even when the same pressure is applied to the first section SE1 and the third section SE3. As a result, the third manipulation protrusion 126c may move downward more easily than the first manipulation protrusion 126a, and thus, the third contact switch 181c may operate more smoothly than the first contact switch 181a. For the same reason, the second contact switch 181b may not operate smoothly compared to the third contact switch 181c or the fourth contact switch 181d.

To solve this problem, a first slit 121a and a second slit 121b are respectively formed in the first section SE1 and the second section SE2 of the window support plate 121. In these sections SE1 and SE2, the slits 121a and 121b are located between the support bosses 122a, 122b, 122c, and 122d and the manipulation protrusions 126a, 126b, 126c, and 126d.

As shown in FIG. 12D, a diameter passing through the center C of the window support plate 121 and extending in the left-and-right direction is defined as a horizontal diameter D1, and a diameter passing through the center C of the window support plate 121 and extending in the front-and-rear direction is defined as a vertical diameter D2. In this case, the first support boss 122a and the second support boss 122b are disposed substantially parallel to the horizontal diameter D1 in the first section SE1, and the third support boss 122c and the fourth support boss 122d may be disposed substantially parallel to the horizontal diameter D1 in the second section SE2. In addition, each of the first slit 121a and the second slit 121b may extend substantially parallel to the horizontal diameter D1.

As the slits 121a and 121b are formed, bending of the window support plate 121 occurs at positions adjacent to both ends of the slits 121a and 121b when pressure is applied to the first section SE1 or the second section SE2. In particular, such bending often occurs in a narrow area between end portions of the slits 121a and 121b and an outer circumference of the window support late 121, so the window support plate 121 may bend more smoothly than when the slits 121a and 121b are not formed.

In addition, there is an effect that a distance from the manipulation protrusions 126a and 126b and a bending portion increases. For example, in the case of the first manipulation protrusion 126a, a distance rs to one end of the first slit 121a becomes longer than a distance r12 to the second support boss 122b. It is because a length of the moment arm of a force applied to a bending portion the first section SE1 is increased. This helps the first manipulation protrusion 126a to more smoothly move downward.

In addition, as in the embodiment, in the case where the support bosses 122a, 122b, 122c, and 122d in the first section SE1 and the second section SE2 are disposed asymmetrically, the slits 121a and 121b is formed between the support bosses 122a, 122b, 122c, and 122d and the manipulation protrusions 126a and 126b. Accordingly, bending of the window support plate 121 in the first section SE1 and the second section SE2 may be influenced more substantially by positions and shapes of the slits 121a and 122b, than by the positions of the support bosses 122a, 122b, 122c, and 122d. Therefore, in the case where the first slit 121a and the second slit 121b are asymmetrically disposed to each other, manipulability of the first contact switch 181a and the second contact switch 181b may become uniform.

Referring to FIGS. 3 to 5, the main body 30 may be supported by the base 30 disposed therebelow, and the upper part of the main body 40 may be coupled to the housing 15. The main body 40 may include speaker cases 41 and 42 which forms a cavity 49 in an inward direction, and at least one speaker 43 or 44 disposed inside the cavity 49. In the embodiment, two speakers 43 and 44 are disposed in the speaker cases 41 and 42. The speaker 43 disposed in the upper side is a tweeter which outputs high-note sound, and the speaker 44 disposed in the lower side is a woofer which outputs low-note band.

Referring to FIGS. 3 to 23, a voice input PCB 17 and 18 is installed in the cover 10. A user's voice is input to the voice input PCB 17 and 18. The voice input PCB 17 and 18 are connected to a voice recognition PCB 40a disposed in the main body 40. The voice input PCB 17 and 18 may be connected to the voice recognition PCB 40a via harness cables 17b and 18b. The voice input PCB 17 and 18 may convert a user's voice into a soundwave signal recognizable by the voice recognition PCB 40a, and the voice recognition PCB 40a may recognize the user's voice by analyzing the soundwave signal received from the voice input PCB 17 and 18.

The voice input PCBs 17 and 18 are installed in the window support 12. A plurality of voice input PCBs may be provided, and the plurality of voice input PCBs may be arranged symmetrically to the opening 12h formed in the window support 12. In this embodiment, two voice input PCBs 17 and 18 is provided, including a first voice input PCB 17 and a second voice input PCB 18

The first voice input PCB 17 and 18 includes a first voice input PCB 17 located in front of the opening 17h formed in the window support 12, and a second voice input PCB 18 formed at rear of the opening 12h. The first voice input PCB is disposed in the second section SE2 of the window support plate 121, and the second voice input PCB 18 is disposed in the first section SE1 of the window support plate 121.

The first voice input PCB 17 is relatively lopsided toward the right side with reference the center of the window support plate 121, and the second voice input PCB 18 is relatively lopsided toward the left side with reference the center of the window support plate 121.

On the upper surface of the window support 12 which opposes the window 11, there is formed a PCB accommodation space 12a and 12b in which the voice inputs PCB 17 and 18 are accommodated. When accommodated in the PCB accommodation space 12a and 12b, the voice input PCB 17 and 18 do not protrude outward from the PCB accommodation space 12a and 12b. That is, the PCB accommodation space 12a and 12b is formed on the upper surface 12 of the window support as being recessed at a depth corresponding to the vertical depth of the voice input PCB 17 and 18. When the voice input PCB 17 and 18 is accommodated in the PCB accommodation space 12a and 12b, the upper surface of the voice input PCB 17 and 18 coincide with the upper surface of the window support 12.

The PCB accommodation space 12a and 12b includes a first PCB accommodation space 12a in which the first voice input PCB 17 is accommodated, and a second PCB accommodation space 12b in which the second voice input PCB 18 is accommodated. The first PCB accommodation space 12a is disposed in front of the opening 12h formed in the window support 12, and the second PCB accommodation space 12b is disposed at rear of the opening 12h. The first PCB accommodation space 12a is formed in the second section SE2 of the window support plate 121, and the second PCB accommodation space 12b is formed in the first section SE1 of the window support plate 121.

The first PCB accommodation space 12a is relatively lopsided toward the right side with reference to the center of the window support plate 121, and the second PCB accommodation space 12b is relatively lopsided toward the left side with reference to the center of the window support plate 121.

The window support 12 further includes a position protrusion 12c and 12d protruding from the bottom of the PCB accommodation space 12a and 12b. In the voice input PCB 17 and 18, there is formed a position hole 17a and 18a into which the position protrusion 12c and 12d is inserted. One position protrusion 12c and 12d is formed at an edge of a rectangular-shaped PCB accommodation space 12a and 12b, and one position protrusion 12c and 12d is formed at an edge of a rectangular-shaped voice input PCB 17 and 18. To make the voice input PCB 17 and 18 accommodated in the PCB accommodation space 12a and 12b, an operator may fit the position protrusion 12c and 12d into the position hole 17a and 18a so that the voice input PCB 17 and 18 is accommodated at right position in the PCB accommodation space 12a and 12b.

The position protrusion 12c and 12d includes a first position protrusion 12c protruding upward from the bottom of the first PCB accommodation space 12a, and a second position protrusion 12d protruding upward from the bottom of the second PCB accommodation space 12b. In addition, the position hole 17a and 18a includes: a first position hole 17a which is formed in the first voice input PCB 17 and into which the first position protrusion 12c is inserted; and a second position hole 18a which is formed in the second voice input PCB 18 and into which the second position protrusion 12d is inserted.

On the bottom of the PCB accommodation space 12a and 12b, there is formed an opening 12e and 12f. The opening 12e and 12f acts as a hole through which the harness cable 17b and 18b passes when the voice input PCB 17 and 18 is connected to the voice recognition PCB 40a. The opening 12e and 12f includes a first opening 12d formed in the bottom of the first PCB accommodation space 12a, and a second opening 12f formed in the bottom of the second PCB accommodation space 12b.

The opening 12e and 12f forms at least part of the slits 121a and 121b formed in each of the first section SE1 and the second section SE2. The first PCB accommodation space 12a is relatively lopsided toward the right side in the second slit 121b formed in the second section SE2, so formed between the third support boss 122c and the fourth support boss 122d in the second section SE2 to be disposed right nest to the fourth support boss 122d. In addition, the second PCB accommodation space 12b is relatively lopsided toward the left side in the first slit 121a formed in the first section SE1, so formed between the first support boss 122a and the second support boss 122b in the first section SE1 to be disposed right next to the first support boss 122a. Thus, when a user presses the window 1, the contact switches 181a, 181b, 181c, and 181d may become easily operated as the window support plate 121 is elastically deformed.

The opening 12e and 12f is formed to have a width in front-and-rear direction, compared to the slit 121a and 121b. Since the voice input PCB 17 and 18 is connected to the voice recognition PCB 40a via the harness cable 17b and 18b, a connector 17c and 18c to be connected to the voice recognition PCB 40a is connected to the lower end of the harness cable 17b and 18b. The connector 17c and 18c needs to come out from the bottom of the window support 12 through the opening 12e and 12f, so it is desirable that the connector 17c and 18c is formed to have a front-and-rear direction width wider than that of the slit 121a and 121b.

The harness cable 17b and 17b includes a first harness cable 17b connecting the first voice input PCB 17 and the voice recognition PCB 40a, and a second harness cable 18b connecting the second voice input PCB 18 and the voice recognition PCB 40a. In addition, the connector 17c and 18c includes a first connector 17c coupled to the lower end of the first harness cable 17b to be thereby connected to the voice recognition PCB 40a, and a second connector 18c coupled to the lower end of the second harness cable 18b to be thereby connected to the voice recognition PCB 40a.

In the window 11, there is formed a voice passage hole 11c and 11d through which a user's voice passes from the upper side of the window 11 to the lower side of the window 11. The voice passage hole 11c and 11d includes a first voice passage hole 11c formed in a front area with reference to the center of the window, and a second voice passage hole 11d formed in a rear area with reference to the center of the window 11. The first voice passage hole 11c guides voice to the first voice input PCB 17, and the second voice passage hole 11d guides voice to the second voice input PCB 18.

The center portion of the window 11 is formed as a transparent area 11b, and the rest area other than the transparent area 11b is formed as an opaque area 11a. The transparent area is formed in size and shape corresponding to the opening 12h formed in the window support 12, and allows a screen output by the display panel 131 to pass therethrough.

The first voice passage hole 11c is formed in an opaque area 11a in front of the transparent area 11b of the window 11, and the second voice passage hole 11d is formed in an opaque area 11a at rear of the transparent area 11b of the window 11.

In order to allow a user's voice to be easily input to the voice input PCB 17 and 18, it is desirable that the voice passage hole 11c and 11d is formed at a position corresponding to the voice input PCB 17 and 18. In the voice input PCB 17 and 18, a voice input hole 17d and 18d through which a voice passing through the voice passage hole 11c and 11d is formed at a position corresponding to the voice passage hole 11c and 11d. In the voice input PCB 17 and 18, it is desirable that a microphone (not shown) is formed at the bottom surface in which the voice input hole 17d and 18d is formed. The microphone amplifies a voice input through the voice input hole 18d and 18d to input the voice to a soundwave conversion circuit of the voice input PCB 17 and 18. That is, a user's voice passing through the voice passage hole 11c and 11d from the outside of the window 11 is input to the voice input hole 17d and 18d formed in the voice input PCB 17 and 18, amplified by the microphone, input to the soundwave conversation circuit of the voice input PCB 17 and 18, and converted into a soundwave signal readable by the voice recognition PCB 40a.

Between the window 11 and the window support 12, a gasket 17e and 18e is installed. The gasket 17e and 18e prevents a voice, having passed through the voice passage hole 11c and 11d, from leaking via a gap between the window 11 and the window support 12, without flowing into the voice input hole 17d and 18d of the voice input PCB 17 and 18.

The gasket 17e and 18e includes: a first gasket 17e having an upper surface brought closely in contact with the bottom surface of the window 11 and a bottom surface brought closely into contact with the upper surface of the first voice input PCB 17; and a second gasket 18e having an upper surface brought closely into contact with the bottom surface of the window 11 and a bottom surface brought closely into contact with the upper surface of the second voice input PCB 18. A communication hole 17f and 18f includes: a first communication hole 17f formed in the first gasket 17e to allow the first voice passage hole 11c and the first voice input hole 17d to communicate with each other; and a second communication hole 18f formed in the second gasket 18e to allow the second voice passage hole 11d and the second voice input hole 18d to communicate with each other.

The gasket 17e and 18e may be formed in shape and size corresponding to the voice input PCB 17 and 18. The gasket 17e and 18e may be a double-side tape bonded to the upper surface of the voice input PCB 17 and 18. In this embodiment, the window 11 and the window support 12 are coupled to each other using a double-side tape. Thus, when the window 11 and the window support 12 is coupled to each other using a double-side tape, the gasket 17e and 18e is desirably formed as a double-side tape in order to allow the voice input PCB 17 and 18 to be easily coupled to the bottom surface of the window 11.

The communication hole 17f and 18f is formed in size larger than that of the voice input hole 17d and 18d formed in the voice input PCB 17 and 18. If the communication hole 17f and 18f is formed in size smaller than that of the voice input hole 17d and 8d, voice having passed through the voice passage hole 11c and 11d is not able to easily go inside the voice input hole 17d and 18d and thus voice recognition may not be performed precisely. In addition, in the case where the communication hole 17f and 18f is formed in size smaller than that of the voice input hole 17d and 18d or in size equal to that of the voice input hole 17d and 18d, when voice having passed through the voice passage hole 11c and 11d passes through the communication hole 17f and 18f, the gasket 17e and 18e slightly shapes due to vibration of the voice to thereby reduce adherence of the gasket 17e and 18e, and thus, the voice may leak through a gap between the window 11 and the gasket 17e and 18e and a gap between the gasket 17e and 18e and the voice input PCB 17 and 18. Thus, for precise voice recognition, it is desirable that the communication hole 17f and 18f is formed in size larger than that of the voice input hole 17d and 18d formed in the voice input PCB 17 and 18.

In this embodiment, the voice input hole 17d and 18d is formed in size equal to that of the voice passage hole 11c and 11d formed in the window 11. Thus, the communication hole 17f and 18f is formed in size larger than that of the voice passage hole 11c and 11d formed in the window 11. In the case the communication hole 17f and 18f is formed in size equal to or smaller than that of the voice passage hole 11c and 11d, when a voice having passed the voice passage hole 11c and 11d passes through the communication hole 17f and 18f, the gasket 17e and 18e slightly shakes due to vibration of the voice to thereby reduce adherence of the gasket 18e and 18e, and thus, the voice may leak through a gap between the window 11 and the gasket 17e and 18e and a gap between the gasket 17e and 18e and the voice input PCB 17 and 18. Thus, for precise voice recognition, it is desirable that the communication hole 17f and 18f is formed in size larger than that of the voice passage hole 11c and 11d.

Meanwhile, the voice passage hole 11c and 11d is formed at a position corresponding to the voice input PCB 17 and 18. That is, since the first voice input PCB 17 is relatively lopsided to the right side with reference to the center of the window support plate 121, and the second voice input PCB 18 is relatively lopsided to the left side with reference to the center of the window support plate 121, one first voice passage hole 11c is formed as being relatively lopsided to the right side with reference to the center of the window 11 in a front area of the center of the window 11, and one second voice passage hole 11d is formed as being relatively lopsided to the left side of the center of the window 11 in a rear area of the center of the window 11. Thus, positions of the voice passage holes 11c and 11d are vertically and horizontally symmetric with reference to the center of the window 11, so it may hinder exterior design of the voice recognition apparatus 1.

However, in the window 11 of this embodiment, two first deco holes 11e are formed next to the first voice passage hole 11c in the left-and-right direction in front of the center of the window 11, and two second deco holes 11f is formed next to the second voice passage hole 11d in the left-and-right direction at rear of the center of the window 11.

The two first deco holes 11e is formed on the left side of the first voice passage hole 11c in the opaque area 11a located in front of the transparent area 1ib of the window 11, and the two second deco hole 11f is formed on the right side of the second voice passage hole 11d in the opaque area 11a located at rear of the transparent area 1ib of the window 1.

The overall alignment of the first voice passage hole 11c and the two first deco holes 11e in the opaque area 11a located in front of the transparent area 1ib of the window is positioned at the center in the left-and-right direction in the front area of the center of the window 11. The overall alignment of the second voice passage hole 11d and the two second deco holes 11f in the rear area of the center of the window 11 is positioned at the center in the left-and-right direction of the center of the window 11. Accordingly, the window 11 is vertically and horizontally symmetrical to the center thereof, thereby improving the exterior design of the voice recognition apparatus 1.

Meanwhile, since the voice input PCB 17 and 18 needs to be connected to the harness cable 17b and 18b, a harness cable through-hole 152g and 152h penetrated by the harness cable 17b and 18b is formed in the partition 152 of the cover housing 15. It is desirable that the harness cable through-hole 152g and 152h is formed at a position corresponding to a wide-width portion of the slit 121a and 121b formed in the PCB accommodation space 12a and 12b so that the harness cable through-hole 152g and 152h is disposed below the PCB accommodation space 12a and 12b.

The upper end of the harness cable 17b and 18b is connected to the voice input PCB 17 and 18. The lower end of the harness cable 17b and 18b comes out of the bottom of the window support 12 through a wide-width portion of the slit 121a and 121b formed in the PCB, comes out of the bottom of the partition 152 through the harness cable hole 152g and 152h formed in the partition 152, and is then coupled to the voice recognition PC 40a installed on the upper surface of the main body 40.

The harness cable through-hole 152g and 152h includes: a first harness cable through-hole 152g penetrated by the first harness cable 17b which is connected to the first voice input PCB 17; and a second harness cable through-hole 125h penetrated by the second harness cable 18b which is connected to the second voice input PCB 18.

Figure 24:
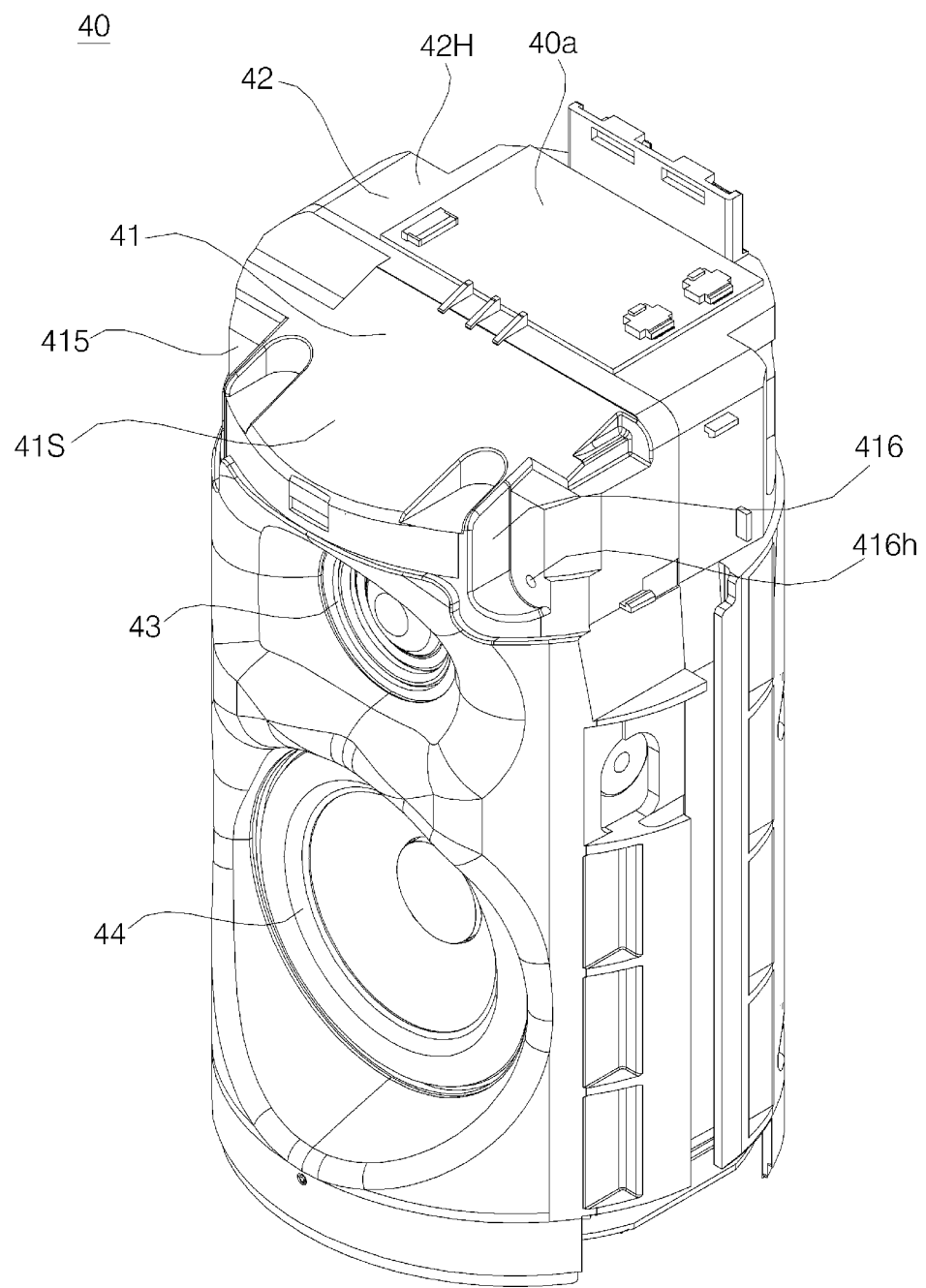
FIG. 24 is a perspective view showing an upper surface of a main body.
Figure 25:
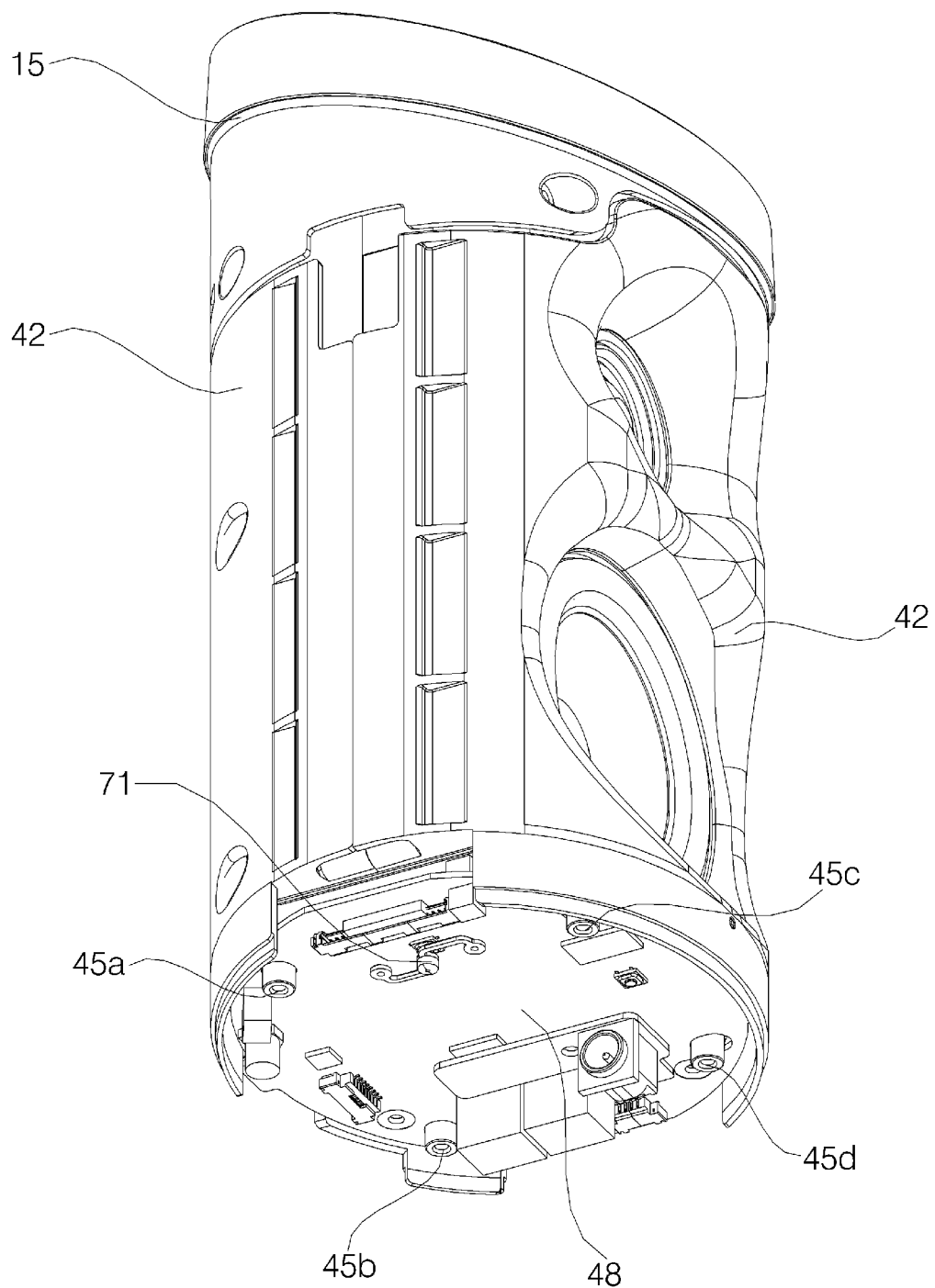
FIG. 25 shows a perspective view showing a bottom surface of the main body.
Figure 26:
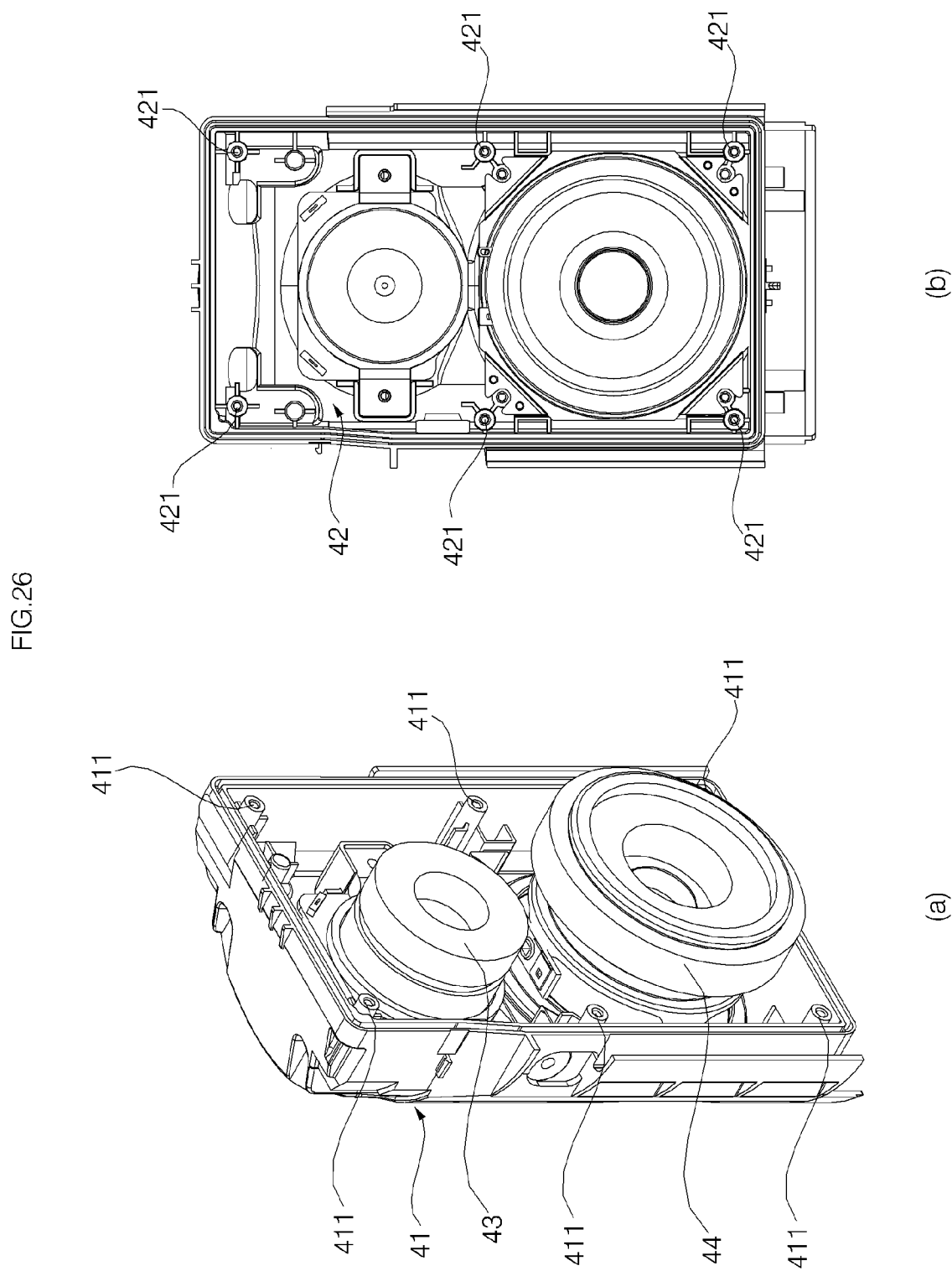
FIG. 26 shows a front-side case (a) and a front-side case (b)
Figure 27:
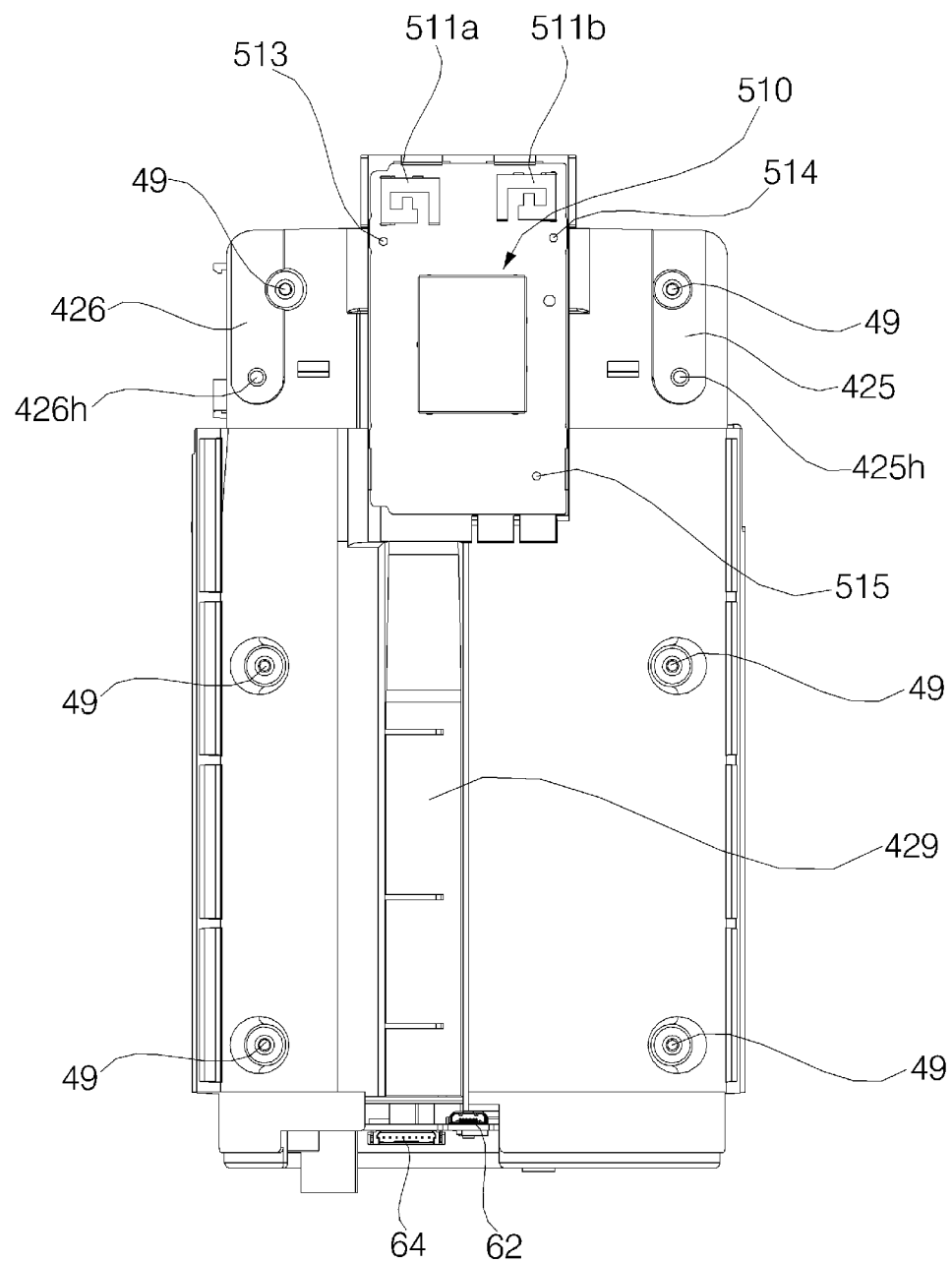
FIG. 27 shows a rear surface of a main body.
Figure 28:
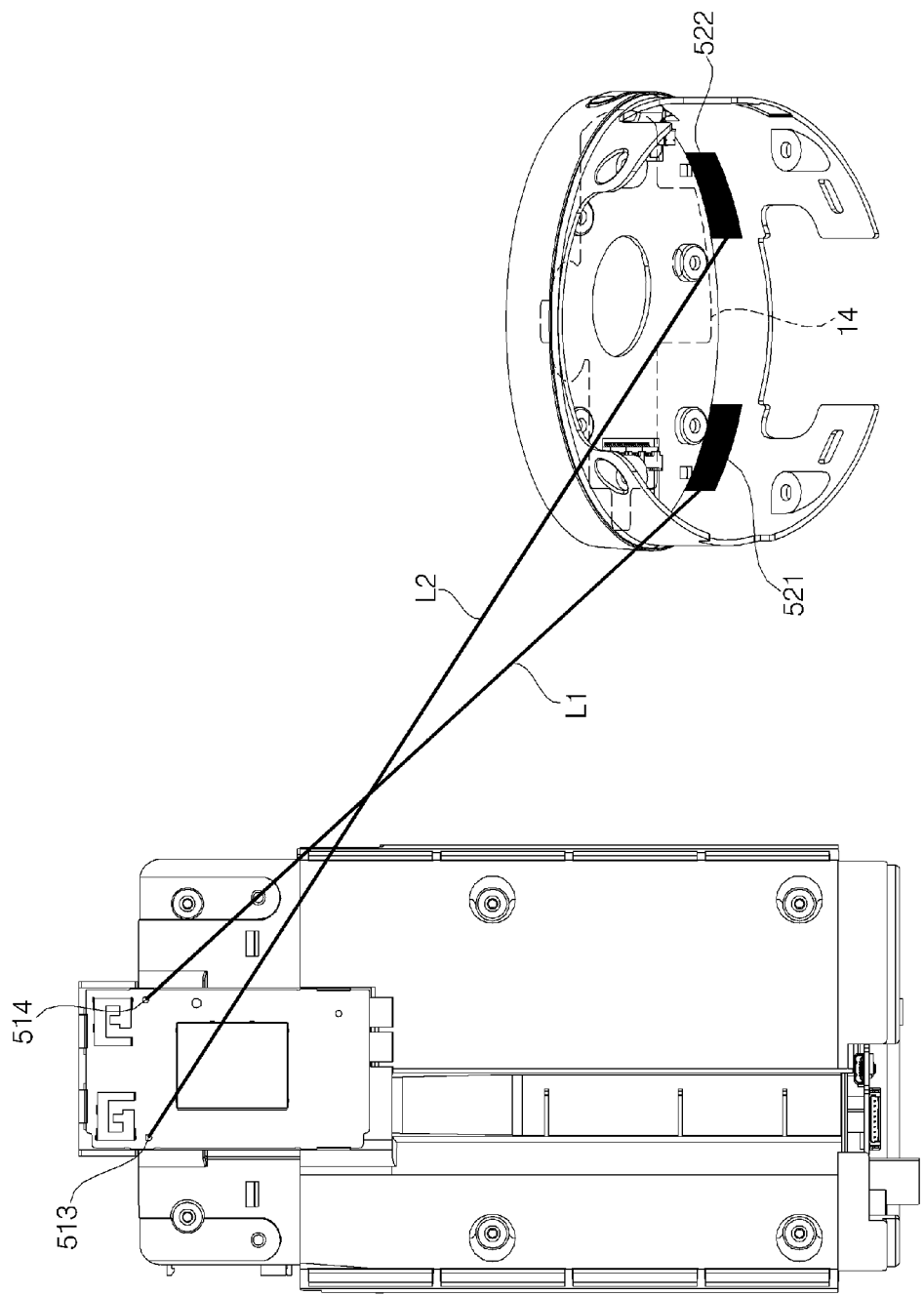
FIG. 28 is a diagram showing positions of antennas connected to a Wi-Fi module.
Figure 29:
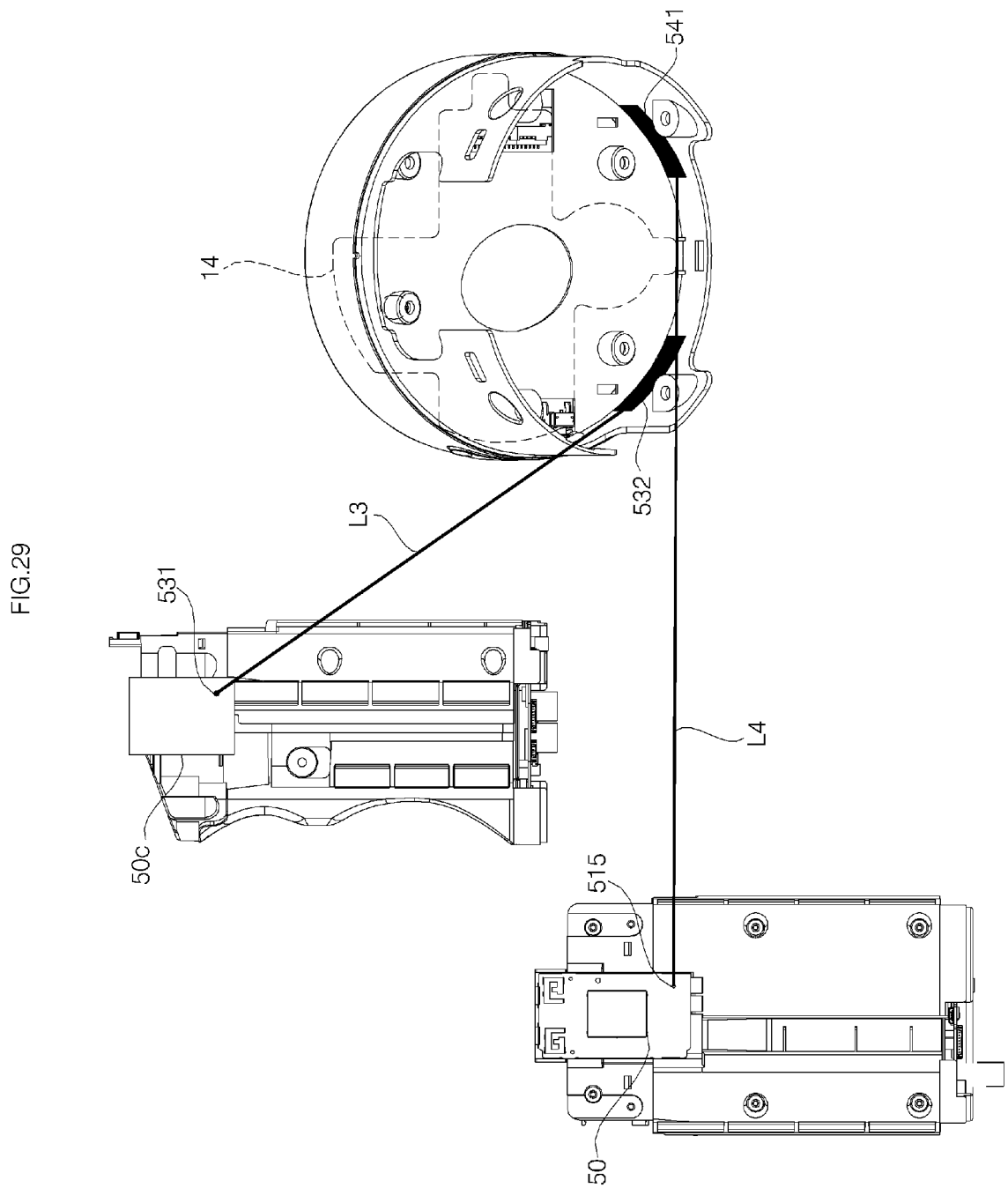
FIG. 29 is a diagram showing a position of an antenna connected to a Bluetooth module and a position of antenna connected to a Zigbee module.
Figure 30:
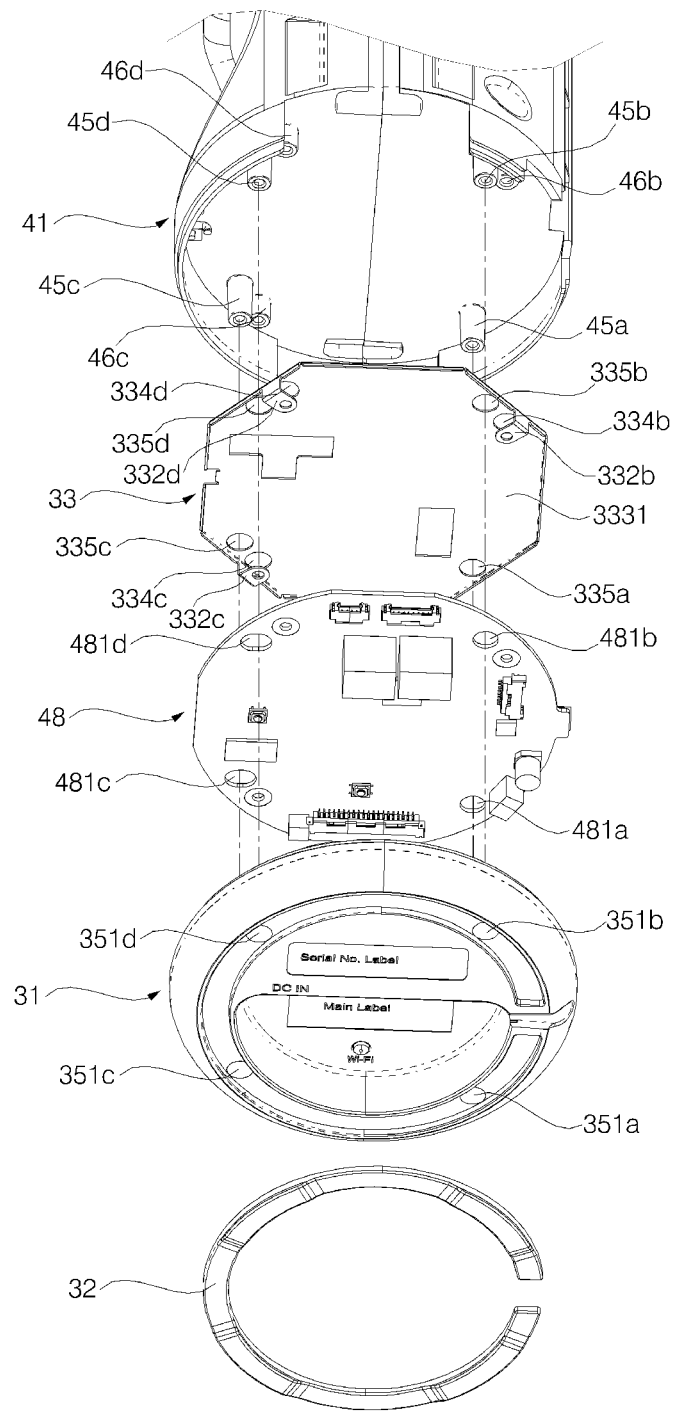
FIG. 30 is an exploded perspective view of a main body, a heatsink, a main PCB, a base body, and a support rubber.

FIG. 24 is a perspective view showing an upper surface of a main body. FIG. 25 shows a perspective view showing a bottom surface of the main body. FIG. 26 shows a front-side case (a) and a front-side case (b). FIG. 27 shows a rear surface of a main body. FIG. 28 is a diagram showing positions of antennas connected to a Wi-Fi module. FIG. 29 is a diagram showing a position of an antenna connected to a Bluetooth module and a position of antenna connected to a Zigbee module. FIG. 30 is an exploded perspective view of a main body, a heatsink, a main PCB, a base body, and a support rubber.

Referring to FIGS. 24 to 27, the voice recognition PCB 40a is disposed on the upper surface of the main body 40. The voice recognition PCB 40a analyzes a soundwave signal, received from the voice input PCB 17 and 18, to recognize a user's voice. The voice recognition PCB 40a is circuit-connected to the main PCB 48. The voice recognized by the voice recognition PCB 40a is input to a controller 240 of the main PCB 48. If a preset voice is include in the recognized voice received from the voice recognition PCB 40a, the controller 240 may communicate with a device corresponding to the preset voice from among nearby devices 2, 3a, 3b, and 5 via the communication module 50 so as to control a device corresponding to the preset voice in accordance of the recognized voice.

For example, if a user says "How is weather?" while operating one of the contact switches 181a, 181b, 181c, and 181d by pressing the window, the user's voice is input to the voice input PCB 17 and 18. The voice input PCB 17 and converts the user's voice into a soundwave signal recognizable by the voice recognition PCB 40a, and the soundwave signal is input to the voice recognition PCB 40a through the harness cable 152g and 152h. The voice recognition PCB 40a analyzes the soundwave signal, received from the voice input PCB 17 and 18, and recognize the user's voice as "How is weather?". The voice "How is the weather" recognized by the voice recognition PCB 40a is signaled and input to the controller 240 of the main PCB 48. If a preset voice "Weather" is included in the voice "How is the weather" recognized by the voice recognition PCB 40a, the controller 240 may receive weather information from the device capable of receiving weather information by controlling a device capable of receiving weather information through communication with the communication module 50 from among the nearby devices 2, 3a, 3b, and 5 and a device capable of receiving weather information.

Accordingly, the controller 240 may display the weather information on the display 13 and output the weather information in an audio form through the speakers 43 and 44.

In the upper surface of the main body 40, a front part is formed as a slope 41S having a front portion at a low height and a rear portion at a high height, and a rear part extending rearward from the front part may be formed as a horizontal surface 42H. The slope 41S is disposed parallel to the window 11, the window support 12, and the partition 152. That is, the upper surface of the speaker case 41 and 42 defining the exterior appearance of the main body 40 may have a front part, which is formed as the slope 41S having a front portion at a low height and a rear portion at a high height, and a rear part which is formed as the horizontal surface 42H extending rearward from the slope 41S. The voice recognition PCB 40a may be installed at the rear part of the upper surface of the main body 40, the rear part which is formed as a horizontal surface.

The window 11, the window support 12, and the partition 152 is inclined with a low front height and a high rear height, Thus, when the cover is coupled to the top of the main body 40, a space S for installation of the voice recognition PCB 40a may be provided between the rear part, which is the horizontal surface 42H, of the upper surface of the main body 40 and the partition 152 (see FIG. 5). Thus, it is desirable that the voice recognition PCB 40a is installed at the rear part which is formed as the horizontal surface 42H in the upper surface of the main body 40.

The speaker case 41 and 2 may include: a front case 41 defining the front part of the main body 40; and a rear case coupled to the rear of the front case 41 to thereby define the rear experience of the main body 40. Between the rear case 42 and the front case 41, there is formed a cavity 49. The upper surface of the front case 41 is formed as a slope 41S having a low front height and a high rear height, and the upper surface of the rear case 42 is formed as a horizontal surface 42H. Thus, when the cover 10 is coupled to the top of the main body 40, a space S for installation of the voice recognition PCB 40a is provided between the partition 152 and the rear case 42. Thus, it is desirable that the voice recognition PCB 40a is installed at the upper surface of the rear case 42. The voice recognition PCB 40a may be mounted to the upper surface of the rear case 42 using an adhesive member such as a double-side tape.

In the front case 41, there may be formed a pair of sound output hole which is formed to face the front and which vertically exposes diaphragms (membranes) of the tweeter 43 and the woofer 44.

Case position protrusions 311 protruding rearward may be formed at multiple points in an inner surface of the front case 41. In the embodiment, the case position protrusions 411 are formed at two points on the let and right sides at a constant height, and the case position protrusions 411 are formed such that each pair of case position protrusions 411 is formed at three height points in the same manner described above. However, aspects of the present invention are not limited thereto.

Insertion bosses 421 are formed in the rear case 42 at positions corresponding to the case position protrusions formed in the front case 41. Bolts passes through the respective insertion bosses 421 from the rear of the rear case 42 to be fastened to the case position protrusions 411.

A pair of fastening bosses 153c and 153d may be recessed rearward in the front surface of the upper end holder 153 (see FIGS. 14 to 16). A pair of fastening bosses 153a and 153b are recessed rearward on the left and right sides of the rear surface of the upper end holder 153.

To correspond to the fastening bosses 153a, 153b, 153c, and 153d formed in the cover housing 15, there may be formed first and second boss insertion groove 415 and 415 in the front case 41 of the main body 40, and third and fourth boss insertion grooves 425 and 426 in the rear case 42 of the main body 40.

Referring to FIG. 24, the first and second boss insertion grooves 415 and 416 are respectively recessed rearward from the front surface (a surface facing the front of the voice recognition apparatus 1) of the front case 41, while the upper portions of the first and second boss insertion grooves 415 and 416 are open so that the fastening bosses 153c and 153d are inserted from above into the first and second boss insertion grooves 415 and 416.

Referring to FIG. 27, the third and fourth boss insertion grooves 425 and 427 are respectively recessed forward from the rear surface (a surface facing the rear of the voice recognition apparatus 1) of the rear case 42, while the upper portions of the third and fourth boss insertion grooves 425 and 427 are open so that the fastening bosses 153a and 153b are inserted from above into the third and fourth boss insertion grooves 425 and 427.

A fastening hole through which a bolt passes may be formed at each of the boss insertion grooves 415, 416, 425, and 426. Only a fastening hole 416h formed in the second boss insertion groove 416 is illustrated in the drawings, but When inserted into the boss insertion grooves 415, 416, 425, and 426, respectively, the fastening bosses 153a, 153b, 153c, and 153d may reach positions corresponding to the fastening holes 415h, 416h, 425h, and 426h and bolts may pass through the respective fastening holes 415h, 416h, 425h, and 426h to be fastened to the fastening bosses 153a, 153b, 153c, and 153d.

Referring to FIGS. 27 to 27, at least one communication module 50 may be disposed in the main body 40. The communication module 50 may be connected to a circuit of the main PCB 48 and/or the display PCB 14 and thereby controlled by the controller 240. In the embodiment, a Wi-Fi module 50a, a Bluetooth module 50b, a Zigbee module 50c are provided as the communication module 50. However, aspects of the present invention are not limited thereto, and a Z-wave module may be provide.

A module assembly 510 is a set of the Wi-Fi module 50a and the Bluetooth module 50b, and may be disposed at the rear side of the main body 40. The module assembly 510 may be disposed in the rear case 42.

The module assembly 510 may be coupled to or separated from the rear case 42 as one body. However, aspects of the present invention are not limited thereto, and the Wi-Fi module 50a and the Bluetooth module 50b may be provided separately and individually coupled to or separated from the main body 40.

The module assembly 510 may include a pair of antennas 511a and 511b which transmits and receives a signal. The pair of antenna 511a and 511b is basically provided in the module assembly 510, but aspects of the present invention are not limited thereto and at least one antenna 521 and 522 may be further provided at a position spaced apart from the module assembly 510 (see FIGS. 27 to 29).

In the module assembly 510, there may be provided a first antenna connection terminal 513 and a second antenna connection terminal 514 of the Wi-Fi module 50a, and a antenna connection terminal 515 of the Bluetooth module 50b. In addition, a first antenna 521 and a second antenna 522 may be provided in the left and right sides of the rear part in the inner surface of the side wall 151 of the cover housing 15. The first antenna 521 may be connected to the first antenna connection terminal 513 via a wire L1, and the second antenna 522 may be connected to the second antenna connection terminal 514 via a wire L2.

Each of the first antenna 521 and the second antenna 522 is a conductor of a specific pattern coupled to a thin film. The wires L1 and L2 are connected to the conductor.

The side wall 151 of the cover housing 15 is positioned in the upper side of the grill 20, and thus not surrounded by the grill 20. Thus, as the first antenna 521 and the second antenna 522 are positioned on the side wall 151, signal interference from the metallic grill 20 is reduced, thereby enabling precise transmission and reception of a signal.

In addition, the side wall 151 may be formed such that the height of the upper end thereof becomes distal from the partition 152 in a front-to-rear direction. In this case, the rear part of the side wall 151 may form a greater gap with the display PCB 14 mounted to the partition 152, compared to the front part of the side wall 151. Thus, as the first antenna 521 and the second antenna 522 are positioned in the rear part of the side wall 151, it is possible to place the antennas 521 and 522 more distal from the display PCB 14 and to reduce signal interference caused by a magnetic field generated by a current flowing in a circuit of the display PCB 14.

Meanwhile, the Zigbee module 50c may be provided at any one of the left side and the right side of the main body 40. In the inner surface of the front part of the side wall 151 of the cover housing 15, there may be provided a third antenna 532 connected to an antenna connection terminal 531 of the Zigbee module 50c via a wire L3, and a fourth antenna 541 connected to an antenna connection terminal 515 of the Bluetooth module 50b via a wire L4.

Each of the third antenna 532 and the fourth antenna 541 is a conductor of a specific pattern coupled to a thin film, and connected to the conductor via the wires L3 or L4. The third antenna 532 and the fourth antenna 541 may be attached to the side wall 151 of the cover housing 15 by a double-side tape.

Referring to FIG. 30, the main PCB 48 may be disposed in a space formed between the main body 40 and the base 30. The main PCB 48 controls overall operation of the voice recognition apparatus. In the main PCB, there are mounted the controller 240, a USB port 62, a data transport port 64, a variety of switches, a receptacle, etc. In addition, the main PCB 48 is circuit-connected to a variety of electronic devices, such as the communication modules 50a and 50c, the display PCB 14, the tweeter 43, and the woofer 44.

Between the main PCB 48 and the main body 40, there may be a heatsink 33. The heatsink is a processed metal plate, and desirably formed of aluminum. The heatsink 33 disperses heat, discharged from the pain PCB 48, to an upper space (that is, a space between the bottom surface of the main body 40 and the heatsink 33).

A plurality of fastening bosses 45a, 45b, 45c, and 45d may protrude from the bottom surface of the main body 40. A first fastening boss 45a and a second fastening boss 45b may protrude from the bottom surface of the rear case 42, and a third fastening boss 45c and a fourth fastening boss 45d may protrude from the bottom surface of the front case 41. The fastening bosses 4a, 45b, 45c, and 45d may be coupled to the base 30.

If the bottom surface of the main body 40 is partitioned by a horizontal line and a vertical line crossing the center of the bottom surface, the fastening bosses 45a, 45b, 45c, and 45d may be formed in the four quadrants partitioned by the horizontal line and the vertical line.

In the base 30, there may be formed insertion bosses at positions respectively corresponding to the fastening bosses 45a, 45b, 45c, and 45d. Each of the fastening bosses 45a, 45b, 45c, and 45d may be inserted into a corresponding insertion boss. When inserted into the corresponding insertion boss, each of the fastening bosses 45a, 45b, 45c, and 45d may be fastened to a bolt passing upward through the corresponding insertion boss.

A plurality of heatsink support bosses 46b, 46c, and 46d may further protrude from the bottom surface of the main body 40. The heatsink support bosses 46b, 46c, and 46d may be disposed at positions adjacent to the fastening bosses 45a, 45b, 45c, and 45d. In the embodiment, the heatsink support bosses 46b, 46c, and 46d are formed in three out of the four quadrants, but the number of heatsink support bosses is not limited thereto.

The heatsink 33 is a processed metal plate, and it is desirable that the heat sink 33 is formed of aluminum or stainless steel. However, any other metal material may be used. The heatsink 33 may include a horizontal flat board 3331 and a plurality of support tabs 332b, 332c, and 332d extending from the circumference of the flat board 3331.

Through-holes 335a, 335b, 335c, and 335d respectively penetrated by the fastening bosses 45a, 45b, 45c, and 45d, and through-holes 334b, 334c, and 334d respectively penetrated by the support bosses 46b, 46c, and 46d may be formed in the flat board 3331.

The support bosses 46, 46c, and 46d may be coupled to the support tabs 332b, 332c, and 332d in the upper side of the main PCB 48. The support tabs 332b, 332c, and 332d may include a vertical portion extending downward from the flat board 3331, and a horizontal part horizontally bent from the vertical part. A fastening hole through which a bolt passes is formed in the horizontal part of each of the support tabs 332b, 332c, and 332d, and, after bolts pass upward through the respective fastening holes, the bolts may be fastened to the support bosses 46b, 46c, and 46d.

When the support bosses 46b, 46c, and 46d are fastened to the support tabs 332b, 332c, and 332d, the flat board 3331 is spaced apart from the bottom surface of the main body 40, which is above the flat board 3331, and the flat board 3331 is spaced apart from even the main PCB 48, which is below the flat board 3331. Since the flat board 3331 is spaced apart from the bottom surface of the main body 40, tapping noise caused by contact of the bottom surface of the main body 40 and the flat board 3331 does not occur even when the main body 40 vibrates due to outputting of the speakers 43 and 44.

In the main PCB 48, there may be formed through-holes 481a, 481b, 481c, and 481d at positions respectively corresponding to the through-holes 335a, 335b, 335c, and 335d of the heatsink 33. A length of each of the fastening boss 45a, 45b, 45c, and 45d is longer than that of each of the support boss 46b, 46c, and 46d. The fastening bosses 45a, 45b, 45c, and 45d may pass through the through-holes 335a, 335b, 335c, and 335d of the heatsink 33 and the through-holes 481a, 481b, 481c, and 481d of the main PCB 48 and be then inserted into insertion bosses of the base 30.

The base 30 may include: a base body 31 which has an open upper surface and in which a specific space is formed inside; and a support rubber 32 which is fixed onto the bottom surface of the base body 31. The voice recognition apparatus 1 is manufactured in a small size to allow a user to lift the voice recognition apparatus 1. The voice recognition apparatus 1 may be placed in a floor, such as a table and a shelf. The support rubber 32 provided at the bottom of the base body 31 increases friction against the floor so that the voice recognition apparatus 1 is prevented from falling down.

The insertion bosses formed in the base 30 protrude upward from the inner surface of the body 31, and through-holes (351a, 351b, 351c, and 351d respectively communicating with the insertion bosses may be formed in the base bottom of the base body 31.

After the main body 40 and the heatsink 33 are assembled, the fastening bosses 45a, 45b, 45c, and 45d are allowed to pass through the fastening boss through-holes 481a, 481b, 481c, and 481d formed in the main PCB 48. Next, the fastening bosses 45a, 45b, 45c, and 45d are inserted into the insertion bosses formed in the base 30. Next, bolts (not shown) are inserted into the fastening holes 351a, 351b, 351c, and 351d from the bottom of the base 30 and fastened to the fastening bosses 45a, 45b, 45c, and 45d inside the insertion bosses.

FIG. 31 is a diagram schematically illustrating a smart home system including a voice recognition server system and a voice recognition apparatus according to an embodiment of the present invention.

Referring to FIG. 31, a smart home system 10 according to an embodiment of the present invention may be composed of a voice recognition apparatus 1 including a communication module (not shown) to communicate with another device or access a network; and a voice recognition server system 1100 including a plurality of server for voice recognition and home appliance control.

Meanwhile, the voice recognition apparatus 1 is an apparatus enabled to recognize voice.

In addition, the smart home system 10 according to an embodiment of the present invention may include a mobile terminal (not shown), such as a smart phone and a tablet PC.

The voice recognition apparatus 1 includes a communication module inside to communicate with electronic devices inside/outside the smart home system 10.

The smart home system 10 according to an embodiment of the present invention may further include an Access Point (AP) device 7, and the voice recognition apparatus 1 may access a wireless internet network the AP device 7 to communicate with other devices.

The AP device 7 may allocate a wireless channel to electronic devices located in the smart phone system 10 according to a specific communication scheme, and perform wireless data communication via the corresponding channel.

The specific communication scheme may be a Wi-Fi communication scheme. In response, a communication module included in the voice recognition apparatus 1 may be a Wi-Fi communication module, but aspects of the present invention are not limited thereto.

Alternatively, the voice recognition apparatus 1 may include a different type of communication module or a plurality of communication modules. For example, the voice recognition apparatus 1 may include a near field communication (NFC) module, a Zigbee communication module, a Bluetooth communication module, etc.

The voice recognition apparatus 1 may be connected, using a Wi-Fi communication module, to a server included in the voice recognition server system 1100, an external server, or a user's mobile terminal, and may support smart functions such as remote monitoring and remote controlling.

Using the mobile terminal, the user may check information about the voice recognition apparatus 1 in the smart home system 10 or may control the voice recognition apparatus 1.

Meanwhile, in order to control the voice recognition apparatus 1 or check specific information at home, the user needs to use the mobile terminal and this may be inconvenient.

For example, if the user does not know where the mobile terminal is now or if the mobile terminal is in a difference place, it is more efficient to have another means for controlling the voice recognition apparatus 1 in a different way.

The voice recognition apparatus 1 according to an embodiment of the present invention may receive a user's voice input, and the voice recognition server system 1100 may recognize and analyze the user's voice input to control the voice recognition apparatus 1.

Accordingly, the user is able to control the voice recognition apparatus 1 even without manipulating a mobile terminal, a remote control device, or the like.

Meanwhile, at least some of servers included in the voice recognition server system 1100 may be a server operated by a manufacturing or selling company of corresponding voice recognition apparatus or a server operated by a firm commissioned from the manufacturing or selling company.

Figure 32A:
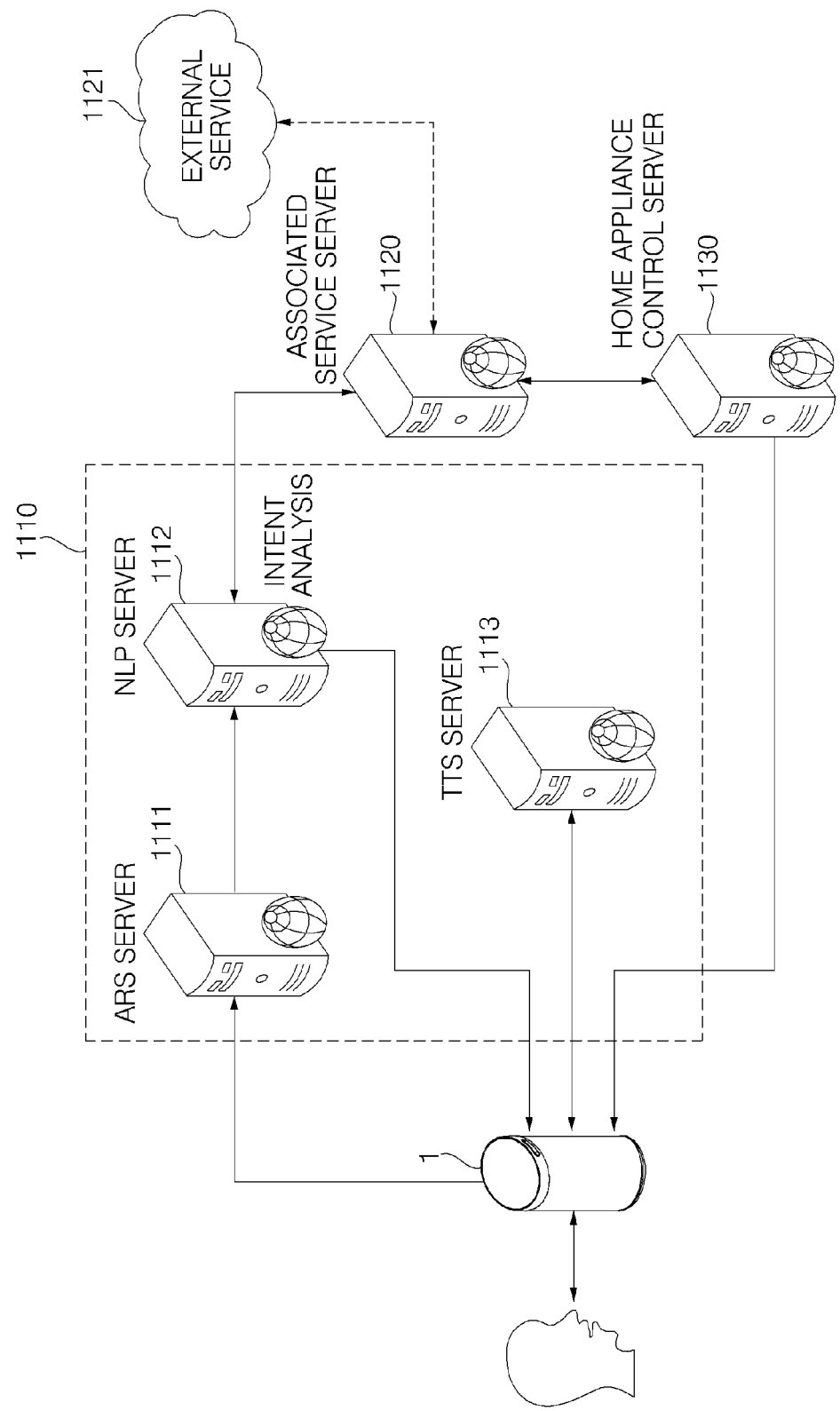
FIG. 32A shows an example of a voice recognition server system according to an embodiment of the present invention.

FIG. 32A shows an example of a voice recognition server system according to an embodiment of the present invention.

Referring to FIG. 32A, a voice recognition server system according to an embodiment of the present invention may include a voice server 1110, which is configured to receive voice data from the voice recognition apparatus 1 and determine a voice command by analyzing the received voice data.

The voice server 1110 may receive voice data from the voice recognition apparatus 1, convert the received voice data into text data, and analyze the text data so as to determine a voice command.

In addition, the voice server 1110 may transmit a signal corresponding to the determined voice command to a specific server.

For example, the voice recognition server system according to an embodiment of the present invention may include: an associated service server 1120 which receives a signal corresponding to the determined voice command from the voice server 1110 and generate a request signal corresponding to the determined voice command; and a home appliance control server 1130 which transmits a control signal, which is based on the request signal received from the associated service server 1120, to the voice recognition apparatus 1.

The voice recognition apparatus 1 may receive a voice command input uttered by a user, and transmit voice data based on the received voice command input to the voice server 1110.

The voice server 1110 may include: an Automatic Speech Recognition (ASR) server 111 configured to receive voice data from the voice recognition apparatus 1 and convert the received voice data into text data; a Natural Language Processing (NLP) server 1112 configured to receive the text data from the ASR server 1111, determine a voice command by analyzing the received text data, and transmit a response signal based on the determined voice command to the voice recognition apparatus 1; and a Text to Speech (TTS) server 113 configured to receive a signal including a text corresponding to the response signal from the voice recognition apparatus 1, convert the text included in the received signal into voice data, and transmit the voice data to the voice recognition apparatus 1.

The NSR server 1111 may generate text data by performing voice recognition on voice data received from the voice recognition apparatus 1, and transmit the text data to the NLP server 1112.

The NLP server 1112 may determine a voice command by analyzing the text data received from the ASR server 1111 according to a natural language processing algorithm.

The NSP server 1112 may process natural language, commonly used by humans, according to the natural language processing algorithm and analyze a user's intent. The NLP server 1112 may determine a voice command coinciding with the user's intent, by performing natural language processing on text data received from the ASN server 1111.

Accordingly, even though a user inputs a voice command with a commonly used language, the NLP server 1112 may determine a voice command that coincides with the user's intent.

The NLP server 1112 may transmit a signal corresponding to a result of natural language processing, that is, a signal corresponding to the determined voice command, to the associated service server 1120.

The associated service server 1120 may receive the signal corresponding to the determined voice command from the NLP server 1112.

When the determined voice command is about the voice recognition apparatus 1, the associated service server 1120 may perform an operation corresponding to the determined voice command by communicating with the home appliance control server 1130.

Alternatively, when the determined voice command is not about the voice recognition apparatus 1, the associated service server 1120 may perform an operation corresponding to the determined voice command by communicating with the external service 1121.

For example, when the determined voice command is a command for requesting information on weather, stock, news, or the like, the associated service server 1120 may request the requested corresponding information from a server which provides services corresponding to the requested information, and receive the requested information from the server.

In addition, the associated service server 1120 may transmit the received information to the voice server 1110, and the NLP server 1112 may transmit received information to the voice recognition apparatus 1.

When the determined voice command is about the voice recognition apparatus 1, the associated service server 1120 may generate a request signal corresponding to the determined voice command and transmit the request signal to the home appliance control server 1130.

The home appliance control server 1130 may transmit a control signal, which is based on the request signal received from the associated service server 1120, to the voice recognition apparatus 1.

For example, when a request for playing music is received form the voice recognition apparatus 1, the home appliance control server 1130 may transmit a control signal for playing music to the voice recognition apparatus 1.

Meanwhile, the voice recognition apparatus 1 may perform a corresponding operation in accordance with the control signal received from the home appliance control server 1130.

In addition, after performing a requested operation, the voice recognition apparatus 1 may transmit a signal indicative of completion of the requested operation to the home appliance control server 1130.

In addition, the home appliance control server 1130 may receive a response signal from the voice recognition apparatus 1 in response to the control signal, and transmit processing result information corresponding to the response signal to the associated service server 1120.

The voice server 1110 may transmit the response signal, including the processing result information, to voice recognition apparatus 1.

The voice server 1110 may receive a signal, including an output text corresponding to the processing result information, from voice recognition apparatus 1, convert the received output text into voice data, and transmit the voice data to the voice recognition apparatus 1.

In this case, the response signal transmitted by the NLP server 1112 to the voice recognition apparatus 1 based on the determined voice command may include the processing result information.

Meanwhile, the voice recognition apparatus 1 may receive a response signal, which is based on the determined voice command, from the NLP server 1112. The response signal may include text data corresponding to the determined voice command.

For example, a user inputs a voice command to request playing music, the response signal may include text data indicating that music starts to play.

Meanwhile, the voice recognition apparatus 1 may transmit a signal including a text corresponding to the received response signal to the TTS server 1113. The signal including a text corresponding to the response signal may include an output text corresponding to the processing result information.

Meanwhile, the TTs server 1113 may convert the text included in the received signal into voice data, and transmit the voice data to the voice recognition apparatus 1. The voice data may include a source audio file.

The voice recognition apparatus 1 may output, through a speaker, an audible guidance message which is based on the received voice data.

Meanwhile, the associated service server 1120 may request state information of the voice recognition apparatus 1 from the home appliance control server 1130 based on a signal corresponding to the determined voice command. The home appliance control server 1130 may transmit the state information of the voice recognition apparatus 1 to the associated service server 1120. When the state information of the voice recognition apparatus 1 is not secured, the home appliance control server 1130 may request and receive the state information from the voice recognition apparatus 1.

Meanwhile, when the determined voice command is supported based on the state information of the voice recognition apparatus 1, the associated service server 1120 may transmit a request signal corresponding to the determined voice command to the home appliance control server 1130.

Alternatively, when the determined voice command is not supported based on the state information of the voice recognition apparatus 1, the associated service server 1120 may transmit, to the NLP server 1112, a signal for notifying that the determined voice command is about a function not supported in the current state.

Even in this case, the voice recognition apparatus 1 may request and receive voice data from the TTS server 1113, and output an audible guidance message for notifying that the determined voice command is a function not supported in the current state.

In some implementations, the voice server 1110 may determine whether or not the determined voice command is supported. For example, the NSP server 1112 having analyzed the intent of the user's voice command may determine whether or not the determined voice command is supported.

In this case, if the determined voice command includes an unsupported command, a response signal based on the determined voice command, the signal which is transmitted by the NLP server 1112, may be a signal indicating that the determined voice command is a function not supported by the voice recognition apparatus 1.

The voice server 1110 according to an embodiment of the present invention, and the voice recognition server system 100 including the voice server 1110 may connect and use servers which perform various functions for processing of natural-language voice.

The voice recognition apparatus 1 may perform operations from receiving and pre-processing of a voice command to transmitting the voice command to a server, and the voice server 1110 may perform natural language processing operations such as conversion of a voice/text, analysis of an intent, identification of a command, etc.

As the voice server 1110 performs natural-language processing, this may reduce the burden on a CPU of an embedded module and a memory in the voice recognition apparatus.

Meanwhile, the associated service server 1120 may perform an operation based on a user's voice command by communicating with an external service server or a home appliance control server 1130.

Meanwhile, the voice recognition apparatus 1 may receive voice data including an audio file from the voice server 1110 and output an audible guidance message so as to provide an audible feedback in response to a user's voice input.

The voice recognition apparatus 1 may receive a voice file from the voice server 1110 via a streaming media, and playback or output an audible guidance message to a user. Accordingly, the voice recognition apparatus 1 does not need to store diverse audio files.

Meanwhile, via the associated service server 1120, it is possible to be associated with various external services without colliding with other servers. In addition, using the external service associated server, an intention analysis rate may be enhanced by reflecting external information during intent analysis.

The voice recognition server system 1100 according to an embodiment of the present invention may secure compatibility and connectivity using a plurality of servers. In addition, using the home appliance control server 1130, a final control command may prevent a collision between a voice recognition process and a home appliance controlling process performed by the home appliance control server 1130 through Wi-Fi communication, and a collision between a home appliance controlling processing through a mobile terminal and a home appliance controlling process upon a voice input through the voice recognition apparatus 1.

The voice recognition server system 1100 according to an embodiment of the present invention may reduce the problem that loads are focused on one specific server, through organic connection of servers. Each server performs a different function, and thus, when a problem occurs in a specific server, it is possible to address the problem by associating with a different server which performs the same function.

In addition, a plurality of servers may be updated independently from time to time, and it is advantageous in improving performance.

Figure 32B:
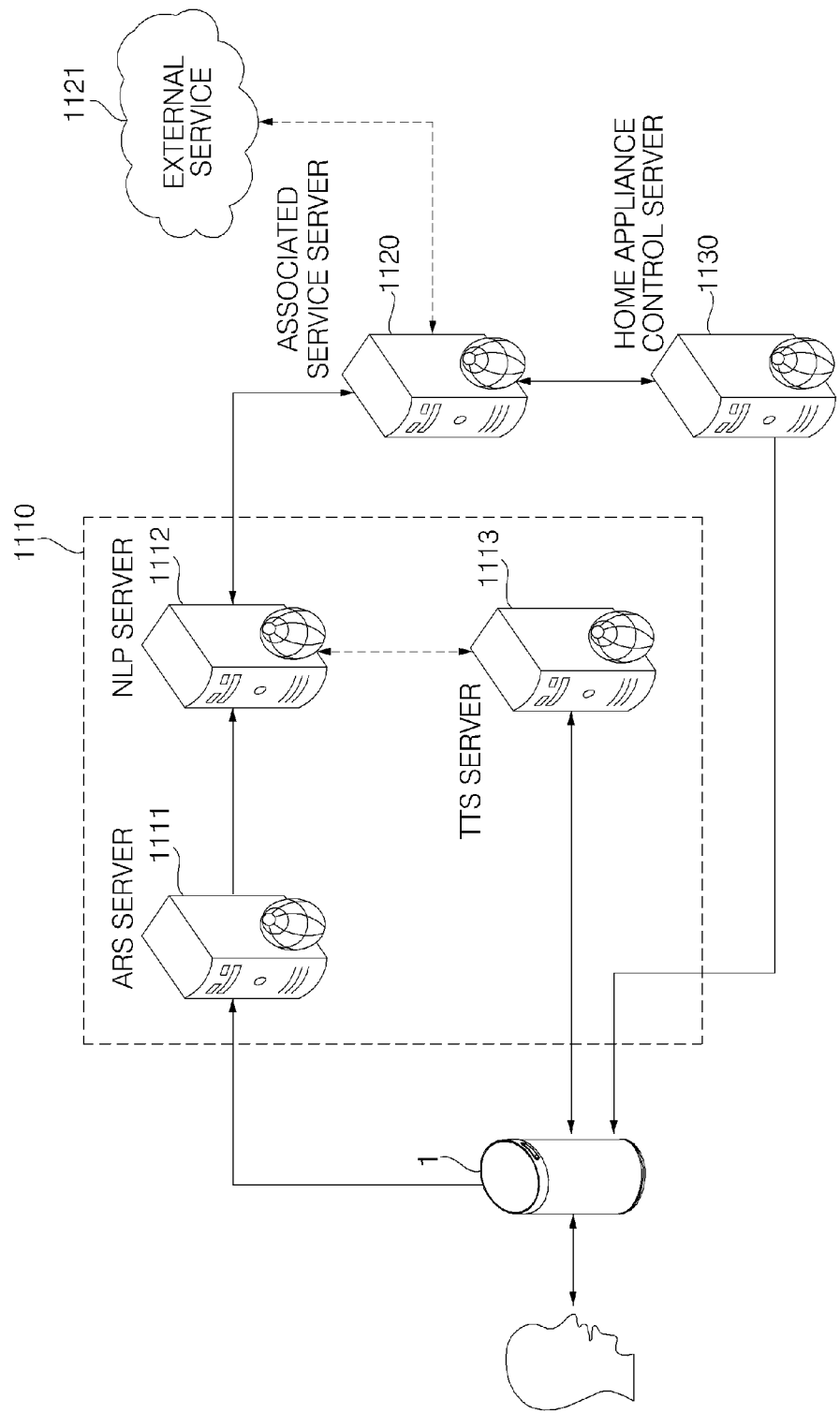
FIG. 32B shows an example of a voice recognition server system according to an embodiment of the present invention.

FIG. 32B shows an example of a voice recognition server system according to an embodiment of the present invention.

The voice recognition server system shown in FIG. 32B is an example of the voice recognition server system shown in FIG. 32A of which a process of transmitting voice data for outputting of an audible guidance message to the voice recognition apparatus 1 has improved to reduce a voice control response time.

Thus, the voice recognition server systems shown in FIGS. 32A and 32B may perform other operations substantially in the same way, and only the identical parts between the two systems will be briefly described.

Referring to FIG. 32B, a voice recognition server system according to an embodiment of the present invention may include a voice server 1110 configured to receive voice data from the voice recognition apparatus 1 and analyze the received voice data to determine a voice command.

In addition, the voice recognition server system according to an embodiment of the present invention may include: an associated service server 1120 configured to a signal corresponding to the determined voice command from the voice server 1110, and generate a request signal corresponding to the determined voice command; and a home appliance control server 1130 configured to transmit, to the voice recognition apparatus 1, a control signal which is based on the request signal received from the associated service server 1120.

In the voice recognition server system shown in FIG. 32B, the voice server 1110 may transmit voice data, including processing result information which is based on the voice command, to the voice recognition apparatus 1 even without a request from the voice recognition apparatus 1.

The voice server 1110 may include: an ASR server 11 configured to receive voice data from the voice recognition apparatus 1 and convert the received voice data into text data; a NLP server 1112 configured to receive the text data from the ASR server 1111 and analyze the received text data to determine a voice command; and a TTS server 1113 configured to convert a response signal based on the voice command into voice data and transit the voice data to the voice recognition apparatus 1.

In this embodiment, the home appliance control server 1130 may receive a response signal from the voice recognition apparatus 1 in response to the control signal, and transmit processing result information corresponding to the response signal to the associated service server 1120.

The associated service server 1120 may transmit the processing result information to the voice server 1110, especially, the NLP server 1112.

In this case, the voice data transmitted by the TTS server 1113 to the voice recognition apparatus 1 may include the processing result information.

In addition, the associated service server 1120 may request state information of the voice recognition apparatus 1 from the home appliance control server 1130 based on a signal corresponding to the determined voice signal, and the home appliance control server 1130 may transmit the state information of the voice recognition apparatus 1 to the associated service server 120.

In addition, when the determined voice command is supportable based on the state information of the voice recognition apparatus 1, the associated service server 1120 may transmit a request signal corresponding to the determined voice command to the home appliance control server 1130.

Alternatively, when the determined voice command is not supported based on the state information of the voice recognition apparatus 1, the associated service server 1120 may transmit, to the voice server 1110, a signal for notifying that the determined voice command is a function not supported in the current state.

For example, the associated service server 1120 may transmit, to the NLP server 1112, a signal for notifying that the determined voice command is about a function not supported in the current state.

In addition, the NLP server 1112 may transmit, to the TTS server 1113, a signal for notifying that the determined voice command is about a function not supported in the current state, and the TTS server 1113 may generate corresponding voice data and transmit the voice data to the voice recognition apparatus 1.

The voice recognition apparatus 1 may receive the voice data from the TTS server 1113, and output an audible guidance message for notifying that the determined voice command is about a function not supported in the current state.

In some implementations, the voice server 1110 may determine whether or not the determined voice command is supported. For example, the NLP server 1112 having analyzed intent of a user's voice command may determine whether the determined voice command is supported.

In this case, if the determined voice command includes an unsupported command, a response signal based on the determined voice command, the signal which is transmitted by the NLP server 1112, may be a signal indicating that the determined voice command is a function not supported by the voice recognition apparatus 1.

If the voice recognition apparatus 1 operates first and then requests voice guidance about a corresponding operation from the TTS server 1113 in the last stage, there may be a time gap between performing of the corresponding operation and outputting of the voice guidance.

However, according to an embodiment of the present invention, at a time when an operation request is transmitted from the NLP server 1112 after completion of intent analysis, information may be simultaneously provided to the TTS server 1113.

In addition, around when the home appliance control server 1130 transmits a control command to the voice recognition apparatus 1 the TTS server 1113 may provide an audible comment to the voice recognition apparatus 1.

Accordingly, the audible comment may be output at the same time when or right after operation of the voice recognition apparatus 1.

According to this embodiment, by connecting the NLP server 1112 and the TTS server 1113 directly, it is possible to reduce an interval between outputting of a control command and outputting of the audible comment via the home appliance control server 1130.

Meanwhile, although the a voice recognition apparatus performing a hub function is described with reference to FIGS. 32A and 32B as an example of the voice recognition apparatus 1, aspects of the present invention are not limited. For example, the voice recognition apparatus 1 may be the robot cleaner, the refrigerator, the washing machine, the cooking appliance, a TV, a mobile terminal (a smart phone, a wearable device, etc.), a vehicle, a lighting device, a temperature adjusting device, etc.

According to one aspect of the present invention, unlike the examples shown in FIGS. 32A and 32B, the NSR server 1111, the NLP server 1112, and the TTS server 1113 for voice recognition and processing may be configured as one integrated server.

In addition, in some implementations, the associated service server 1120 and the home appliance control server 1130 may be configured as one integrated server.

According to the present invention, a voice recognition apparatus operates upon a voice input, and thus, a user does not needs to manipulate a remote control device, such as a remote controller, or a mobile terminal, thereby improving user convenience.

In addition, as described above with reference to FIGS. 32A and 32B, the present invention recognizes a user's natural-language voice command and performs a corresponding control operation, thereby enabled to recognize and process a natural language without a limitation to system resources of a voice recognition apparatus and each server.

Figure 33:
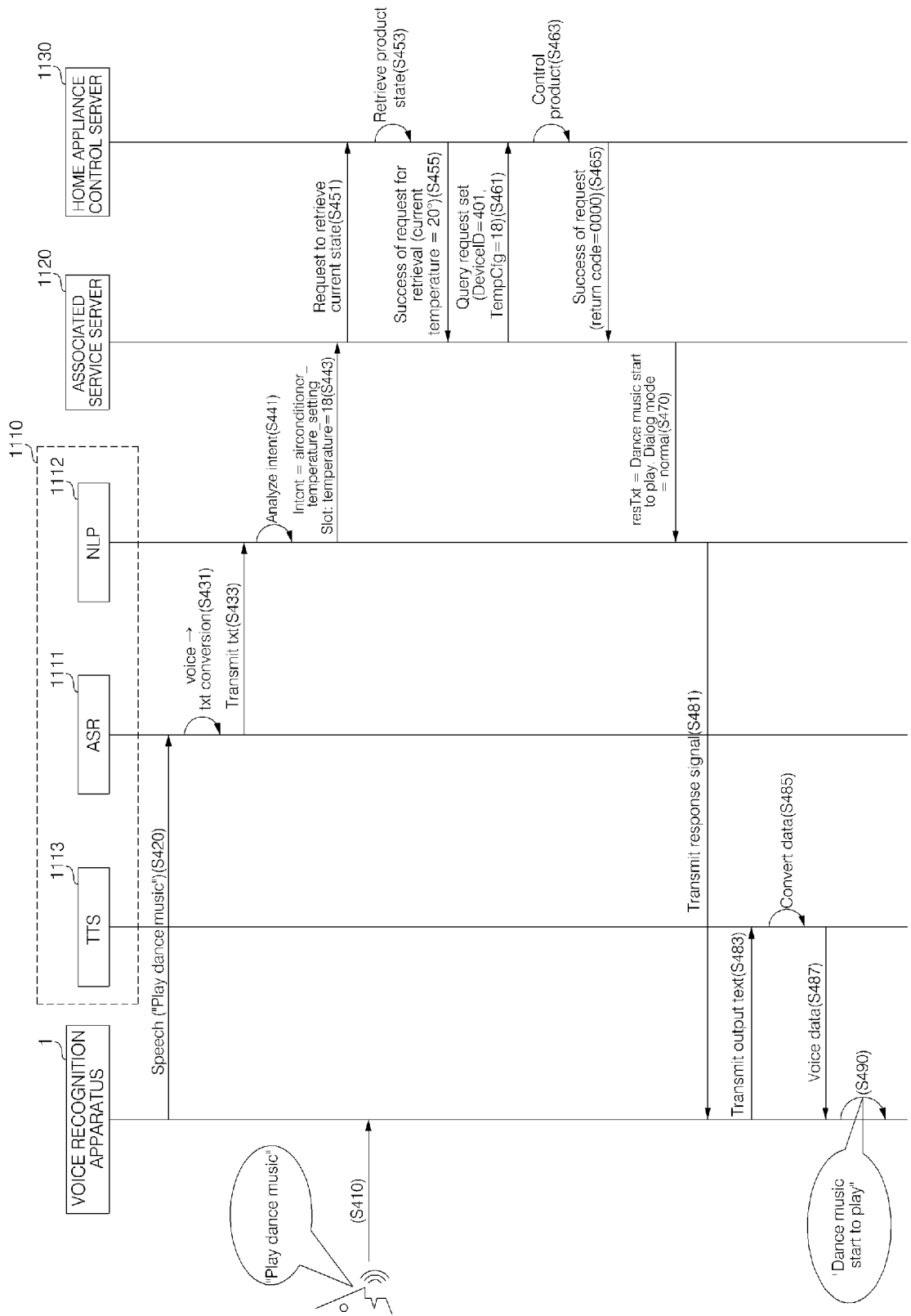
FIGS. 33 to 35 are diagrams illustrating a signal flow in a voice recognition server system according to an embodiment of the present invention.
Figure 34:
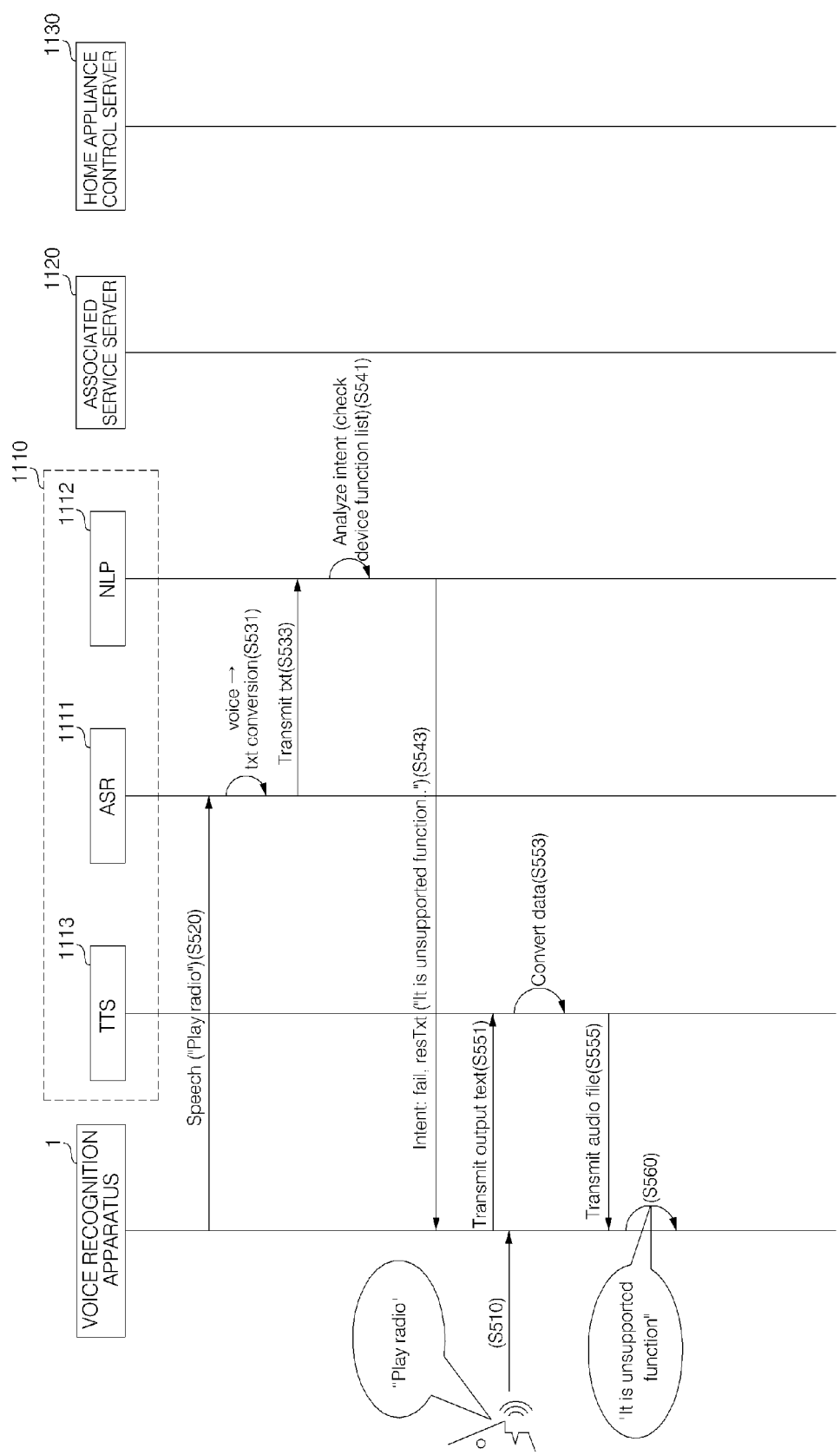
Figure 35:
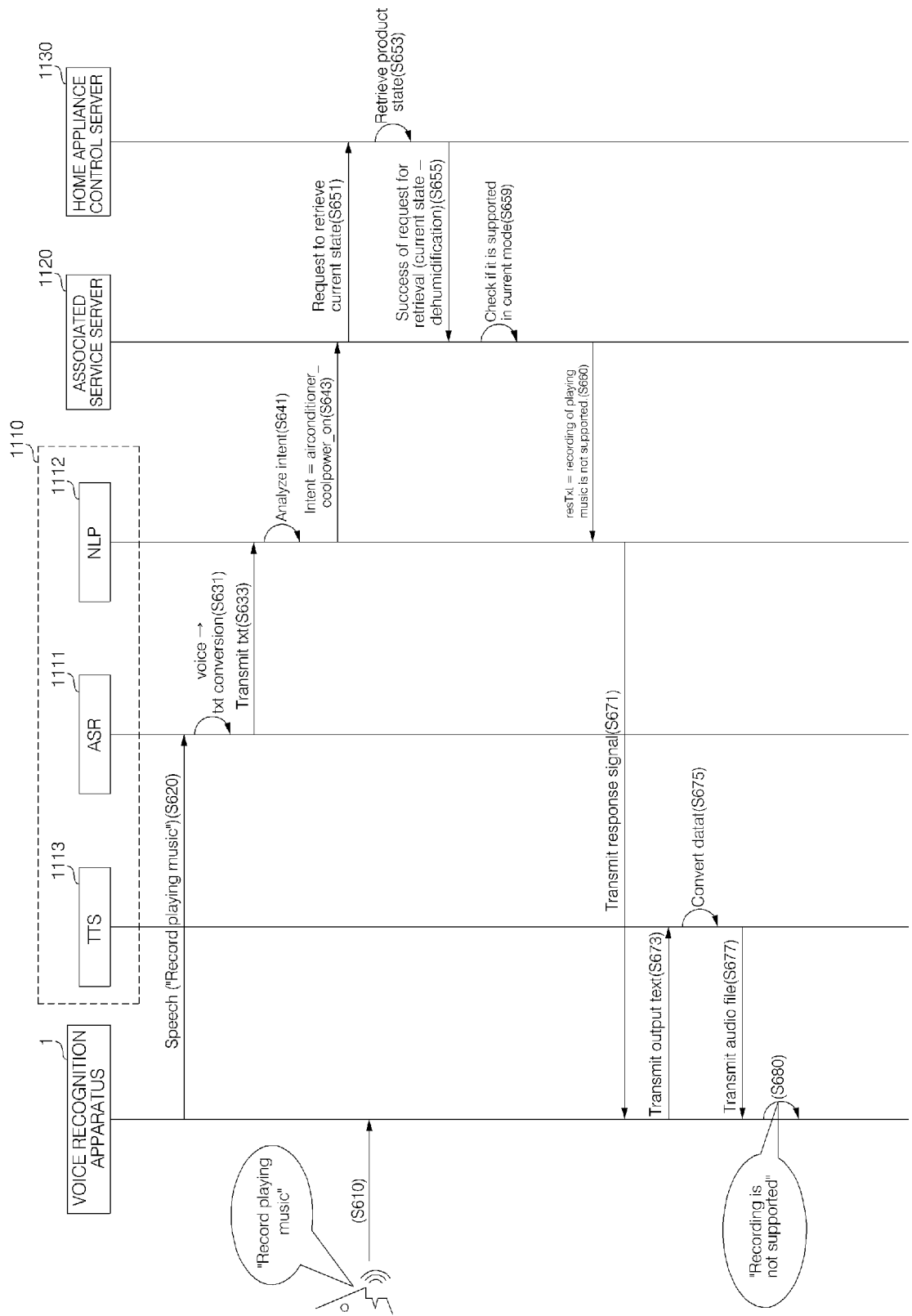

FIGS. 33 to 35 are diagrams illustrating a signal flow in a voice recognition server system according to an embodiment of the present invention, the diagrams which shows a signal flow in the voice recognition server system shown in FIG. 32A.

FIG. 33 shows an example of a signal flow in a general situation in which a voice recognition apparatus operates upon a user's voice command.

The voice recognition apparatus 1 is exemplified by the voice recognition apparatus 1 in the following description, but aspects of the present invention are not limited thereto.

Referring to FIG. 33, the voice recognition apparatus 1 according to an embodiment of the present invention, for example, the voice recognition apparatus 1, may receive a user's voice command in S410, and transmit the received voice command to the voice server 1110 in S420.

For example, when a command for changing temperature setting, for example, "Play dance music" is received, the voice recognition apparatus 1 may convert the received voice command into digital voice command in a specific format, such as a wave file, and transmit the digital voice data to the ASR server 1111.

Meanwhile, after receiving a wake up signal including a call word, the voice recognition apparatus 1 may wait for a command and transmit an input voice command to the voice server 1110.

Alternatively, the voice recognition apparatus 1 may receive successive voice inputs including a call word and a voice command. In this case, the voice recognition apparatus 1 may recognize the call word and transmit the voice command to the voice server 1110.

Signals transmitted and received via communication between devices in the system 10 may further include identification information of each of the devices and a session value for a task to be performed, as well as main data transmitted and received between the devices.

The ASR server 1111 may recognize the received voice data and convert the voice data into text data in S431, and transmit the text data to the NLP server 1112 in S433.

The NLP server 1112 may analyze and determine the intent of the user's voice command by performing natural language processing on the received text data in S441.

For example, from a voice "Play dance music", the NLP server 112 may determine a voice command intended to play dance music in the voice recognition apparatus 1.

The NLP server 1112 may transmit a signal corresponding to the determined voice command to the associated service server 1120 in S443.

When the associated service server 1120 request the current state information of the voice recognition apparatus 1 from the home appliance control server 1130 in S451, the home appliance control server 1130 may retrieve the current state information of the voice recognition apparatus 1 in S453 and transmit the current state information of the voice recognition apparatus 1 to the associated service server 1120 in S455.

If the home appliance control server 1130 does not have the current state information of the voice recognition apparatus 1, the home appliance control server 1130 may request and receive the current state information from the voice recognition apparatus 1.

Meanwhile, according to the determined voice command, the associated service server 1120 having received the state information may transmit, to the home appliance control server 1130, a request signal for playing dance music in the voice recognition apparatus 1 in S461.

The home appliance control server 1130 may control the voice recognition apparatus 1 by generating a control signal and transmitting the control signal to the voice recognition apparatus 1 based on the request signal in S463.

In addition, after controlling the voice recognition apparatus 1, the home appliance control server 1130 may receive a response signal from the voice recognition apparatus 1 in response to the control signal, and transmits processing result information for notifying completion of a requested operation to the associated service server 1120 in S465.

The associated service server 1120 may transmit, to the NLP server 1112, a signal corresponding to processing result information, for example, "Dance music starts to play" in S470. The NLP server 1112 may transmit, to the voice recognition apparatus 1, a response signal based on the determined voice command in S481. The response signal based on the determined voice command may include the processing result information.

Meanwhile, the voice recognition apparatus 1 may transmit a signal including a text (an output text) corresponding to the response signal in S483. When receiving the signal, the TTS server 1113 may convert the text included in the received signal into voice data in S485, and transmit the voice data to the voice recognition apparatus 1 in S487.

Based on the received voice data, the home appliance voice recognition apparatus 1 may output an audible guidance message, such as "Dance music start to play" in S490.

FIG. 34 shows a signal flow in the case where a function not supported by a corresponding voice recognition apparatus is requested.

Referring to FIG. 34, the voice recognition apparatus 1 according to an embodiment of the present invention may receive a user's voice command, for example, "Turn on radio", about a radio function not supported by the voice recognition apparatus 1 in S510.

The voice recognition apparatus 1 may transmit the received voice command to the voice server 1110 in S520. The voice recognition apparatus 1 *a* may convert the received voice command into digital voice data in a specific format, such as a wave file, and transmit the digital voice data to the ASR server 1111.

The ASR server 1111 may recognize the received voice data and convert the voice data into text data in S531, and transmit the text data to the NLP server 1112 in S533.

The NLP server 1112 may perform natural language processing on the received text data to analyze and determine the intent of the voice command in S541.

In addition, the NLP server 1112 may determine whether or not the determined voice command is supported. In this embodiment, the NLP server 1112 may determine that the user has requested a washing function that is not supported by the voice recognition apparatus 1.

Next, the NLP server 1112 may transmit, to the voice recognition apparatus 1, a response signal for notifying that the determined voice command is about a function not supported by the voice recognition apparatus 1 in S543.

Meanwhile, the voice recognition apparatus 1 may transmit a signal including a text (an output text) corresponding to the response signal in S551. When receiving the signal, the TTS server 1113 may convert the text included in the received signal into voice data in S553 and transmit the voice data to the voice recognition apparatus 1 in S555.

Based on the received voice data, the voice recognition apparatus 1 may output an audible guidance message, such as "It is not a supported function", in S560.

FIG. 35 shows a signal flow in the case where a request for a function not supported in the current operation mode of a corresponding voice recognition apparatus is received.

Referring to FIG. 35, the voice recognition apparatus 1 according to an embodiment of the present invention may receive a user's voice command, for example, "Record playing music", indicating a specific mode operation of the voice recognition apparatus 1 in S610.

The voice recognition apparatus 1 may transmit the received voice command to the voice server 1110 in S620. The voice recognition apparatus 1 may convert the received voice command into digital voice data in a specific format, such as a wave file, and transmit the digital voice data to the ASR server 1111.

The ASR server 1111 may recognize the received voice data and convert the voice data into text data in S631, and transmit the text data to the NLP server 1112 in S633.

The NLP server 1112 may analyze and determine the intent of the voice command by performing natural-language processing on the received text data in S641.

For example, from a voice "Record playing music", the NLP server 1112 may determine a voice command intended to record playing music in the voice recognition apparatus.

The NLP server 1112 may transmit a signal corresponding to the determined voice command to the associated service server 1120 in S643.

When the associated service server 1120 requests current state information of the voice recognition apparatus 1 from the home appliance control server 1130 in S651, the home appliance server 1130 may inquire the current state information of the voice recognition apparatus 1 in S653 and transmit the current state information of the voice recognition apparatus 1 to the associated service server 1120 in S655.

If the home appliance control server 1130 does not have the current state information of the voice recognition apparatus 1, the home appliance control server 1130 may request and receive the current state information from the voice recognition apparatus 1.

Meanwhile, the associated service server 1120 having received the current state information may be determined, based on the current state information, whether the determined user command is supported in S657. For example, in the case where the voice recognition apparatus 1 is playing music and a recording function is supported only in a recording mode, the NLP server 1112 may determine that the user has requested recording of playing music, which is not supported in the current state.

Next, the associated service server 1120 may transmit, to the NLP server 1112, a response signal for notifying that the determined voice command is about a function not supported by the voice recognition apparatus 1 in the current state in S660.

In addition, the associated service server 1120 may transmit, to the NLP server 112, a response signal for notifying that the determined voice command is about a function not supported by the voice recognition apparatus 1 in the current state in S671.

Meanwhile, the voice recognition apparatus 1 may transmit a signal including a text (an output text) corresponding to the response signal in S673. When receiving the signal, the TTS server 1113 may convert the text included in the received signal into voice data in S675 and transmit the voice data to the voice recognition apparatus 1 in S677.

Based on the received voice data, the voice recognition apparatus 1 may output an audible guidance message, such as "Recording of playing music is not supported", in S680.

Figure 36:
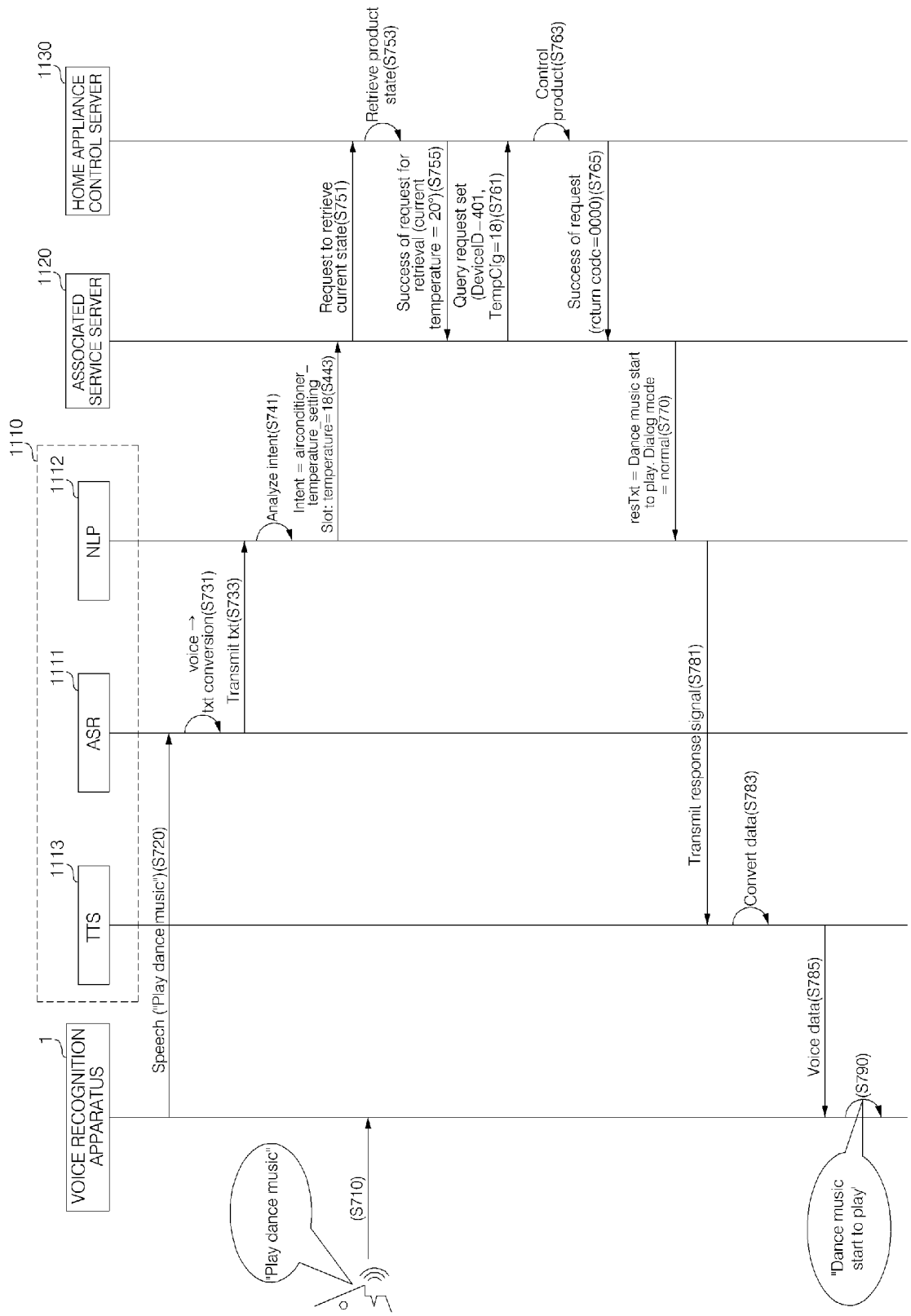
FIGS. 36 to 38 are diagrams illustrating an example of a signal flow in a voice recognition server system according to an embodiment of the present invention.
Figure 37:
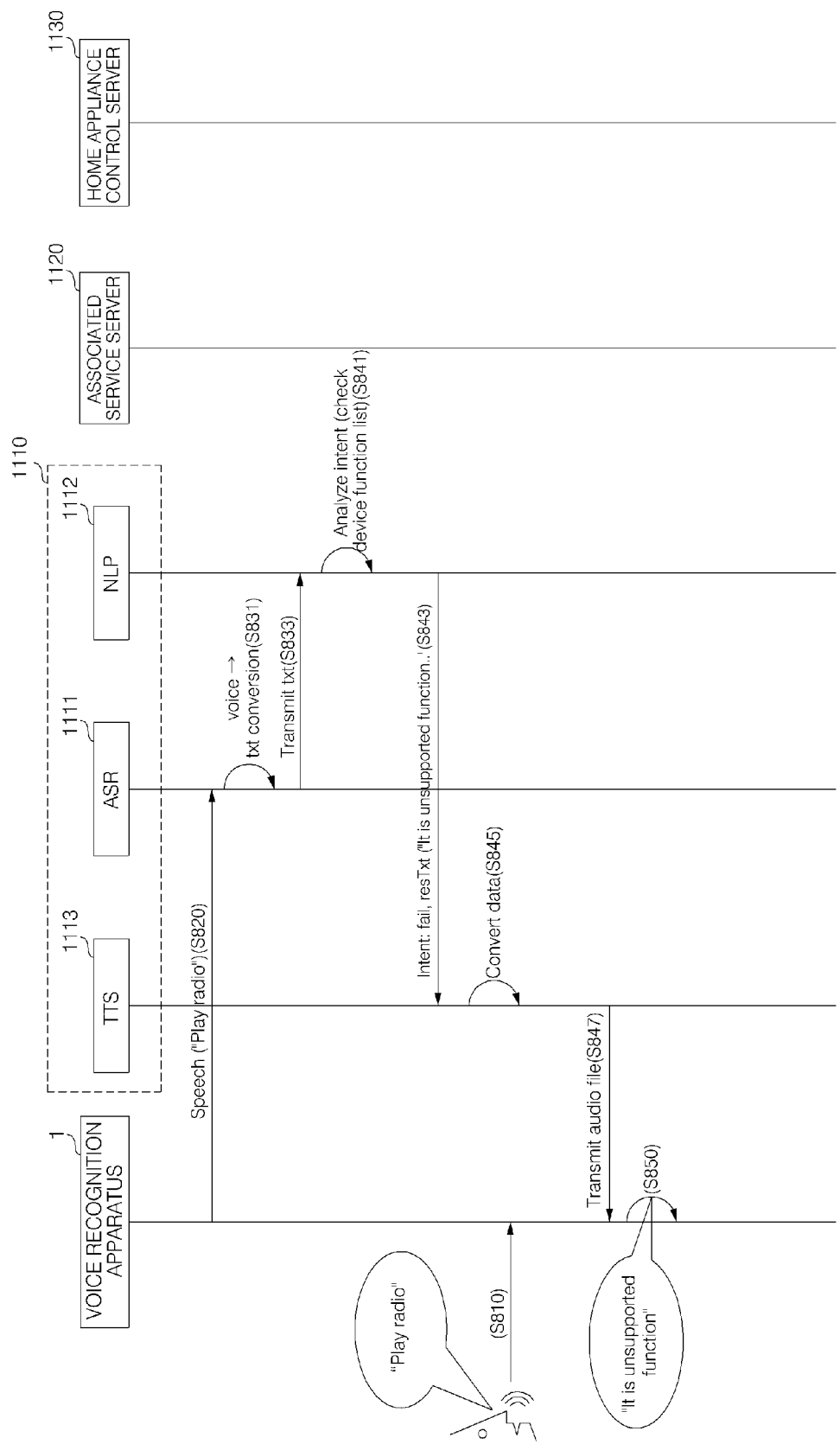
Figure 38:
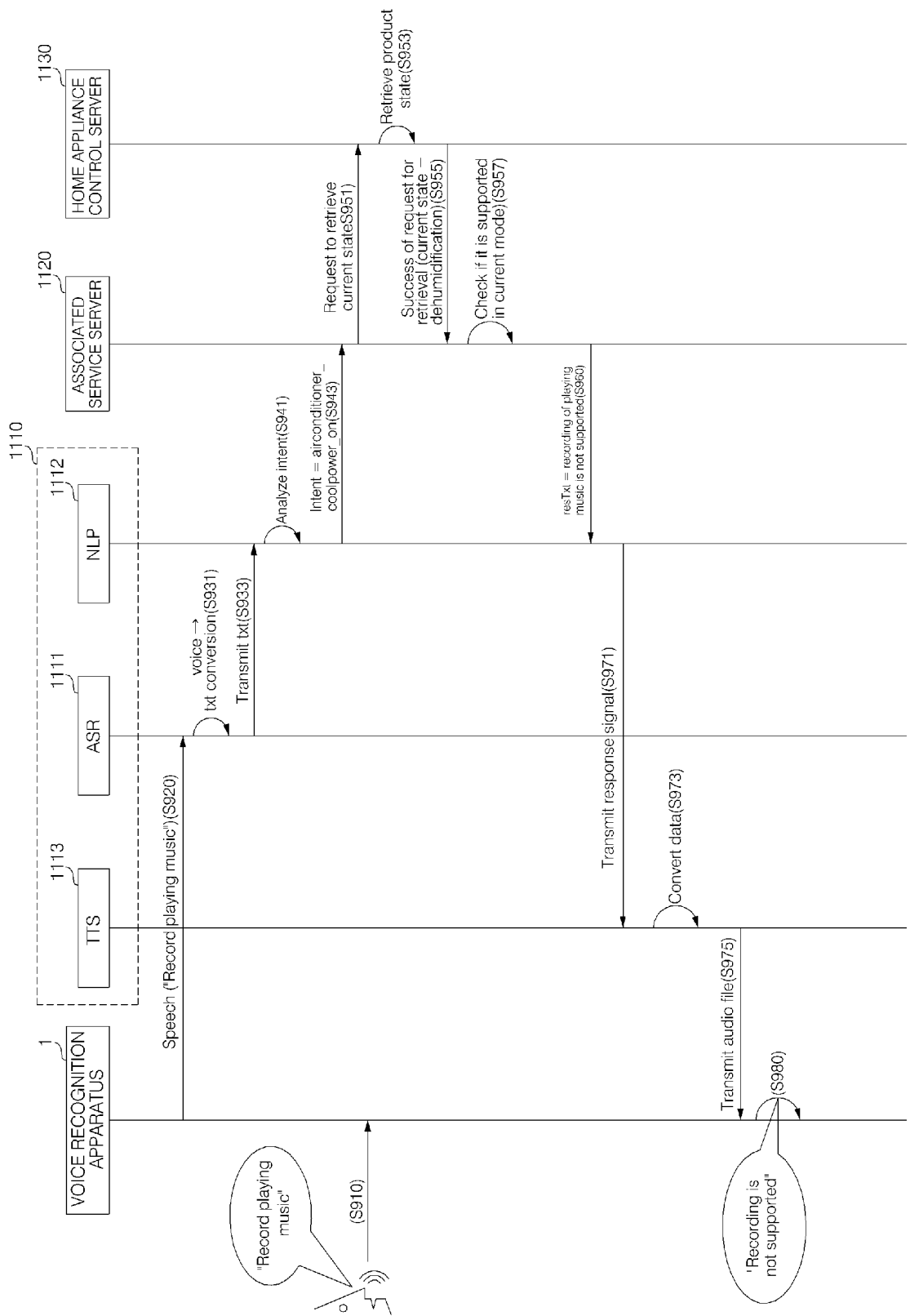

FIGS. 36 to 38 are diagrams illustrating an example of a signal flow in a voice recognition server system according to an embodiment of the present invention, the diagrams which shows a signal flow in the voice recognition server system shown in FIG. 32B.

FIG. 36 shows a signal flow in a general situation in which a voice recognition apparatus operates upon a user's voice command.

Referring to FIG. 36, the voice recognition apparatus 1 according to an embodiment of the present invention, for example, the voice recognition apparatus 1, may receive a user's voice command in S710, and transmit the received voice command to the voice server 1110 in S720.

The ASR server 1111 may recognize the received voice data and convert the voice data into text data in S731, and transmit the text data to the NLP server 1112 in S733.

The NLP server 1112 may analyze and determine the intent of the voice command by performing natural language processing on the received text data in S741.

For example, from a voice "Play dance music", the NLP server 1112 may determine a voice command intended to play dance music in the voice recognition apparatus 1.

The NLP server 1112 may transmit a signal corresponding to the determined voice command to the associated service server 1120 in S743.

When the associated service server 1120 requests current state information of the voice recognition apparatus 1 from the home appliance control server 1130 in S751, the home appliance control server 1130 may inquire the current state information of the voice recognition apparatus 1 in S753, and transmit the current state information of the voice recognition apparatus 1 to the associated service server 1120 in S755.

If the home appliance control server 1130 does not have the current state information of the voice recognition apparatus 1, the home appliance control server 1130 may request and receive the current state information of the voice recognition apparatus 1.

Meanwhile, according to the determined voice command, the associated service server 1120 having received the current state information may transmit a request signal for playing dance music in the voice recognition apparatus 1 to the home appliance control server 1130 in S761.

Based on the request signal, the home appliance control server 1130 may control the voice recognition apparatus 1 by generating a control signal and transmitting the control signal to the voice recognition apparatus 1 in S763.

In addition, after controlling the voice recognition apparatus 1, the home appliance control server 1130 may receive a response signal from the voice recognition apparatus 1 in response to the control signal, and transmit processing result information for notifying completion of a requested operation to the associated service server 1120 in S765.

The associated service server 1120 may transmit a signal corresponding to the processing result information, for example, "Dance music start to play", to the NLP server 1112 in S770.

Meanwhile, the NLP server 1112 may transmit a response signal based on the determined voice command to the TTS server 1113 in S781. The response signal based on the determined voice command may include the processing result information.

Meanwhile, the TTS server 1113 may convert the response signal based on the voice command into voice data in S783, and transmit the voice data to the voice recognition apparatus 1 in S785.

Based on the received voice data, the voice recognition apparatus 1 may output an audible guidance message, such as "Dance music start to play", in S790.

FIG. 38 shows an example of a signal flow in the case where a function not supported by a corresponding voice recognition apparatus is requested.

Referring to FIG. 37, the voice recognition apparatus 1 according to an embodiment of the present invention may receive a user's voice command, for example, "Turn on radio", about a radio function that is not supported by the voice recognition apparatus 1 in S810.

The voice recognition apparatus 1 may transmit the received voice command to the voice server 1110 in S820. The voice recognition apparatus 1 may convert the received voice command into digital voice data in a specific format, such as a wave file, and transmit the digital voice data to the ASR server 1111.

The ASR server 1111 may recognize the received voice data into text data in S831, and transmit the text data to the NLP server 1112 in S833.

The NLP server 1112 may analyze and determine the intent of the voice command by performing natural language processing on the received text data in S841.

In addition, the NLP server 1112 may determine whether or not the determined voice command is supported. In this embodiment, the NLP server 1112 may determine that the user has requested a radio function not supported by the voice recognition apparatus 1.

Next, the NLP server 1112 may transmit, to the TTS server 1113, a response signal for notifying that the determined voice command is about a function not supported by the voice recognition apparatus 1 in S843.

The TTS server 1113 may convert the response signal based on the voice data in S845, and transmit the voice data to the voice recognition apparatus 1 in S847.

Based on the received voice data, the voice recognition apparatus 1 may output an audible guidance message, such as "It is not a supported function", in S850.

FIG. 38 shows an example of a signal flow in the case where a function not supported in the current operation mode of a corresponding voice recognition apparatus is requested.

Referring to FIG. 38, the voice recognition apparatus 1 according to an embodiment of the present invention may receive a user's voice command, for example, "Record playing music", indicating a specific mode operation of the voice recognition apparatus 1 in S910.

The voice recognition apparatus 1 may transmit the received voice command to the voice server 1110 in S920. The voice recognition apparatus 1 may convert the received voice command into digital voice data in a specific file, such as a wave file, and transmit the digital voice data to the ASR server 1111.

The ASR serer 1111 may recognize the received voice data and convert the voice data into text data in S931, and transmit the text data to the NLP server 1112 in S933.

The NLP server 1112 may analyze and determine the intent of the voice command by performing natural language processing on the received text data in S941.

For example, from a voice "Record playing music", the NLP server 1112 may determine a voice command intended to record playing music in the voice recognition apparatus 1.

The NLP server 1112 may transmit a signal corresponding to the determined voice command to the associated service server 1120 in S943.

When the associated service server 1120 requests current state information of the voice recognition apparatus 1 from the home appliance control serer 1130 in S951, the home appliance control server 1130 may inquire the current state information of the voice recognition apparatus 1 in S953, and transmit the current state information of the voice recognition apparatus 1 to the associated service server 1120 in S955.

If the home appliance control server 1130 does not have the current state information of the voice recognition apparatus 1, the home appliance control server 1130 may request and receive the current state information from the voice recognition apparatus 1.

Meanwhile, based on the received current state information of the voice recognition apparatus 1, the associated service server 1120 may determine whether the determined voice command is supported in S957. For example, in the case where the voice recognition apparatus 1 playing music and a recording function is supported only in a recording mode, the NLP server 1112 may determine that the user has requested the recording mode which is not supported in the current state.

Next, the associated service server 1120 may transmit, to the NLP server 1112, a response signal for notifying that the determined voice command is a function not supported by the voice recognition apparatus 1 in the current state, in S960.

In addition, the NLP server 1112 may transmit, to the TTS server 1113, a response signal indicating that the determined voice command is a function not supported in the current state in S971.

Meanwhile, the TTS server 1113 may convert the response signal based on the voice command into voice data in S973, and transmit the voice data to the voice recognition apparatus 1 in S975.

Based on the received voice data, the voice recognition apparatus 1 may output an audible guidance message, such as "Recording of playing music is not supported" in S980.

According to the present invention, it is possible to implement user experience where an appropriate audible comment is provided when a user's command is failed to be interpreted or the user's command is about an unavailable function.

By providing voice guidance in an appropriate time and situation during command processing, it is possible to minimize user inconvenience.

Figure 39:
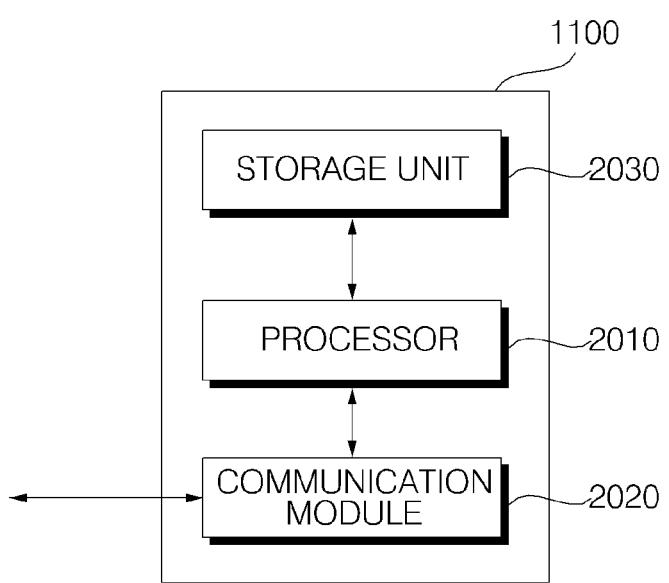
FIG. 39 is an internal block diagram of an example of a server according to an embodiment of the present invention.

FIG. 39 is an internal block diagram of an example of a server according to an embodiment of the present invention, and the server 1100 may be the ASR server 1111, the NLP server 1112, the TTS server 1113, the associated service server 1120, or the home appliance control server 1130.

Referring to FIG. 39, the server may include a communication module 2020, a storage unit 2030, and a processor 2010.

The processor 2010 may control overall operation of the server.

The communication module 2020 may diverse data, such as state information, operation information, manipulation information, voice data, and text data, from the voice recognition apparatus 1 or a different server.

In addition, the communication module 2020 may transmit original or processed data corresponding to the received diverse information corresponding thereto to voice recognition apparatus 1 or a different server.

To this end, the communication module 2020 may include one or more communication modules, such as an Internet module, and a mobile communication module.

The storage unit 2030 may store received information, and have data required for generating result information corresponding to the received information.

The storage unit 2030 may store data required for operation of a corresponding server. For example, the storage unit 2030 may store an automatic voice recognition algorithm in the case of the ASR server 1111, and may store product information and state information of the voice recognition apparatus 1, and information for controlling the home appliance voice recognition apparatus 1 in the case of the home appliance control server 1130.

Meanwhile, the server may be a server administered by a manufacturer of voice recognition apparatus 1, such as an air conditioner, or by a service provide, and the server may be a kind of Cloud server.

Figure 40:
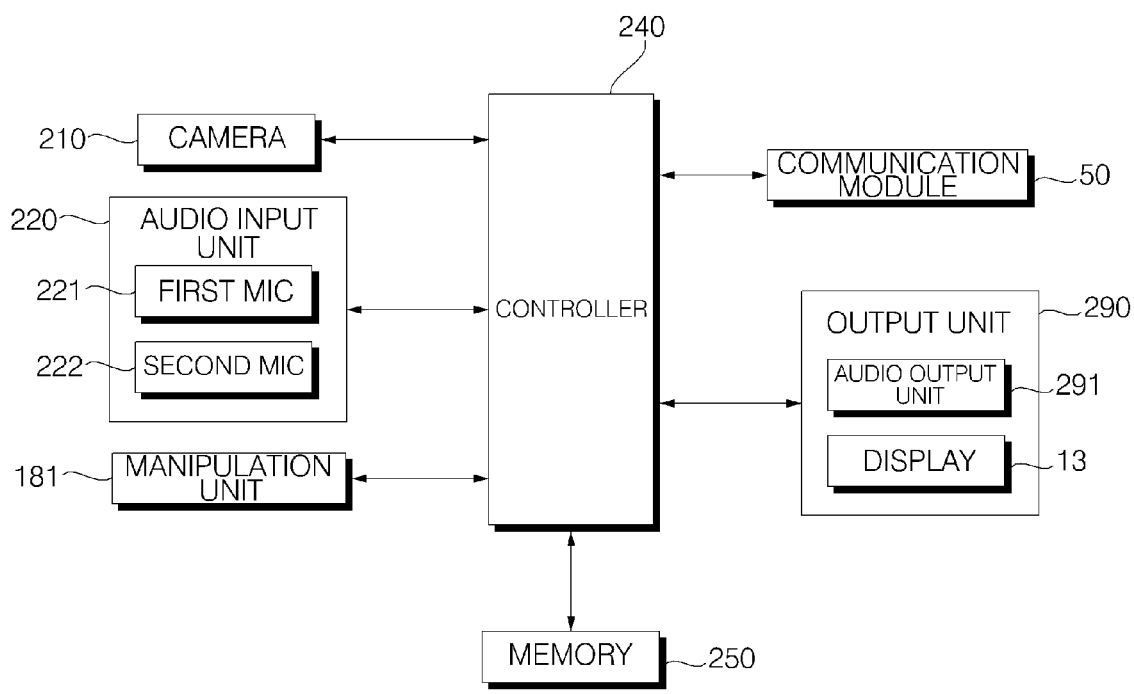
FIG. 40 is an interior block diagram illustrating an example of a voice recognition apparatus according to an embodiment of the present invention.

FIG. 40 is an interior block diagram illustrating an example of a voice recognition apparatus according to an embodiment of the present invention.

Referring to FIG. 40, the voice recognition apparatus 1 according to an embodiment of the present invention may include: an audio input unit 220 configured to receive a user's voice command; a memory 250 configured to store diverse data; a communication module 50 configured to perform wireless communication with another electronic device; an output unit 290 configured to display specific information in the form of an image or sound; and a controller 240 configured to control overall operations.

The audio input unit 220 may receive an external audio signal, such as a user's voice command. To this end, the audio input unit 220 may include one or more microphones (MIC). In addition, to more accurately receive a user's voice command, the audio input unit 220 may include a plurality of microphones 221 and 222. The plurality of microphones 221 and 222 may be spaced apart from each other and configured to acquire an external audio signal and process the external audio signal into an electric signal.

FIG. 40 shows the case where the audio input unit 220 includes two microphones, a first microphone 221 and a second microphone 222, but aspects of the present invention are not limited thereto.

The audio input unit 220 may include or be connected to a processor, which converts analog sound into digital data, so as to convert a user's voice command into data so that the controller 240 or a specific server is able to recognize the user's voice command.

Meanwhile, the audio input unit 220 may utilize various noise removal algorithms for removing noise that occurs in the process of receiving the user's voice command.

In addition, the audio input unit 220 may include components for audio signal processing: for example, a filter for removing noise from an audio signal received by each of the microphones 221 and 222, and an amplifier for amplifying a signal output from the filter and output the amplified signal.

The memory 250 may record diverse information necessary for operation of the voice recognition apparatus 1, and include a volatile or non-volatile recording medium. A recording medium may store microprocessor-readable data, and may include a Hard Disk Drive (HDD), a Solid State Disk (SSD), a Silicon Disk Drive (SDD), a ROM, a RAM, a CD-ROM, a magnetic tape, a floppy disk, an optical data storage device, and the like.

Meanwhile, the memory 250 may store data for voice recognition, and the controller 240 may process a user's voice input signal received via the audio input unit 220, and perform a voice recognition process.

Meanwhile, the simple voice recognition may be performed by the voice recognition apparatus 1, and complicated voice recognition, such as processing a natural language, may be performed by the voice recognition server system 1100.

For example, when a wake up voice signal including a preset call word is received, the voice recognition apparatus 1 may be switched into a state for receiving a voice command. In this case, the voice recognition apparatus 1 may perform voice recognition processes up to determination as to whether a call word voice is input, and other subsequent processes regarding the user's voice input may be performed by the voice recognition server system 1100.

System resources of voice recognition apparatus 1 are limited, and thus, complicated recognition and processing of natural language recognition may be performed by the voice recognition server system 1100.

The memory 250 may store limited data. For example, the memory 250 may store data for recognizing a wake up voice signal including a preset call word. In this case, the controller 240 may recognize the wake-up voice signal including the preset call word from a user's voice input signal received via the audio input unit 220.

Meanwhile, a call word may be set by a manufacturer. For example, a call word may be set to be "LG Hub".

In addition, a call word may be changed by a user.

The controller 240 may perform a control operation so as to transmit a user's voice command, which is input after recognition of a wake up voice signal, to the voice recognition server system 1100 via the communication module 50.

Meanwhile, on the contrary, the controller 240 may activate a voice recognition function in response to operation of any one of the contact switches 181*a*, 181*b*, 181*c*, and 181*d*. While the voice recognition function is activated, the controller 240 may perform control to transmit a received user's voice command to the voice recognition server system 1100 through the communication module 50.

The communication module 50 may include one or more communication modules and transmit and receive various signals through wireless communication with another electronic device. For example, the communication module 50 may communication with electronic devices inside/outside a mart home system 10.

In addition, the communication module 50 may communicate with the AP device 7, and access a wireless Internet network via the AP device 7 to communicate with other devices.

In addition, the controller 240 may transmit state information of the voice recognition apparatus 1 and a user's voice command to the voice recognition server system 1100 via the communication module 50.

Meanwhile, when a control signal is received via the communication module 50, the controller 240 may control the voice recognition apparatus 1 to operate in accordance with the received control signal.

The output unit 290 may include a display 13, which displays information corresponding to a user's command input, a processing result corresponding to the user's command input, an operation mode, an operation state, and an error state in the form of an image.

In some implementations, the display 13 may form an inter-layered structure with a touch pad to implement a touch screen. In this case, the display 13 may be used as an input device through which information can be input upon a user's touch, as well as an output device.

In addition, the output unit may further include an audio output unit 291 configured to output an audio signal. Under the control of the controller 240, the audio output unit 291 may output a warning sound, a operation state, a notification message indicative of an error state, information corresponding to a user's command input, and a processing result corresponding to the user's command input, and the like in the form of sound. The audio output unit 291 may convert an electric signal from the controller 240 into an audio signal, and output the audio signal. To this end, the audio output unit 291 may include a speaker.

Meanwhile, the voice recognition apparatus 1 may further include a manipulation unit 181 for receiving a user's input, and a camera 210 capable of capturing an image of an area within a specific range of the voice recognition apparatus 1.

The manipulation unit 181 may include a plurality of manipulation buttons, and transmit a signal corresponding to a pushed button to the controller 240.

The camera 210 may capture an image of an ambient or surrounding environment of the voice recognition apparatus 1, and a plurality of such cameras may be installed at each part for photographing efficiency.

For example, the camera 210 may include at least one optical lens, an image sensor (e.g., a CMOS image sensor) configured with a plurality of photodiodes (e.g., pixels) on which an image is formed by lights passing through the optical lens, and a Digital Signal Processor (DSP) configured to form an image based on signals output from the photodiodes. The DSP may generate not just a still image, but also a video composed of frames which constitute still images.

Meanwhile, an acquired image captured by the camera 210 may be stored in the memory 250.

Figure 41:
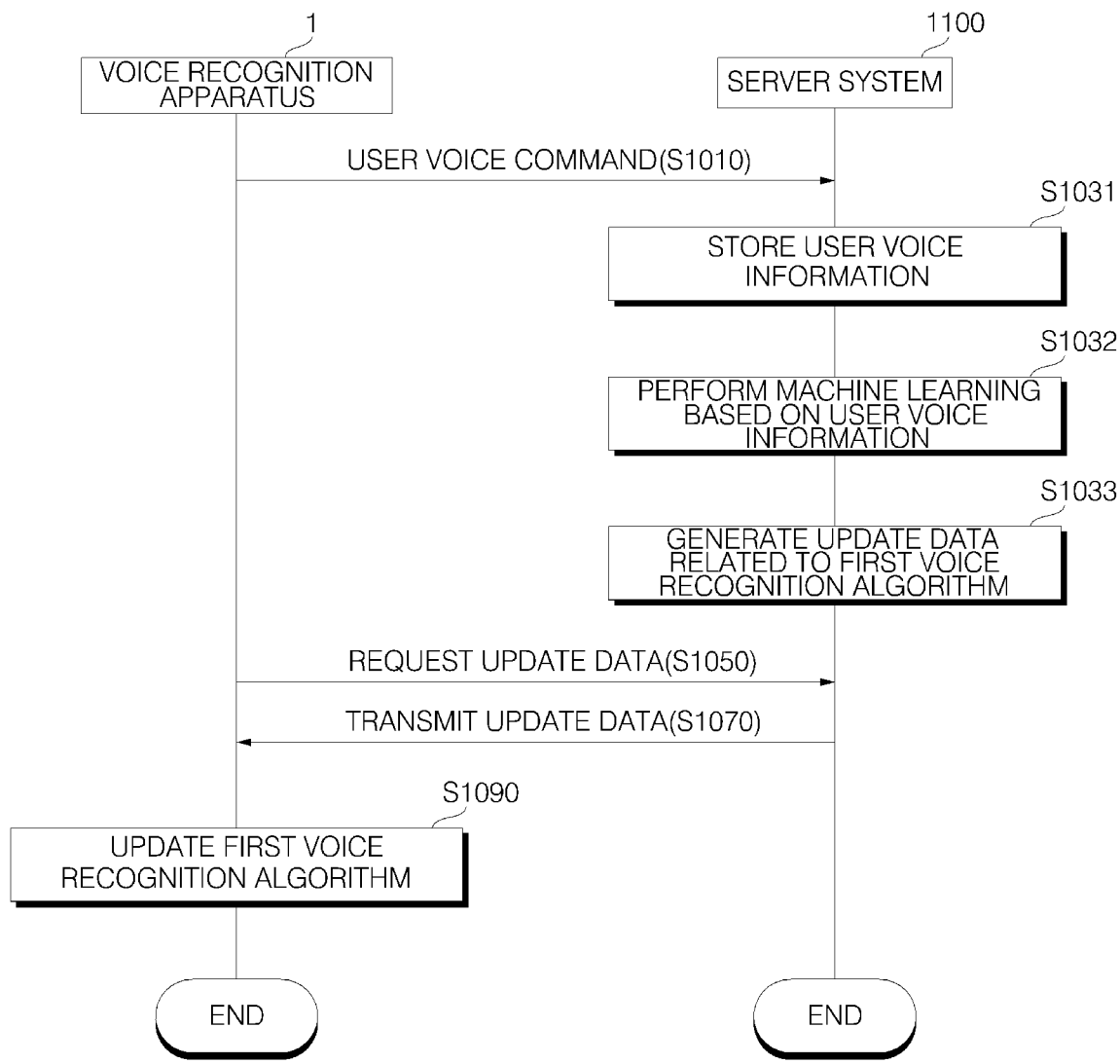
FIG. 41 is a flowchart illustrating an operation method of a voice recognition apparatus and a voice recognition system according to an embodiment of the present invention.

FIG. 41 is a flowchart illustrating an operation method of a voice recognition apparatus and a voice recognition system according to an embodiment of the present invention.

Referring to the drawing, the voice recognition apparatus 1 may store a first voice recognition algorithm and transmit a voice command to the server system 1100 in S1010.

The server system 1100 may receive the voice command through the communication module 2020, and the voice command may be stored in the storage 2030 as user voice information in S1031.

Meanwhile, the user voice information may be user characteristic data about a user's voice tone, voice intensity, voice speed, frequently-used keyword, gender, age, biometric information, regional dialect, etc.

The server system 1100 may perform machine learning on the basis of the user voice information stored in the server system 1100 in S1032, and generate first voice recognition algorithm-related update data through the machine learning in S1033.

Meanwhile, the first voice recognition algorithm may be an algorithm an algorithm for recognizing a wake-up voice signal including a preset call word, or an algorithm for recognizing a preset keyword consisting of relatively simple words.

Meanwhile, the voice recognition apparatus 1 may request the first voice recognition algorithm-related update data from the server system 1100 in S1050. In addition, the voice recognition apparatus 1 may request the first voice recognition algorithm-related update data through an application of an external mobile terminal.

In response to a request from the voice recognition apparatus 1 or a mobile terminal, the serer system 1100 may transmit the first voice recognition algorithm-related update data to the voice recognition apparatus 1 in S1070. Meanwhile, even without a request from the voice recognition apparatus 1 or a mobile terminal, the serer system 1100 may periodically or non-periodically transmit the first voice recognition algorithm-related update data.

Meanwhile, the voice recognition apparatus 1 may transmit update history information, and the server system 1100 may transmit update data not colliding with existing update data to the voice recognition apparatus 1 by analyzing the history information of the voice recognition apparatus 1.

Meanwhile, if a plurality of home appliances exists in the voice recognition system 1010, the plurality of home appliances may exchange information with each other through a communication module (not shown).

In this case, at least one home appliance may receive firmware update data of the plurality of home appliances from the voice recognition apparatus 1.

That is, in addition to update data on its own, the voice recognition apparatus 1 may receive update data for updating at least one nearby home appliance and transmit the received update data to the corresponding home appliance.

In one example, if an air conditioner, a robot cleaner, and a refrigerator exist in the voice recognition system 1010, the voice recognition apparatus 1 may receive first update data on the air conditioner from the server system 1100 and transmit the first update data to the air conditioner. Accordingly, firmware update may be performed in the air conditioner.

In another example, if an air conditioner, a robot cleaner, and a refrigerator exist in the voice recognition system 1010, the voice recognition apparatus 1 may receive first update data on the air conditioner and second update data on the refrigerator from the server system 1100, and transmit the first update data and the second update data to the air conditioner and the refrigerator, respectively. Accordingly, firmware update may be performed in the air conditioner and the refrigerator.

Meanwhile, the voice recognition apparatus 1 may update the first voice recognition algorithm stored in the voice recognition apparatus 1, based on the first voice recognition algorithm-related update data in S1090. The memory of the voice recognition apparatus 1 can store the first voice recognition algorithm-related update data, and when the first voice recognition algorithm-related update data is received, the controller of the voice recognition apparatus 1 provides a menu for setting an update start time. Also, the controller in the voice recognition apparatus 1 can control the first voice recognition algorithm, which is stored in the memory, to be updated at a set time.

The first voice recognition algorithm may be a user voice recognition algorithm which is generated through machine learning on the basis of the user voice information stored in the server system 1100.

Thus, a user is able to use a voice recognition algorithm suitable for the user's characteristics, and therefore, voice recognition performance may improve.

In addition, as a voice recognition algorithm suitable for a user's characteristics is periodically or non-periodically updated, it is possible to use a voice recognition algorithm optimized for the user's characteristics.

In addition, it is possible to solve a problem that updating a voice recognition algorithm stored in a module is more difficult than updating a voice algorithm stored in a server.

In addition, it is possible to quickly respond to a simple command by recognizing a keyword, regardless of the server system 1100, while keeping advantages of the natural language processing.

Figure 42:
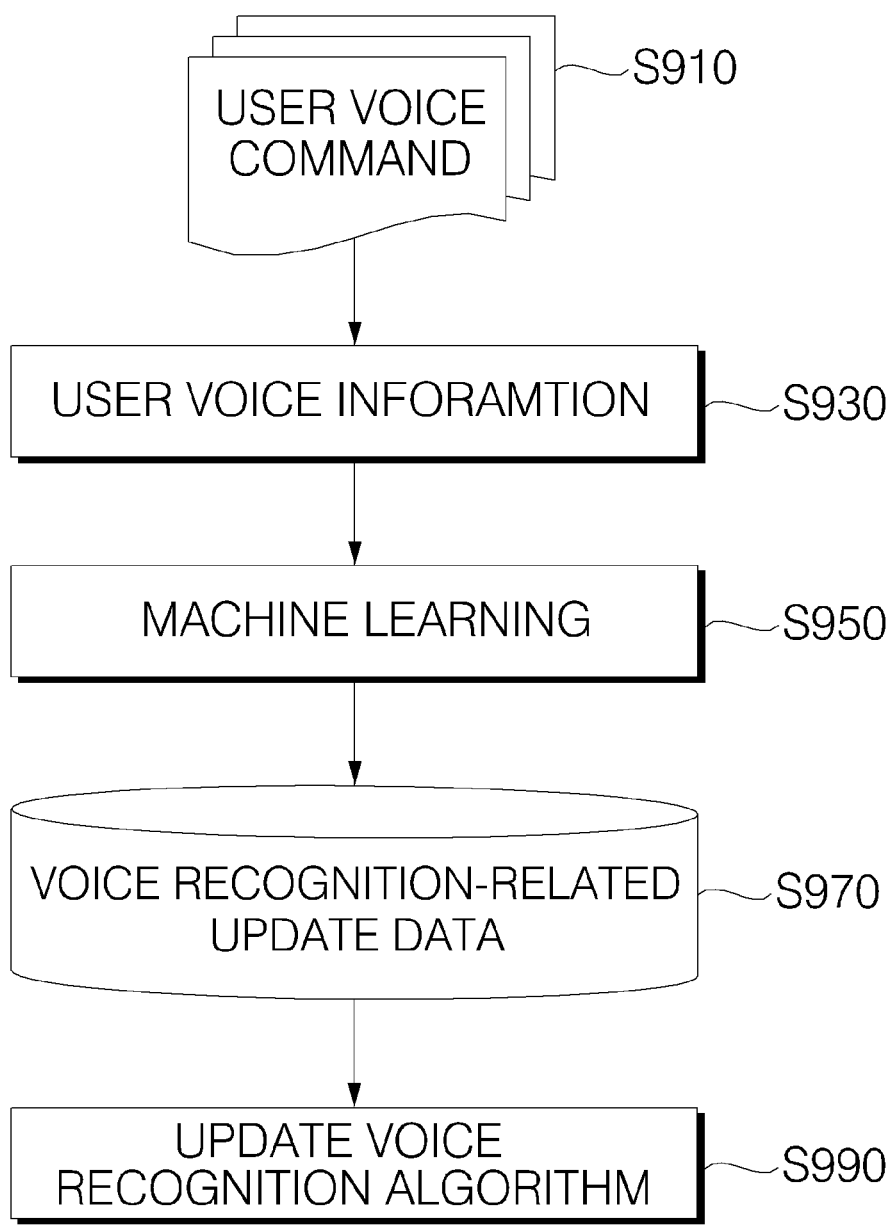
FIG. 42 is a flowchart illustrating an operation method of a voice recognition apparatus and a voice recognition system according to another embodiment of the present invention.

FIG. 42 is a flowchart illustrating an operation method of a voice recognition apparatus and a voice recognition system according to another embodiment of the present invention.

Referring to the drawing, the voice recognition apparatus 1 may receive a voice command through a microphone and transmit the voice command to the server system 1100. The server system 1100 may collect a plurality of voice commands in S910, and the plurality of voice commands may be stored in the storage 2030 as user voice information in S930.

The server system 1100 may perform machine learning on the basis of the user voice information in S950. In this case, a machine learning algorithm may be any one of the following: Neural Network, Decision Tree, Genetic Algorithm, Genetic Programming, Gaussian process regression, Linear Discriminant Analysis, K-Nearest Neighbor, Perceptron, Radial basis function network, Support Vector Machine, and Deep Learning.

For example, the voice recognition information may be predicted by performing supervised learning on initial user voice information and then performing unsupervised learning on user voice information input to the voice recognition apparatus 1.

Meanwhile, when the server system 1100 is a voice recognition system 1100, a server performing machine learning may be at least one of a plurality of servers belonging to the voice recognition system 1100.

The server system 1100 may generate voice recognition-related update data, which is generated through machine learning on the basis of the user voice information, in S970 and update a voice recognition algorithm based on the voice recognition-related update data in S990.

Accordingly, user recognition-related update data, which is updated to fit a user's characteristics by learning user voice information, and therefore, a voice recognition apparatus and system optimized for each user may be provided.

Meanwhile, the voice recognition algorithm may be a first or second voice recognition algorithm.

Meanwhile, the server system 1100 may perform machine learning with respect to multiple users of the voice recognition apparatus 1.

The server system 1100 may perform machine learning with respect to the multiple users, and use update data related to a voice recognition algorithm, which is generated based on the machine learning, as update data for an individual user.

Meanwhile, the voice recognition apparatus 1 may update a first voice recognition algorithm for an individual user based on update data related to a voice recognition algorithm for the corresponding individual user. Accordingly, a voice recognition algorithm customized for each of the multiple users may be provided.

Meanwhile, the server system 1100 may perform machine learning with respect to a frequent user. The server system 1100 may perform machine learning with respect to a frequency user, and generate voice recognition-related update data based on the machine learning.

Meanwhile, the voice recognition apparatus 1 may receive the voice recognition-related update data for the frequency user. The voice recognition apparatus 1 may update a first voice recognition-related update data based on the received voice recognition-related update data. Accordingly, the voice recognition apparatus 1 may provide a voice recognition algorithm for the frequent user.

Meanwhile, the voice recognition apparatus 1 may transmit a voice command to the serer system 1100, and the server system 1100 may store frequently-used voice commands by counting voice commands.

In addition, the server system 1100 may generate second voice recognition algorithm-related update data by selecting a specific number of frequently-used voice commands, and update the second voice recognition algorithm based on the generated update data.

In addition, the server system 1100 may generate first voice recognition algorithm-related update data by selecting a specific number of frequently-used voice commands, and transmit the generated update data to the voice recognition apparatus 1.

Meanwhile, the voice recognition apparatus 1 may receive update data regarding a frequently-used voice command, and update a first voice recognition algorithm based on the received update data. Thus, a user's voice command patterns of natural-language voice commands may be identical or similar, and the voice recognition apparatus 1 may process a frequently-used voice command on its own. Accordingly, operation control speed may improve.

For example, a natural-language command such as "Turn on energy saving function" is frequently used, the server system 1100 may generate first voice recognition algorithm-related update data and transmit the generated update data to the voice recognition apparatus 1. The voice recognition apparatus 1 may receive the update data and update the first voice recognition algorithm. Then, the voice recognition apparatus 1 is able to quickly respond to the user's voice "Turn on energy saving function"

In addition, the voice recognition apparatus 1 may transmit even information on a frequently-used function to the server system 1100. Meanwhile, the server system 1100 may generate improved voice recognition-related update data by analyzing the frequently-used voice command and the information on the frequently-used function.

Figure 43:
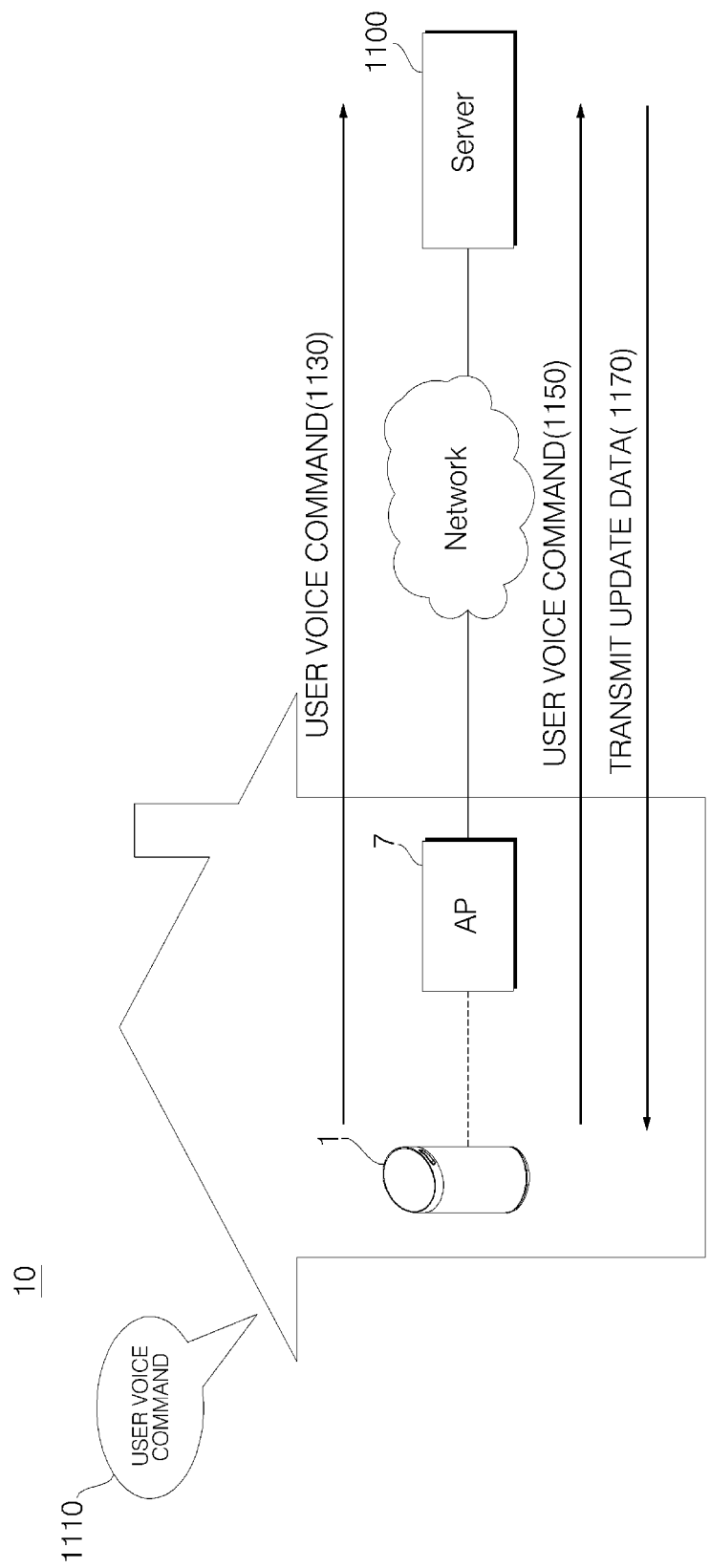
FIGS. 43 to 48 are diagram illustrating an operation method of FIG. 41 or 42.

FIG. 43 is a diagram for explaining an operation method of FIG. 41.

Referring to the drawing, a user may input a voice command to the voice recognition apparatus 1 in 1110.

Meanwhile, the voice command may be a wake-up voice including a preset call word or a preset keyword consisting of relatively simple words.

In one example, the voice command may be a wake-up voice such as "LG Hub". In another example, the voice command may be a keyword voice command such as "Power off". In yet another example, the voice command may be a natural-language voice command such as "Turn on energy saving function".

Having received the user's voice through the microphone 221 or 222, the voice recognition apparatus 1 may transmit the voice command through the AP device 7 to the server system 1100 connected to an external network in 1130.

The server system 1100 may generate first voice recognition algorithm-related update data through machine learning on the basis of the voice command.

In addition, the voice recognition apparatus 1 may request the first voice recognition algorithm-related update data from the server system 1100 in 1150.

The server system 1100 may transmit the update data related to the voice recognition algorithm in response to the request for update data from the voice recognition apparatus 1 in 1170.

Figure 44:
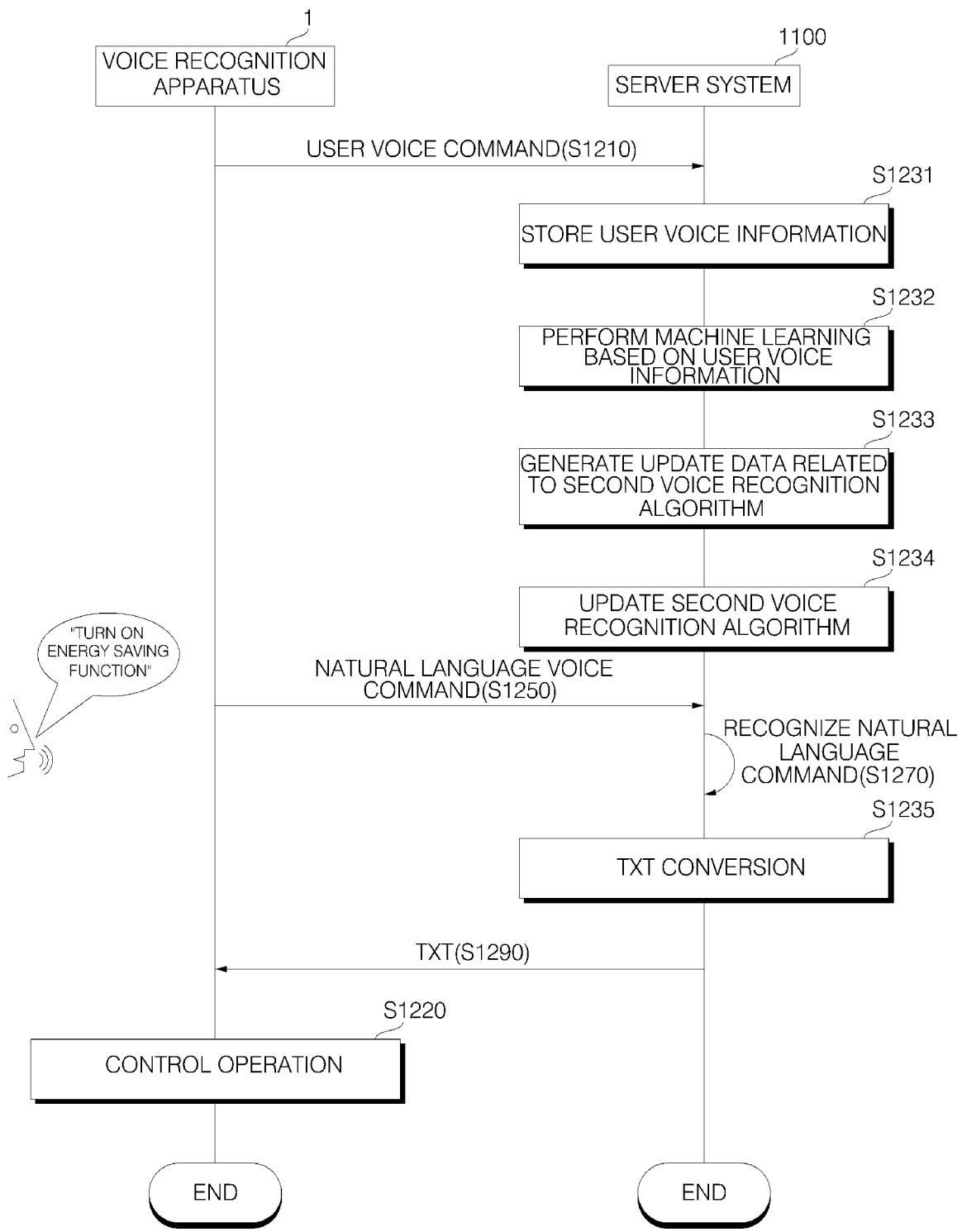

FIG. 44 is a flowchart illustrating an operation method of a voice recognition apparatus and a voice recognition system according to another embodiment of the present invention.

Referring to the drawing, the voice recognition apparatus 1 may transmit a voice command to the server system 1100 in S1210, and the server system 1100 may receive the voice command through the communication module 2020.

Meanwhile, the server system 1100 may be provided with a storage unit 2030, and the storage unit 2030 may store a second voice recognition algorithm. In addition, the storage unit 2030 may store the voice command, received from the voice recognition apparatus 1, as user voice information in S1231.

Meanwhile, the user voice information may be user characteristic data on the user's voice tone, voice intensity, voice speed, frequently-used keyword, gender, age, biometric information, regional dialect, etc.

The server system 1100 may perform machine learning on the basis of the user voice information stored in the storage unit 2030 in S1232, and the server system 1100 may generate second voice recognition algorithm-related update data through the machine learning in S1233.

Meanwhile, the second voice recognition algorithm may be a voice recognition algorithm for recognition of a natural-language voice command.

The server system 1100 may update the second voice recognition algorithm stored in the server system 1100 based on the second voice recognition algorithm-related update data in S1234.

Meanwhile, the user may utter a natural-language voice command such as "Turn on energy saving function". The voice recognition apparatus 1 may transmit the received natural-language voice command to the server system 1100 in S1250.

The server system 1100 may recognize the natural-language voice command based on the second voice recognition algorithm in S1270, and convert the recognized natural-language voice command into text format voice data in S1235.

The server system 1100 may transmit the text-format voice data to the voice recognition apparatus 1 in S1290.

The voice recognition apparatus 1 may control operation of its own based on the text format voice data in S1220. For example, the voice recognition apparatus 1 may operate an energy saving function of the voice recognition apparatus in response to a user's voice "Turn on energy saving function".

The second voice recognition algorithm may be a user voice recognition algorithm which is generated through machine learning on the basis of the user voice information stored in the server system 1100.

Thus, a voice recognition algorithm is updated through the server system 1100, so integrated update management is possible.

In addition, a natural-language voice recognition algorithm may be updated relatively easily through the server system 1100, and it is possible to process various natural languages through periodic update.

Figure 45:
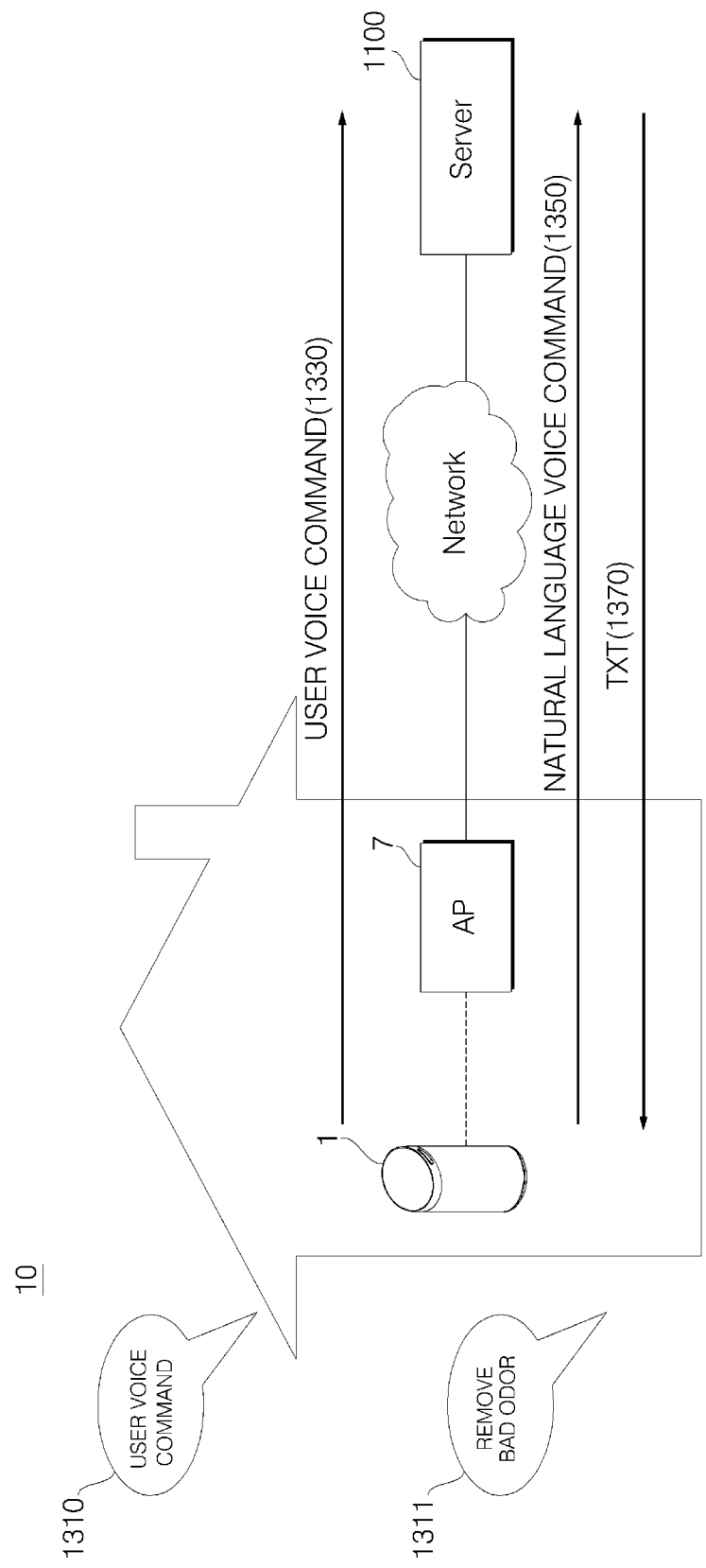

FIG. 45 is a diagram for explaining an operation method of FIG. 44.

Referring to the drawing, a user may input a voice command to the voice recognition apparatus in S1310.

Meanwhile, the voice command may be a wake0up voice including a preset call word, or a preset keyword consisting of relatively simple words. In addition, the voice command may be a natural-language voice command.

In one example, the voice command may be a wake-up voice such as "LG Hub". In another example, the voice command may be a keyword voice command such as "Power off". In yet another example, the voice command may be a natural-language voice command such as "Turn on energy saving function".

Having received the voice command through the microphone 221 or 222, the voice recognition apparatus 1 may transmit the voice command through the AP device 7 to the server system 1100 connected to an external network in 1330.

The server system 1100 may generate second voice recognition algorithm-related update data through machine learning on the basis of the voice command.

The server system 1100 may update the second voice recognition algorithm, stored in the server system 1100, based on the second voice recognition algorithm-related update data.

Meanwhile, the user may utter a natural-language voice command such as "Play music" in 1311. The natural-language voice command may be received through the microphone 221 or 222 of the voice recognition apparatus 1, and the voice recognition apparatus 1 may transmit the natural-language voice command through the AP device 7 to the server system 1100 connected to an external network in 1350.

The server system 1100 may recognize the natural-language voice command based on the second voice recognition algorithm, and convert the recognized natural-language voice command into text format voice data.

The server system 1100 may transit the text format voice data to the voice recognition apparatus 1 in 1370.

The voice recognition apparatus 1 may control operation of the voice recognition apparatus 1 based on the text format voice data. For example, if a natural-language voice command of "Play music" is received, the voice recognition apparatus 1 may execute a music playback function.

Meanwhile, generating first voice recognition algorithm-related update data and generating second voice recognition algorithm-related update data may be performed at the same time.

Meanwhile, updating a voice recognition algorithm may be at least one of updating the first voice recognition algorithm or updating the second voice recognition algorithm.

Figure 46:
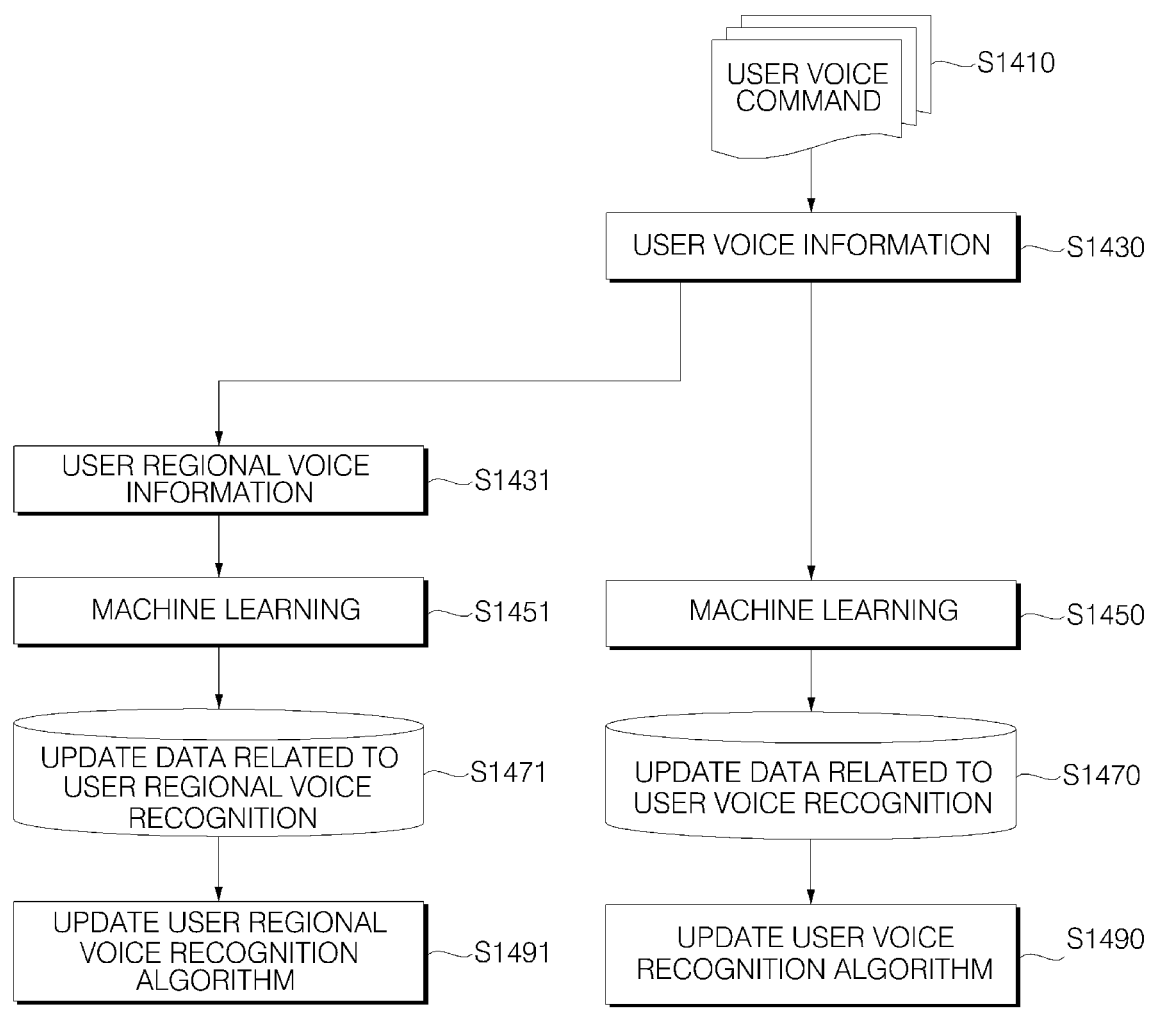

FIG. 46 is a flowchart illustrating an operation method of a voice recognition apparatus and a voice recognition system according to another embodiment of the present invention.

Referring to the drawing, the voice recognition apparatus 1 may transmit a voice command to the server system 1100 through a microphone.

The server system 1100 may collect a plurality of voice commands in S1410, and the plurality of voice commands may be stored in the storage 2030 as user voice information in S1430.

Meanwhile, the user voice information may include user characteristic data dependent upon regional language difference. The server system 1100 may classify user regional voice information by regional language difference in the user voice information in S1431. The regional language difference may be exemplified by dialect, intonation, accent, tone, vocabulary, pronunciation, etc.

In one example, the server system 1100 may store standard patterns of regional language difference in advance, compare an input user voice and the standard patterns of the regional language difference, and classify the user voice as a voice of a similar pattern. The classified user voice may become user regional voice information.

In another example, the server system 1100 may store models corresponding to regional language difference, and classify an input user voice on the basis of: a probability that a series corresponding to the input user voice is observed from the models corresponding to regional language difference; a probability that the input user voice is transitioned; a probability that a series output occurs in response to transition of the input user voice; etc.

In yet another example, the server system 1100 may store a reference parameter corresponding to regional language difference, extract a feature parameter from an input user voice, and classify the user voice by comparing the feature parameter with the reference parameter.

Meanwhile, in the case where dialect related to regional language difference is not stored in the server system 1100, when voice commands are received from a plurality voice recognition apparatuses, the server system 1100 may receive regional information of the corresponding voice recognition apparatuses 1 and learn dialect received from voice recognition apparatuses 1 belonging to the same region. In doing so, the server system 1100 may classify the voice command as dialect of the corresponding region.

The server system 1100 may perform machine learning on the basis of the user voice command in S1450. For example, the server system 1100 may perform a machine leaning process on the basis of the user's voice tone, voice intensity, voice speed, frequently-used word, gender, age, etc.

In addition, the server system 1100 may perform a machine learning process based on user regional voice information that is classified from the user voice information in S1451. For example, the server system 1100 may perform a machine learning process based on dialect, intonation, accent, tone, vocabulary, pronunciation, etc. In this case, a machine learning algorithm may be any one of the following: Neural Network, Decision Tree, Genetic Algorithm, Genetic Programming, Gaussian process regression, Linear Discriminant Analysis, K-Nearest Neighbor, Perceptron, Radial basis function network, Support Vector Machine, and Deep Learning.

Meanwhile, the server system 1100 may perform machine learning with respect to multiple users of the voice recognition apparatus 1. The server system 1100 may perform machine learning with respect to the multiple users, and classify voice recognition-related update data, which is generated through the machine learning, for individual users.

The server system 1100 may generate user voice recognition-related update data through machine learning on the basis of user voice information in S1470, and update a user voice recognition algorithm based on the user voice recognition-related update data in S1490.

The server system 1100 may generate user regional voice recognition-related update data through machine learning on the basis of user regional voice information in S1471, and update a user regional voice recognition-related algorithm based on the user regional voice recognition-related update data in S1491.

The server system 1100 may generate a user specific voice recognition-related update data through machine learning on the basis of user characteristic information, and update a user specific voice recognition algorithm based on the user specific voice recognition-related update data.

Accordingly, it is possible to a problem of voice recognition technologies that the same voice recognition performance cannot be achieved using one software due to variation of recognition depending on a regional language.

In addition, out of the user characteristic data, a voice recognition module specialized in recognition of regional language difference may be provided.

Figure 47:
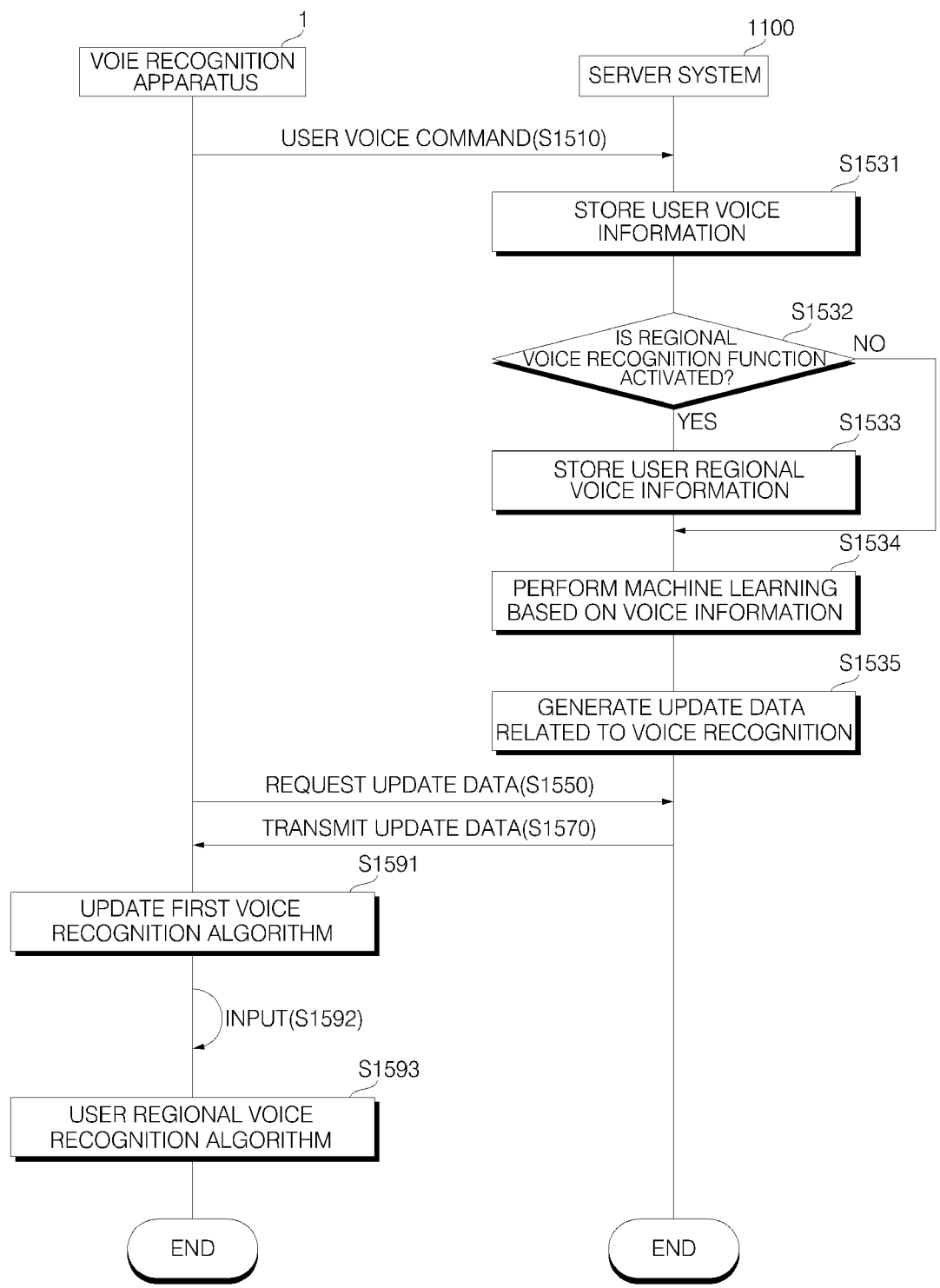

FIG. 47 is a diagram for explaining an operation method of FIG. 46.

Referring to the drawing, the voice recognition apparatus 1 may store a first voice recognition algorithm and transmit the voice command to the sever system 1100 in S1510.

The server system 1100 may receive the voice command through the communication module 2020, and the voice command may be stored in the storage unit 2030 as user voice information in S1531.

When a regional voice recognition function is not activated, the server system 1100 may perform machine learning on the basis of user voice information, as shown in FIG. 41, and the server system 1100 may generate first voice recognition algorithm-related update data through machine learning.

When the regional voice recognition function is activated, the server system 1100 may store classify user regional voice information from the user voice information and store the user regional voice information in the storage 2030 in S15133.

When the regional voice recognition function is activated, the server system 1100 may perform machine learning on the basis of the user regional voice information in S1534, and the server system may generate first voice recognition algorithm-related update data through machine learning in S1535.

Meanwhile, the first voice recognition algorithm may be an algorithm for recognizing a wake-up voice signal including a preset call word, or an algorithm for recognizing a preset keyword consisting of relatively simple words.

Meanwhile, the voice recognition apparatus 1 may request first voice recognition algorithm-related update data from the server system 1100 in S1550. In addition, the voice recognition apparatus 1 may request the first voice recognition algorithm-related update data through an application of an external mobile terminal.

Meanwhile, without a request from the voice recognition apparatus 1 or a mobile terminal, the server system 1100 may periodically or non-periodically transmit the first voice recognition algorithm-related update data.

The manipulation unit 181 of the voice recognition apparatus 1 may receive an input signal of the update data. For example, the manipulation unit 181 of the voice recognition apparatus 1 may receive a selection signal of at least one of first voice recognition algorithm-related update data generated through machine learning on the basis of user voice information or first voice recognition algorithm-related to update data generated through machine learning on the basis of user regional voice information.

In response to a request from the voice recognition apparatus 1 or a mobile terminal, the server system 1100 may transmit the first voice recognition algorithm-related update data to the voice recognition apparatus 1 in S1570.

For example, in response to a update request signal input by a user, the server system 1100 may selectively transmit first voice recognition algorithm-related update data generated through machine learning on the basis of user voice information or first voice recognition algorithm-related update data generated through machine learning on the basis of user regional voice information.

In this case, depending a user input, the voice recognition apparatus 1 may update, based on the first voice recognition algorithm-related update data, the first voice recognition algorithm stored in the voice recognition apparatus 1 in S1591.

For example, if a user selects the first voice recognition algorithm-related update data generated through machine learning on the basis of user voice information, the voice recognition apparatus 1 may receive the generated first voice recognition algorithm-related update data and update a first voice recognition algorithm based on the received first voice recognition algorithm-related update data.

For example, if a user selects the first voice recognition algorithm-related update data generated through machine learning on the basis of user regional voice information, the voice recognition apparatus 1 may receive the generated first voice recognition algorithm-related update data and update a first voice recognition algorithm based on the received first voice recognition algorithm-related update data.

Meanwhile, the server system 1100 may transmit both the first voice recognition algorithm-related update data generated through machine learning on the basis of user voice information, and the first voice recognition algorithm-related update data generated through machine learning on the basis of user regional voice information. In this case, the voice recognition apparatus 1 may receive a command for use of at least one of a user voice recognition algorithm or a user regional voice recognition algorithm through the manipulation unit 181 in S1592, and use a corresponding algorithm.

For example, if a user selects the user regional voice recognition algorithm, the voice recognition apparatus 1 may recognize the user's voice using the user regional voice recognition algorithm in S1593.

Thus, the first voice recognition algorithm may be a user regional voice recognition algorithm that is generated through machine learning on the basis of user regional voice information dependent upon regional language difference out of user voice information stored in the server.

Figure 48:
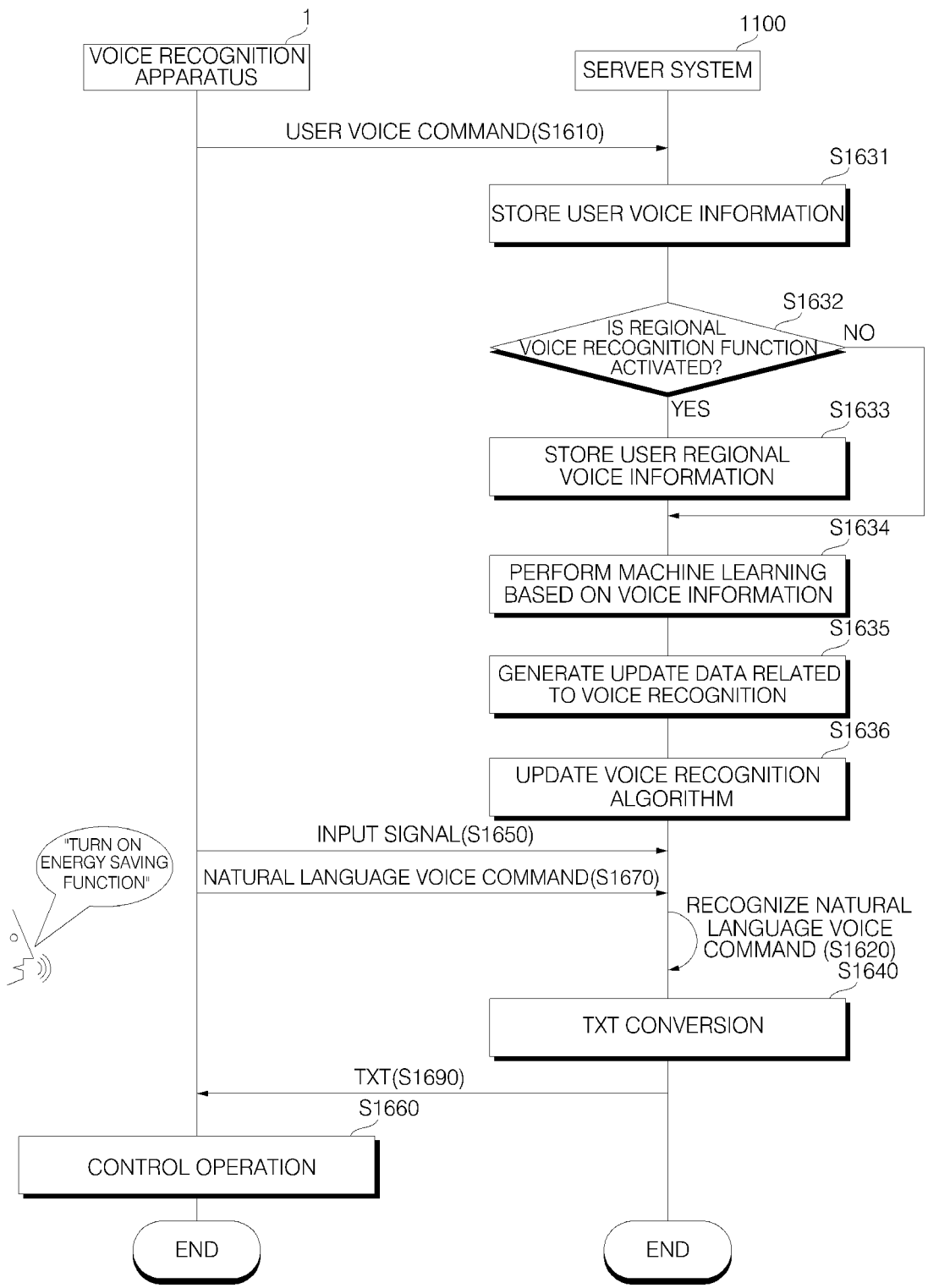

FIG. 48 is a diagram for explaining an operation method of FIG. 46.

Referring to the drawing, the voice recognition apparatus 1 may transmit a voice command to the server system 110—in S1610, and the server system 1100 may receive the voice command through the communication module 2020.

Meanwhile, the server system 1100 may further include the storage unit 2030, and the storage unit 2030 may include a second voice recognition algorithm. In addition, the storage unit 2030 may store the voice command, received from the voice recognition apparatus 1, as user voice information in S1631.

When a regional voice recognition function is not activated, the server system 1100 may perform machine learning on the basis of user voice information, as shown in FIG.

44, and the server system 1100 may generate second voice recognition algorithm-based update data through machine learning.

When the regional voice recognition function is activated, the server system 1100 may classify user regional voice information from the user voice information and store the user regional voice information in the storage unit 2030 in S1633.

When the regional voice recognition function is activated, the server system 1100 may perform machine learning on the basis of the user regional voice information in S1634, and the server system 1100 may generate second voice recognition algorithm-related update data through machine learning in S1635.

Meanwhile, a second voice recognition algorithm may be a voice recognition algorithm for recognizing a natural-language voice command.

The server system 1100 may update the second voice recognition algorithm, stored in the server system 1100, based on the second voice recognition algorithm-related update data in S1636.

The manipulation unit 181 of the voice recognition apparatus 1 may receive an input signal of a voice recognition algorithm.

For example, the manipulation unit 181 of the voice recognition apparatus 1 may receive an input signal of at least one of a second voice recognition algorithm generated through machine learning on the basis of user voice information or a second voice recognition algorithm generated through machine learning on the basis of user regional voice information. A user input is allowed any time before a user utters a voice.

The voice recognition apparatus 1 may transmit a user's input signal to the server system 1100 in S1650. Thus, depending on the user' input signal, a user voice recognition algorithm or a user regional voice algorithm of the server system 1100 may be selectively used.

Meanwhile, the user may utter a natural-language voice command such as "Turn on energy saving function". The voice recognition apparatus 1 may transmit the received natural-language voice command to the server system 1100 in S1670.

The server system 1100 may recognize the natural-language voice command based on the second voice recognition algorithm in S1620, and convert the recognized natural-language voice command into text format voice data in S1640.

For example, if a user selects a second voice recognition algorithm which is generated through machine learning on the basis of user voice information, a natural-language voice command may be recognized using the second voice recognition algorithm generated through machine learning on the basis of user voice information and the recognized voice command may be converted into text format voice data.

For example, if a user selects a second voice recognition algorithm which is generated through machine learning on the basis of user regional voice information, a natural-language voice command is recognized using the second voice recognition algorithm generated through machine learning on the basis of user regional voice information and the recognized voice command may be converted into txt format voice data.

Thus, the second voice recognition algorithm may be a user regional voice recognition algorithm which is generated through machine learning on the basis of user regional voice information dependent upon regional language difference out of user voice information stored in a server.

Meanwhile, the server system 1100 may transmit the text format voice data to the voice recognition apparatus 1 in S1690.

The voice recognition apparatus 1 may control operation of the voice recognition apparatus 1 based on the text format voice data in S1660. For example, the voice recognition apparatus 1 may execute an energy saving function of the voice recognition apparatus 1 in response to a user's voice "Turn on energy saving function".

Figure 49:
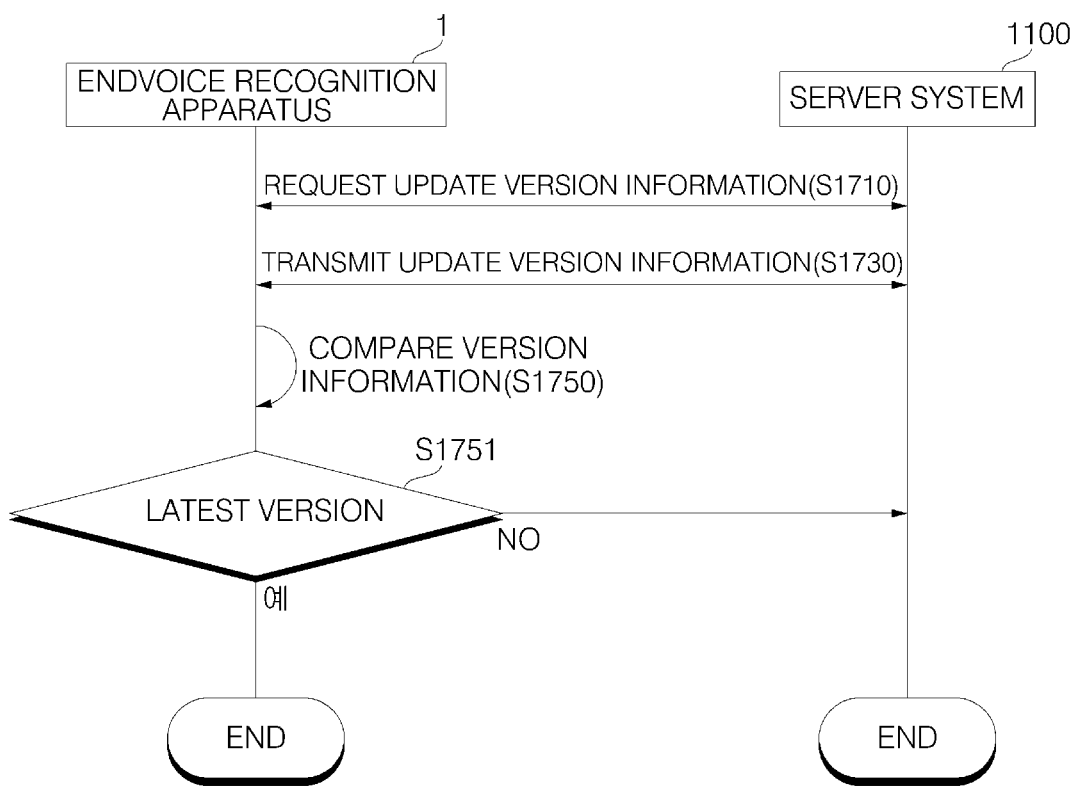
FIG. 49 is a flowchart illustrating an operation method of a voice recognition apparatus and a voice recognition system according to another embodiment of the present invention.

FIG. 49 is a flowchart illustrating an operation method of a voice recognition apparatus and a voice recognition system according to another embodiment of the present invention.

Referring to the drawing, the memory 250 of the voice recognition apparatus 1 may store version information of the current installed first voice recognition algorithm update, and the voice recognition apparatus 1 may request the version information from the server system 1100 in S1710.

In addition, even the storage unit 2030 of the server system 1100 may store version information of voice recognition algorithm update data, and even the server system 1100 may request update version information from the voice recognition apparatus 1 in S1710.

Requesting or transmitting update version information may be done non-periodically or may be done at a predetermined interval on the basis of one or more of a hour unit, a day unit, a week unit, a month unit, and a year unit.

In response to the request for the update version information from the server system 1100, the voice recognition apparatus 1 may transmit the update version information to the server system 1100 in S1730.

In response to the request for the update version information from the voice recognition apparatus 1, the server system 1100 may transmit the update version information to the voice recognition apparatus 1 in S1730.

The voice recognition apparatus 1 may receive version information of a first voice recognition algorithm update, which is stored in a server, from the server, and may compare the received version information with version information stored in the memory 250 in S1750.

If the comparison shows that the version information stored in the memory 250 is not the latest version, the voice recognition apparatus 1 may request the server system 1100 to transmit first voice recognition algorithm-related update data in S1770.

If the comparison shows that the version information stored in the memory 250 is the latest version, the voice recognition apparatus 1 does not request update transmission.

Since the voice recognition apparatus 1 is able to keep the first voice recognition algorithm with the latest version, voice recognition may be improved using the latest voice recognition algorithm.

Figure 50:
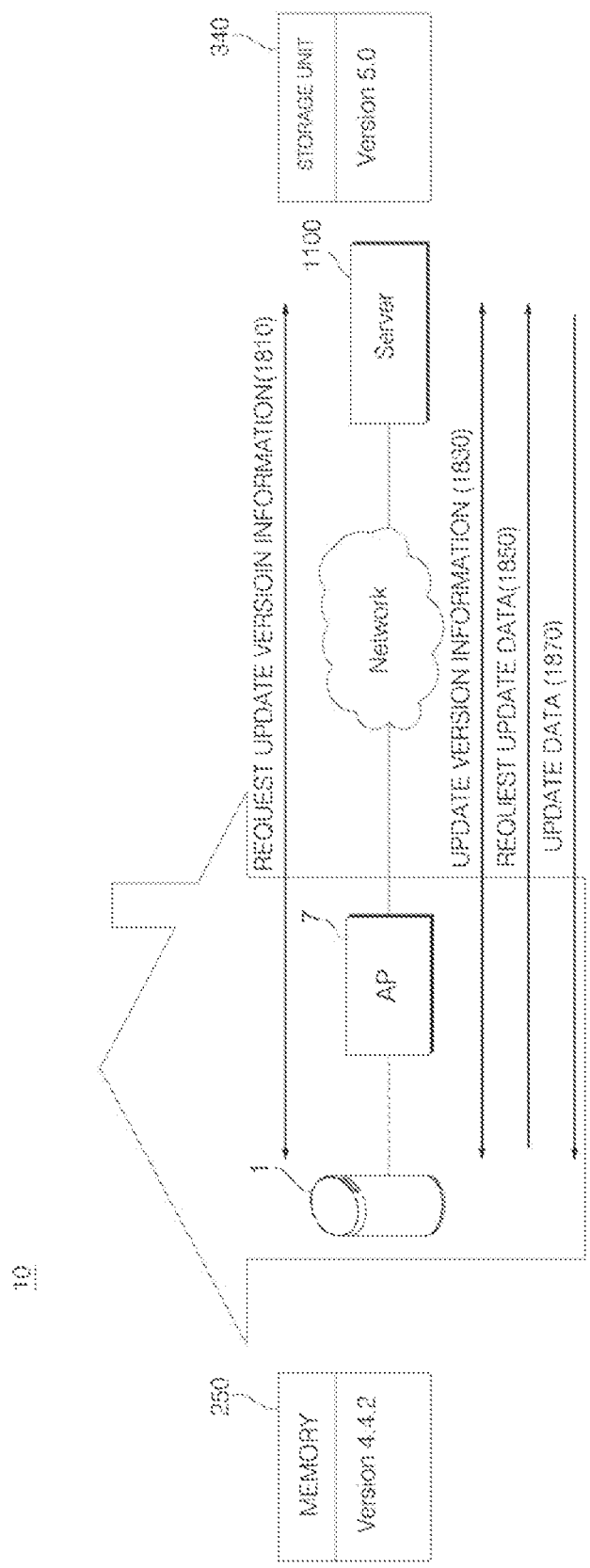
FIGS. 50 to 51C are diagrams for explaining an operation method of FIG. 49.

FIG. 50 is a diagram for explaining an operation method of FIG. 49.

Referring to the drawing, the memory 250 of the voice recognition apparatus 1 may store version information of the current installed first voice recognition algorithm update. For example, the version information stored in the memory 250 may be "4.4.2".

Meanwhile, even the storage unit 340 of the server system 1100 may store version information of the current installed first voice recognition algorithm update. For example, the version information stored in the storage unit 340 may be "5.0".

The controller 240 of the voice recognition apparatus 1 may request update version information from the server system 1100 through the AP device 7 in 1810.

In response to the request for the update version information from the voice recognition apparatus 1, the server system 1100 may transmit the update version information to the voice recognition apparatus 1 in 1830.

The controller 240 of the voice recognition apparatus 1 may receive version information of a first voice recognition algorithm update, which is stored in the server system 1100, from the server system 1100 and may compare the received version information with version information stored in the memory 250.

If the version information received from the server system 1100 is the latest version, the controller 240 may request first voice recognition algorithm-related update data from the server system 1100 in 1850. For example, in the case where version information stored in the memory 250 is "4.4.2" and version information received from the server system 1100 is "5.0", the received version information is the latest version, and therefore, the controller 240 may request first voice recognition algorithm-related update data from the server system 1100.

In the case where the version information stored in the server system 1100 is the latest version and a request for transmission of update data is received from the voice recognition apparatus 1, the server system 1100 may transmit first voice recognition algorithm-related update data to the voice recognition apparatus 1 in 1870.

Accordingly, the voice recognition apparatus 1 is able to keep the first voice recognition algorithm with the latest version all the time.

Figure 51A:
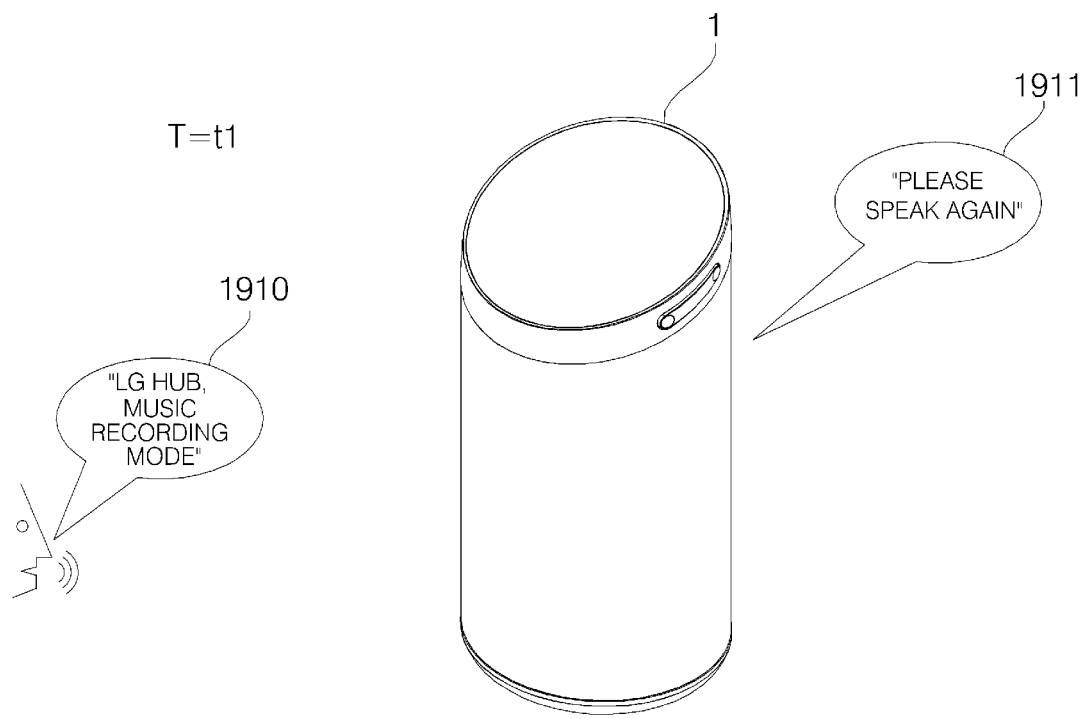
Figure 51B:
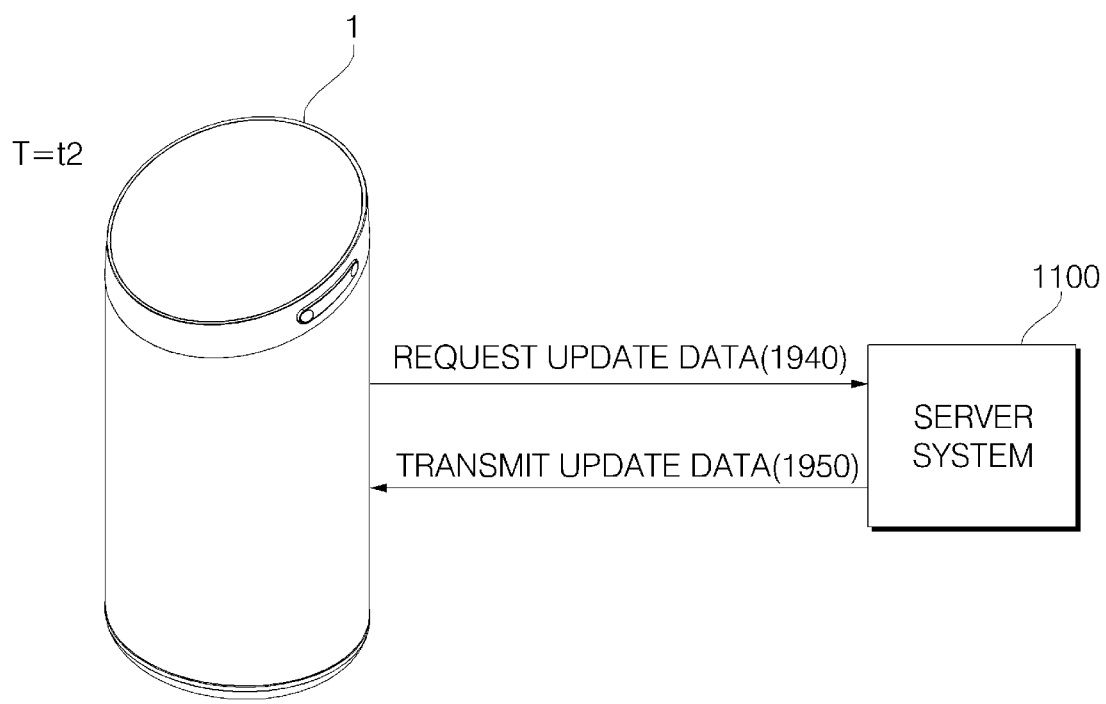
Figure 51C:
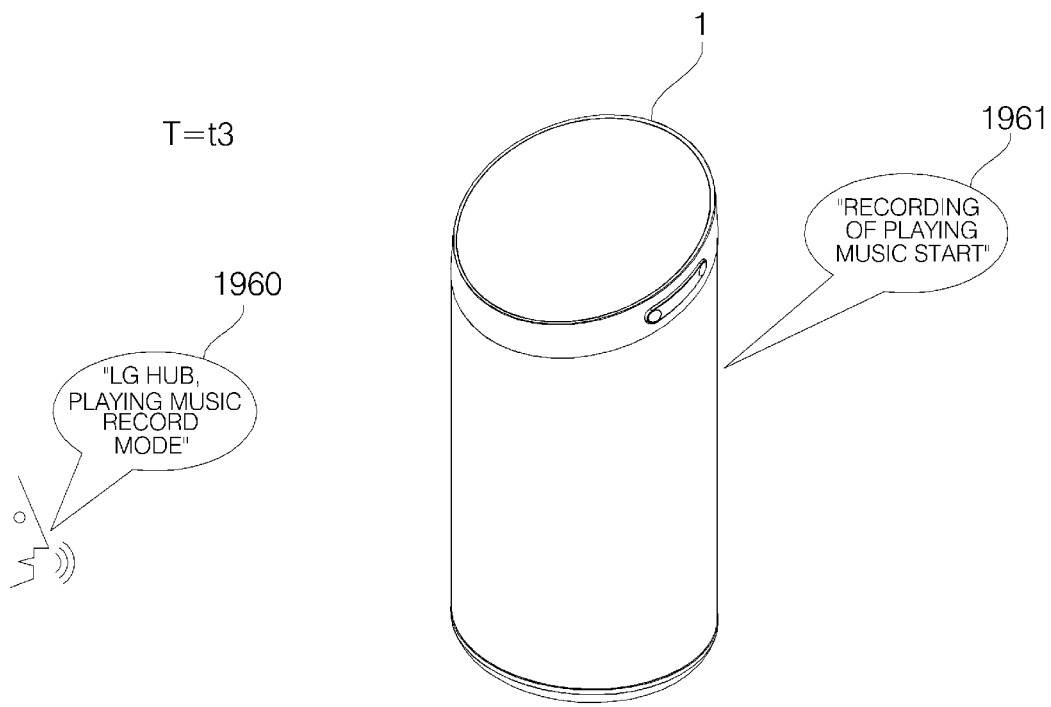

FIGS. 51A to 51C are diagrams for explaining the present invention.

Referring to the drawings, the voice recognition apparatus 1 may receive a keyword voice command such as "LG Hub, playing music record mode" 1910 (a first voice command), as shown in FIG. 51A. Having received the voice command through the microphone 221 or 222, the controller 221 or 222, the controller 240 of the voice recognition apparatus 1 may perform control to output a message for requesting re-inputting of a command, such as "Please speak again" 1911 through the audio output unit 291.

As shown in FIG. 51B, the controller 240 of the voice recognition apparatus 1 may request first voice recognition algorithm-related update data from the server system 1100 in 1940. In response to the request for the update data from the voice recognition apparatus 1, the server system 1100 may transmit the first voice recognition algorithm-related update data in 1950.

The voice recognition apparatus 1 may update a first voice recognition algorithm, stored in the memory 250, based on the first voice recognition algorithm-related update data. For example, the voice recognition apparatus 1 may be provided with a first voice recognition algorithm whose performance has improved after the first voice recognition algorithm update.

Meanwhile, as shown in FIG. 51C, the voice recognition apparatus 1 may receive a keyword voice command of "LG Hub, playing music record mode" 1960 (a first voice command) at a second time (T=t3), as it does at the first time (T=t1). Having received a voice command through the microphone 221 or 222, the controller 240 of the voice recognition apparatus 1 may recognize a voice command based on a first voice recognition algorithm.

The voice recognition apparatus 1 may control operation of its own by recognizing a voice command. For example, the controller 240 may recognize a user's voice "LG Hub, playing music record mode" 1960 at the second time (T=t3) and operate the voice recognition apparatus 1 in the playing music record mode.

In addition, the audio output unit 291 of the voice recognition apparatus 1 may output a processing result corresponding to a voice command. For example, as shown in FIG. 51C, in response to a user's voice "LG Hub, playing music record mode", the audio output unit 291 may output sound such as "Recording of playing music start".

The voice recognition apparatus and the voice recognition system according to the present invention are not limited to the configurations and methods of the above embodiments, and the embodiments may vary as all or some of the embodiments are selectively combined.

The operation method of the voice recognition apparatus according to the present invention may be implemented as code which is provided in the voice recognition apparatus and which can be written on a computer-readable medium in which a program is recorded and thus read by a computer. The computer-readable medium includes all kinds of recording devices in which data is stored in a computer-readable manner.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A voice recognition apparatus comprising:
a microphone configured to receive a voice command;
a memory configured to store a first voice recognition algorithm;
a communication device configured to transmit the voice command to a server system and receive update data regarding the first voice recognition algorithm from the server system; and
a controller electrically connected to the communication device and the memory, and configured to perform control to update the first voice recognition algorithm, which is stored in the memory, based on the update data regarding the first voice recognition algorithm,
wherein the memory stores the update data regarding the first voice recognition algorithm,
wherein when the update data regarding the first voice recognition algorithm is received, the controller is configured to update the first voice recognition algorithm stored in the memory based on the update data regarding the first voice recognition algorithm,
wherein the first voice recognition algorithm includes a voice recognition algorithm for recognizing a call word or a keyword, and
wherein when the update data regarding the first voice recognition algorithm is received, the controller provides a menu for setting an update start time.

2. The voice recognition apparatus according to claim 1, wherein the controller requests the update data regarding the first voice recognition algorithm from the server system.

3. The voice recognition apparatus according to claim 1, wherein the memory stores at least one of version information, history information, or a build number of a current installed first voice recognition algorithm update.

4. The voice recognition apparatus according to claim 3, wherein the controller receives version information of a first voice algorithm recognition algorithm update, which is stored in the server system, compares the received version information with the version information stored in the memory, and, when the received information is a latest version, requests the update data regarding the first voice recognition algorithm from the server system.

5. The voice recognition apparatus according to claim 1, wherein the controller controls the first voice recognition algorithm, which is stored in the memory, to be updated at a set start time.

6. The voice recognition apparatus according to claim 1, further comprising: an audio output device configured to output at least one of information corresponding to the voice command or a processing result corresponding to the voice command.

7. The voice recognition apparatus according to claim 6, wherein the controller controls operation of the voice recognition apparatus, by outputting a message for requesting re-inputting command through the audio output device in response to a first voice command which is input at a first time and, after the first voice recognition algorithm update, recognizing the first voice command which is input at a second time.

8. The voice recognition apparatus according to claim 1, wherein the controller controls operation of the voice recognition apparatus by recognizing the voice command based on the first voice recognition algorithm.

9. The voice recognition apparatus according to claim 1, wherein the first voice recognition algorithm includes a voice recognition algorithm generated through machine learning based on the voice command.

10. A voice recognition system comprising:
a voice recognition apparatus configured to store a first voice recognition algorithm and transmit a voice command; and
a server system comprising a storage device configured to store a second voice recognition algorithm, a communication device configured to receive the voice command, and a processor electrically connected to the communication device and the storage device, and configured to recognize the voice command based on the second voice recognition algorithm,
wherein the server system transmits first update data regarding the first voice recognition algorithm to the voice recognition apparatus, and updates a second voice recognition algorithm, which is stored in the server system, based on second update data regarding the second voice recognition algorithm,
wherein the voice recognition apparatus updates the first voice recognition algorithm, which is stored in the voice recognition apparatus, based on the first update data regarding the first voice recognition algorithm, and
wherein the voice recognition apparatus comprises a memory configured to store the first update data regarding the first voice recognition algorithm; and
a controller electrically connected to the memory, and configured to, when the first update data regarding the first voice recognition algorithm is received, update the first voice recognition algorithm stored in the memory based on the update data regarding the first voice recognition algorithm,
wherein the first voice recognition algorithm includes a voice recognition algorithm for recognizing a call word or a keyword, and
wherein when the first update data regarding the first voice recognition algorithm is received, the controller provides a menu for setting an update start time.

11. The voice recognition system according to claim 10, wherein at least one of the first or second voice recognition algorithm is a user voice recognition algorithm that is generated through machine learning on the basis of voice information stored in the server system.

12. The voice recognition system according to claim 11, wherein at least one of the first or second voice recognition algorithm is a user regional voice recognition algorithm that is generated through machine learning on the basis of user regional voice information dependent upon regional language difference out of the voice information stored in the server system.

13. The voice recognition system according to claim 10, wherein the second voice recognition algorithm includes a voice recognition algorithm for recognizing a natural language voice command.

14. The voice recognition system according to claim 10, wherein the first voice recognition algorithm includes a voice recognition algorithm generated through machine learning based on the voice command.

* * * * *